United States Patent
Kashima

[19]

[11] Patent Number: 6,147,734
[45] Date of Patent: Nov. 14, 2000

[54] BIDIRECTIONAL DICHROIC CIRCULAR POLARIZER AND REFLECTION/ TRANSMISSION TYPE LIQUID-CRYSTAL DISPLAY DEVICE

[75] Inventor: Keiji Kashima, Tokyo, Japan

[73] Assignee: Dai Nippon Printing Co., Ltd., Tokyo, Japan

[21] Appl. No.: 09/464,792

[22] Filed: Dec. 16, 1999

[30] Foreign Application Priority Data

| Dec. 17, 1998 | [JP] | Japan | 10-358564 |
| Dec. 17, 1998 | [JP] | Japan | 10-358614 |
| Dec. 17, 1998 | [JP] | Japan | 10-358781 |
| Dec. 17, 1998 | [JP] | Japan | 10-359116 |
| Dec. 17, 1998 | [JP] | Japan | 10-359184 |

[51] Int. Cl.$^7$ .................................................. G02F 1/1335
[52] U.S. Cl. .......................... 349/113; 349/162; 349/117
[58] Field of Search ........................ 349/113, 162, 349/117

[56] References Cited

U.S. PATENT DOCUMENTS

| 5,828,471 | 10/1998 | Davis et al. .......................... 359/15 |
| 5,986,730 | 11/1999 | Hansen et al. ........................ 349/96 |
| 5,995,180 | 11/1999 | Moriwaki et al. .................... 349/96 |
| 5,999,240 | 2/1999 | Sharp et al. ......................... 349/119 |

FOREIGN PATENT DOCUMENTS

| 62-54169 | 3/1987 | Japan . |
| 3-75705 | 3/1991 | Japan . |
| 4-502524 | 5/1992 | Japan . |
| 6-130424 | 5/1994 | Japan . |
| 9-506985 | 7/1997 | Japan . |
| 10-142601 | 5/1998 | Japan . |
| 10-197865 | 7/1998 | Japan . |
| 10-206844 | 8/1998 | Japan . |
| 10-206846 | 8/1998 | Japan . |
| 10-260402 | 9/1998 | Japan . |
| 10-260403 | 9/1998 | Japan . |

*Primary Examiner*—Kenneth Parker
*Assistant Examiner*—Mike Qi
*Attorney, Agent, or Firm*—Oliff & Berridge, PLC

[57] ABSTRACT

In a combination reflective/transmissive liquid-crystal display device, when the liquid-crystal display device is in the transmissive mode, unpolarized light from a light source passes through a circular polarization separating layer, a half-wavelength layer in the off condition, and a first bidirectional dichroic circular polarizing layer and then strikes a liquid-crystal cell, the retardation value of which, as a result of an electrical field applied thereto, changes so as to shift light 0 to $\pi$, thereby modulating incident circularly polarized light, which is caused to strike a second bidirectional dichroic circular polarizing layer, the transmitted component in which serves as the display light. In the reflective mode, external light passes through the second bidirectional dichroic circular polarizing layer, the liquid-crystal cell, the half-wavelength layer which has been turned on, and the first bidirectional dichroic circular polarizing layer, and is then reflected by the circular polarization separating layer so as to become circularly polarized light that also serves as the display light.

19 Claims, 40 Drawing Sheets

λ : DIRECTION ANGLE
tan ω : ELLIPTICITY

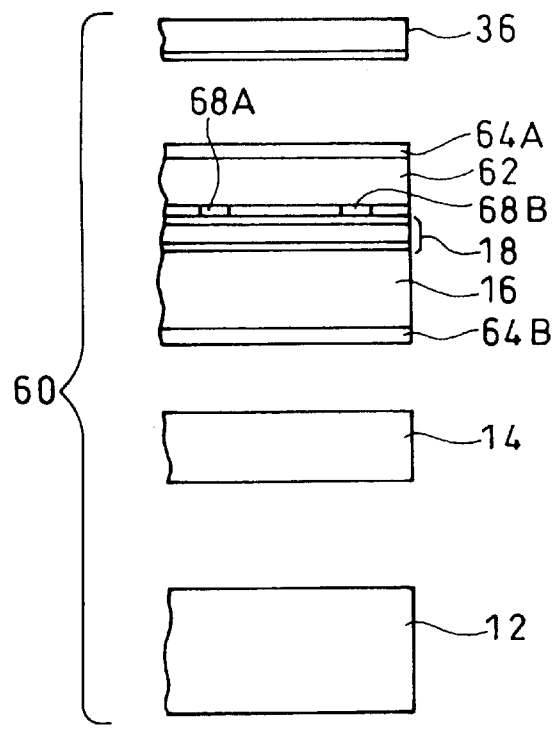
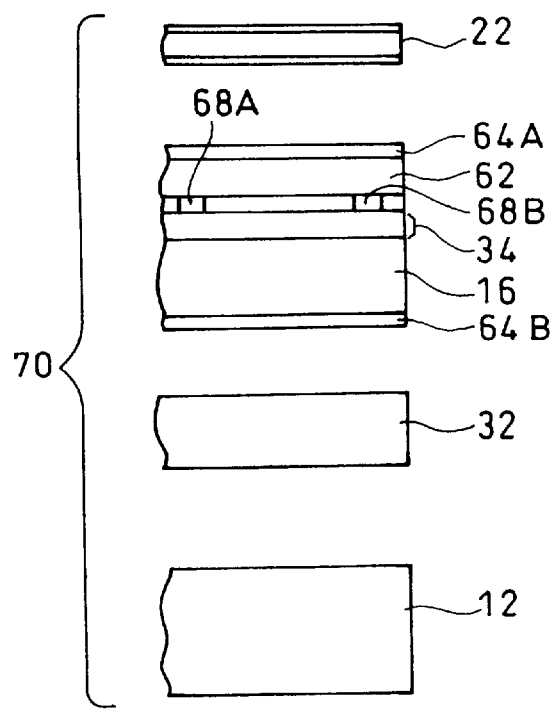

BIDIRECTIONAL DICHROIC CIRCULAR POLARIZER AND REFLECTION/TRANSMISSION TYPE LIQUID-CRYSTAL DISPLAY DEVICE

BACKGROUND OF THE INVENTION

1. Field of the Invention

The present invention relates to a combination reflection/transmission-type liquid-crystal display device.

2. Description of the Related Art

Liquid-crystal display devices include a transmission type, in which backlighting is applied to a liquid-crystal cell from the rear and a reflective type, in which external light entering the liquid-crystal display device via the liquid-crystal cell is reflected by the rear surface thereof, the reflected light illuminating the liquid-crystal cell.

In addition, there is a type of liquid-crystal display device which is used as a reflective type display in bright locations and a transmission type of display in dark locations.

Such combination reflective/transmission liquid-crystal display devices are disclosed for example, in the Japanese Unexamined Patent Application publications (JP-A) H10-197865, H10-206844, H10-206846, H10-260402, and H10-260403, in which a translucent sheet is used as a diffuser for backlighting. In the Japanese Unexamined Patent Application publication (JP-A) H10-142601, there is disclosure of the provision of frontlighting at the front surface of the display of a reflective-type liquid-crystal display device, the illumination light provided by this frontlighting or external light being used to illuminate the liquid-crystal cell.

In a liquid-crystal display device, polarized light obtained by passing light through a polarizer is modulated in a liquid-crystal layer. For example, as shown in the typical liquid-crystal display device 1 of FIG. 48, light emitted from a light source 2 strikes a light-absorbing type dichroic linear polarizer 3, the linearly polarized light obtained therefrom then striking a liquid-crystal cell 4.

In the liquid-crystal display device 1 of FIG. 48, polarized light that strikes and passes through the liquid-crystal cell 4 is modulated by application of a voltage to an electrode provided in the liquid-crystal cell 4 so as to change the electric field within the cell, or exits the liquid-crystal cell 4 unmodulated with no electric field, a light-absorbing type dichroic linear polarizer 5 disposed outside the cell passing light of only a particular polarization direction.

Because the light-absorbing type dichroic linear polarizers 3 and 5 pass light polarized in the direction of the transmission axis, and almost completely absorb light polarized in a direction perpendicular to the transmission axis, approximately 50% of the light (nonpolarized light) emitted from the light source 2 is absorbed by the dichroic linear polarizer 3. For this reason, the utilization rate of light in the liquid-crystal display device 1 decreases, making it necessary to have more light from the light source strike the dichroic linear polarizer 3 in order to obtain a sufficient brightness at the surface of the liquid crystal screen.

If the amount of light emitted from the light source 2 is increased, however, there is not only an increase in the electrical power consumed, but also an increase in the heat generated by the light source 2, this leading to the problem of an adverse effect on the liquid crystal in the liquid-crystal cell 4.

Because of this situation, a proposed remedy, as disclosed in a PCT Publication corresponding to JP (Tokuhyo) H4-502524 and in Japanese Unexamined Patent Application publication (JP-A) H6-130424, is a liquid-crystal display device in which a cholesteric liquid crystal layer is used to separate light from a light source by either transmitting or reflecting light of right or left circular polarization, transmitted light of one of the circular polarization directions being caused to strike a liquid-crystal cell, and light of the other of the circular polarization directions being reflected by a reflective sheet as to reverse the direction of rotation thereof, thereby enabling the light to be transmitted through the cholesteric liquid crystal layer, and improving the utilization rate of light.

As disclosed in PCT publication corresponding to JP (Tokuhyo) H9-506985, there is a proposed a liquid-crystal display device in which an extended multilayer film is used to either transmit or reflect nonpolarized light from a light source, thereby dividing the light into two linearly polarized components, the transmitted linearly polarized light being caused to strike a liquid-crystal cell, the reflected linearly polarized light having a polarization direction perpendicular to the transmitted light having its direction of polarization converted by a reflecting sheet, after which it is guided once again so as to strike the extended multilayer film, thereby improving the utilization rate of light.

The liquid-crystal layer in the liquid-crystal display devices disclosed in Tokuhyo H4-502524 and the Japanese Unexamined Patent Application publication (JP-A) H6-130424 shift the phase of light by either $\pi$ ($\lambda/2$) or $\pi/2$ ($\lambda/4$) when no electric field is applied, and do not shift the phase of the light when an electric field is applied, the light emanating from the liquid-crystal layer striking an externally disposed circular polarizer, at which the light is either transmitted or reflected, in accordance with the degree of polarization of the incident light.

In the liquid-crystal display device disclosed in Tokuhyo H9-506985, although there is disclosure of one linearly polarized light component transmitted through an extended multilayer film striking a liquid-crystal cell, there is no disclosure with regard to the retardation at the liquid-crystal layer.

In the above-described combination reflective/transmissive type liquid-crystal display devices, which use a translucent diffusion sheet as a diffusion sheet for diffusing backlighting, the reflectivity of the diffusion sheet is low, resulting in poor display readability, in addition to the problem of low transmissivity.

In the above-described combination reflective/transmissive type liquid-crystal display devices, using frontlighting at the display, there is the problem of insufficient frontlighting intensity (efficiency), this causing poor readability.

Additionally, in the liquid-crystal display devices disclosed in Tokuhyo H4-512524 and in Japanese Unexamined Patent Application publication H6-130424, for the reason noted below, there is an extreme deterioration of readability of the liquid-crystal display and a great loss of contrast, thereby representing insufficient display quality.

More specifically, in the liquid-crystal display device disclosed in Tokuhyo H4-512524, because a circular polarizer directly visible from the outside is disposed outside the liquid-crystal layer, this polarizer being formed by a low-pitch cholesteric film with waveform-dependent reflectivity, approximately 50% of external light striking the circular polarizer is reflected, this reflected light directing striking the eyes of an observer, thereby greatly reducing the readability of the display.

In the case of the liquid-crystal display device disclosed in the Japanese Unexamined Patent Application publication H6-130424 as well, a color-selective layer that is directly visible from the outside is a circular polarizer made of a cholesteric liquid crystal, which in the same manner as in Tokuhyo H4-512524, reflects approximately 50% of the light that strikes it, thereby causing a great reduction in readability.

While there was in the past a dichroic circular polarizing layer (polarizer) of the light-absorbing type which absorbs light of one circular polarization direction and transmits light of another circular polarization direction, this was fabricated, for example, as a laminate of a λ/4 phase-shifting layer made of a dichroic polarizing material such as Polaroid (TM), which transmits light polarized in the transmission axis direction and almost completely absorbs light having a polarization direction perpendicular to the light transmission axis direction, the λ/4 phase-shifting layer causing either a lead or a lag of 45° with respect to the light-absorption axis of the dichroic linear polarizing layer.

For this reason, a dichroic circular polarizer of the past functioned as a dichroic circuit polarizer only for light striking it from a dichroic linear polarizing layer, and did not function as such with respect to incident light from the opposite side.

Accordingly, it is an object of the present invention, in view of the above-described drawbacks in the related art, to provide a bidirectional dichroic circular polarizer that functions as a dichroic circular polarizer with respect to incident light from both directions.

Another object of the present invention is to provide a combination reflective/transmissive type liquid-crystal display device featuring high reflectivity and transmissivity, good readability, and which provides sufficient intensity, whether functioning as a transmissive-type display or a reflective-type display.

It is an additionally object of the present invention to provide a combination reflective/transmissive type liquid-crystal display device which has a simple configuration and which does not exhibit a loss of readability and a large decrease in contrast caused by external light, and which in the transmissive-type display mode particular, provides a great improvement in the utilization rate of light, and in the reflective display mode provides high contrast.

SUMMARY OF THE INVENTION

The above object is accomplished by means of a bidirectional dichroic circular polarizer according to the present invention comprising: a bidirectional linearly polarized light onto both sides of which are attached or directly formed quarter-wavelength layers.

The other object is accomplished by means of a combination reflective/transmissive liquid-crystal display device according to the present invention comprising:
  a light source;
  a polarization separation layer comprising one of a function of transmitting one direction of left or right circularly polarized light components incident from said light source or from an opposite direction and reflecting a circularly polarized light component of the opposite direction and a function of transmitting one direction component of linearly polarized light incident from said light source or from an opposite direction and reflecting a component of the other direction which is perpendicular thereto;
  a half-wavelength layer, which, in response to on/off switching of a voltage either shifts incident polarized light from said polarization separation layer or from an opposite direction or does not shift said light;
  a first light-absorbing type bidirectional dichroic polarization layer disposed on the opposite of the half-wavelength layer from the polarization separating layer, and comprising one of a function of transmitting, of light incident thereto from said half-wavelength layer or from the opposite direction, circularly polarized light of one of the left and right rotation directions and absorbing circularly polarize light of the other rotation direction, and a function of transmitting, of light incident thereto from said half-wavelength layer or from the opposite direction, linearly polarized light of only one direction, and absorbing linear polarized light of the direction perpendicular thereto;
  a liquid-crystal layer that converts or does not convert one incident circularly polarized light or linearly polarized light to another circularly polarized light or linearly polarized light before it exits the opposite side, and comprises one of a function of changing the ellipticity when light exits with circular polarization and changing the polarization axis direction when light exits as linearly polarized light;
  a second light-absorbing type bidirectional dichroic polarization layer disposed on the opposite of the liquid-crystal layer from the first bidirectional dichroic polarization layer, and comprising one of a function of transmitting, of light incident thereto from said liquid-crystal layer or from the opposite direction, circularly polarized light of one of the left and right rotation directions and absorbing circularly polarize light of the other rotation direction, and a function of transmitting, of light incident thereto from said liquid-crystal cell or from the opposite direction, linearly polarized light of only one direction, and absorbing linear polarized light of the direction perpendicular thereto;
  wherein, by switching a voltage with respect to said half-wavelength layer on and off, it is possible to freely select between a reflective mode in which said display device operates in the reflective mode and a transmissive mode in which said display device operates in a transmissive mode, the configuration of the first bidirectional dichroic polarizing layer being such that said first bidirectional dichroic polarizing layer transmits polarized light having passed through said polarization separating layer,
  and wherein when said half-wavelength layer is in the transmissive mode, polarized light having passed through said polarization separating layer is transmitted without a shift of phase, or with a shift of phase so that it is transmitted through the first bidirectional dichroic polarizing layer, but when said half-wavelength layer is in the reflective mode, the phase of polarized light having passed through said second bidirectional dichroic polarizing layer, said liquid-crystal layer, and said first bidirectional dichroic polarizing layer is shifted so that it is reflected by said phase shifting layer, or not shifted and also polarized light reflected from said phase shifting layer is shifted so as to be transmitted by the first bidirectional dichroic polarizing layer, or not shifted.

In the combination reflective/transmissive liquid-crystal display device, at least one of said first and second bidirectional dichroic polarizing layers may have a quarter-wavelength layer attached to or directly formed onto both sides thereof.

The combination reflective/transmissive liquid-crystal display device may be, wherein:

said polarization separating layer is a circular polarization separating layer that, of the incident light, transmits either right or left rotated circularly polarized light, and reflects circularly polarized light of the other direction;

said first and second bidirectional dichroic polarizing layers are light-absorbing type bidirectional dichroic circularly polarizing layers that, of the incident light, transmit either right or left rotated circularly polarized light, and absorb circularly polarized light of the other direction; and electrodes are provided on said liquid-crystal layer for applying an electrical field thereto, an electrical field being applied from the electrodes to the liquid-crystal layer so as to change the retardation value thereof, so that the phase of circularly polarized light incident via transmission through the first bidirectional dichroic polarizing layer or circularly polarized light incident via transmission through the second bidirectional dichroic polarizing layer is substantially shifted 0 to $\pi$.

The combination reflective/transmissive liquid-crystal display device may be, wherein:

said polarization separating layer is a linear polarization separating layer that, of the incident light, transmits only one linearly polarized light component, and reflects linearly polarized light of the other direction;

said first and second bidirectional dichroic polarizing layers are light-absorbing type bidirectional dichroic linearly polarizing layers that, of the incident light, transmit only one linearly polarized light component, and absorb linearly polarized light of the other direction; and electrodes are provided on said liquid-crystal layer for applying an electrical field thereto, an electrical field being applied from the electrodes to the liquid-crystal layer so as to change the retardation value thereof, so that the phase of linearly polarized light incident via transmission through the first bidirectional dichroic polarizing layer or linearly polarized light incident via transmission through the second bidirectional dichroic polarizing layer is substantially shifted 0 to $\pi$.

The combination reflective/transmissive liquid-crystal display device may be, wherein:

said polarization separating layer is a circular polarization separating layer that, of the incident light, transmits either right or left rotated circularly polarized light, and reflects circularly polarized light of the other direction;

said first bidirectional dichroic polarizing layer is light-absorbing type bidirectional dichroic circularly polarizing layers that, of the incident light, transmit either right or left rotated circularly polarized light, and absorb circularly polarized light of the other direction;

said second bidirectional dichroic polarizing layer is light-absorbing type bidirectional dichroic linearly polarizing layers that, of the incident light, transmit only one linearly polarized light component, and absorb linearly polarized light of the other direction; and electrodes are provided on said liquid-crystal layer for applying an electrical field thereto, an electrical field being applied from the electrodes to the liquid-crystal layer so as to change the retardation value thereof, so that the phase of circularly polarized light incident via transmission through the first bidirectional dichroic polarizing layer or linearly polarized light incident via transmission through the second bidirectional dichroic polarizing layer is substantially shifted $-\pi/2$ to $\pi/2$.

The combination reflective/transmissive liquid-crystal display device may be, wherein:

said polarization separating layer is a linear polarization separating layer that, of the incident light, transmits only one linearly polarized light component, and reflects linearly polarized light of the other direction;

said first bidirectional dichroic polarizing layer is light-absorbing type bidirectional dichroic linearly polarizing layers that, of the incident light, transmit only one linearly polarized light component, and absorb linearly polarized light of the other direction;

said second bidirectional dichroic polarizing layer is light-absorbing type bidirectional dichroic circularly polarizing layers that, of the incident light, transmit either right or left rotated circularly polarized light, and absorb circularly polarized light of the other direction; and electrodes are provided on said liquid-crystal layer for applying an electrical field thereto, an electrical field being applied from the electrodes to the liquid-crystal layer so as to change the retardation value thereof, so that the phase of linearly polarized light incident via transmission through the first bidirectional dichroic polarizing layer or linearly polarized light incident via transmission through the second bidirectional dichroic polarizing layer is substantially shifted $-\pi/2$ to $\pi/2$.

The combination reflective/transmissive liquid-crystal display device may be, wherein:

said polarization separating layer is a circular polarization separating layer that, of the incident light, transmits either right or left rotated circularly polarized light, and reflects circularly polarized light of the other direction;

said first bidirectional dichroic polarizing layer is a light-absorbing type bidirectional dichroic circular polarizing layer that, of the incident light, transmits either right or left rotated circularly polarized light, and absorbs circularly polarized light of the other direction;

said second bidirectional dichroic polarizing layer is a light-absorbing type bidirectional dichroic linearly polarizing layer that, of the incident light, transmits only one linearly polarized light component, and absorbs linearly polarized light of the other direction;

said liquid-crystal layer has a retardation value that substantially shifts transmitted light $\pi/2$ and is provided with electrodes for applying an electrical field thereto, the action of which is that circularly polarized light incident via transmission through said first bidirectional dichroic polarizing layer or linearly polarized light incident via transmission through said second bidirectional dichroic polarizing layer is converted to linearly polarized light or circularlypolarized light before it exits on the opposite side, an electrical field being applied to the liquid-crystal layer from said electrode, so that the direction of the director of the liquid crystal is changed, thereby changing the polarization axis of the linearly polarized light or circularly polarized light.

The combination reflective/transmissive liquid-crystal display device may be, wherein:

said polarization separating layer is a linear polarization separating layer that, of the incident light, transmits only one linearly polarized light component, and reflects linearly polarized light of the other direction;

said first bidirectional dichroic polarizing layer is a light-absorbing type bidirectional dichroic linearly polarizing layer that, of the incident light, transmits only one linearly polarized light component, and absorbs linearly polarized light of the other direction;

said second bidirectional dichroic polarizing layer is a light-absorbing type bidirectional dichroic circular polarizing layer that, of the incident light, transmits either right or left rotated circularly polarized light, and absorbs circularly polarized light of the other direction;

said liquid-crystal layer has a retardation value that substantially shifts transmitted light $\pi/2$ and is provided with electrodes for applying an electrical field thereto, the action of which is that linearly polarized light incident via transmission through said first bidirectional dichroic polarizing layer or circularly polarized light incident via transmission through said second bidirectional dichroic polarizing layer is converted to circularly polarized light or linearly polarized light before it exits on the opposite side, an electrical field being applied to the liquid-crystal layer from said electrodes, so that the direction of the director of the liquid crystal is changed, thereby changing the polarization axis of the circularly polarized light or linearly polarized light.

The combination reflective/transmissive liquid-crystal display device may be, wherein:

said polarization separating layer is a linear polarization separating layer that, of the incident light, transmits one linearly polarized light component, and reflects linearly polarized light of the other direction;

said first and second bidirectional dichroic polarizing layers are light-absorbing type bidirectional dichroic linearly polarizing layers that, of the incident light, transmit one linearly polarized light component and absorb linearly polarized light of the other direction;

said liquid-crystal cell having a retardation value that substantially shifts transmitted light $\pi$, and is provided with electrodes for applying an electrical field thereto, the action of which is to change the rotation of light by application of the electrical field, so that the polarization plane of linearly polarized light incident via transmission through said first or second bidirectional dichroic polarizing layer is shifted as it exits from the liquid-crystal layer.

The combination reflective/transmissive liquid-crystal display device may be, wherein:

said polarization separating layer is a linear polarization separating layer that, of the incident light, transmits one linearly polarized light component, and reflects circularly polarized light of the other direction;

said first and second bidirectional dichroic polarizing layers are light-absorbing type bidirectional dichroic linearly polarizing layers that, of the incident light, transmit one linearly polarized light component and absorb linearly polarized light of the other direction;

said liquid-crystal cell having a retardation value that substantially shifts transmitted light $\pi$, and is provided with electrodes for applying an electrical field thereto, the action of which is to change the rotation of light by application of the electrical field, so that the polarization plane of linearly polarized light incident via transmission through said first or second bidirectional dichroic polarizing layer is shifted as it exits from the liquid-crystal layer.

The combination reflective/transmissive liquid-crystal display device may be, wherein said liquid-crystal layer is sandwiched between two substrates, said substrates being formed on one of said electrodes, so that the electrical field direction when a voltage is applied to said electrode has a part that is substantially parallel with the surface of said substrates, the direction of liquid crystal molecules within the liquid-crystal layer rotating while remaining substantially parallel to said substrate surfaces.

The combination reflective/transmissive liquid-crystal display device may be, wherein said circular polarization separating layer is made of a rotation selection film made of a cholesteric liquid crystal.

The combination reflective/transmissive liquid-crystal display device may be, wherein said circular polarization separating layer comprises a lamination of a phase shifting layer having a retardation value that causes a substantial shift of $\pi/2$ to the phase of transmitted light, and at least three films exhibiting birefringence, wherein the difference in the refractive index between the layers adjacent to each other along its thickness direction for one of two light beams having vibration directions perpendicular to each other in a plane being different from the difference in the refractive index between the layers adjacent to each other along its thickness direction for the other light beams.

The combination reflective/transmissive liquid-crystal display device may be, wherein the linear polarization separating layer has a planar laminated structure having three or more layers each of which has double refraction; and the difference in the refractive index between the layers adjacent to each other along its thickness direction for one of two light beams having vibration directions perpendicular to each other in a plane is different from the difference in the refractive index between the layers adjacent to each other along its thickness direction for the other of the two light beams.

The combination reflective/transmissive liquid-crystal display device may be, wherein said linear polarization separating layer comprises a phase shifting layer having a retardation value that causes a substantial shift of $\pi/2$ to the phase of transmitted light, and a rotation-selecting layer made of a cholesteric liquid crystal, wherein circularly polarized light transmitted by said cholesteric liquid crystal is converted to linearly polarized light.

The combination reflective/transmissive liquid-crystal display device may be, wherein said half-wavelength layer is formed by a liquid-crystal cell including a liquid-crystal layer, liquid crystal in liquid crystal cell being one type selected from a group consisting of nematic liquid crystal, ferroelectric liquid crystal, and anti-ferroelectric liquid crystal, and wherein the refractive index and thickness of the liquid crystal is established so as to shift polarized light incident thereto by $\pi$.

The combination reflective/transmissive liquid-crystal display device may be, further comprising a switch as means for switching said half-wavelength layer on and off.

The combination reflective/transmissive liquid-crystal display device may be, further comprising a switch as means for switching said half-wavelength layer on and off, and an external light sensor that detects an amount of external light and sets said switch to on or off when said light amount exceeds a prescribed value, and sets said switch to off or on when said light amount is below said prescribed value.

The combination reflective/transmissive liquid-crystal display device may be, wherein said half-wavelength layer and a first bidirectional dichroic polarizing layer between the liquid-crystal layer in said liquid crystal layer of said half-wavelength layer are laminated, together with said liquid-crystal layer between a pair of substrates making up said liquid-crystal cell.

In a bidirectional dichroic circular polarizer according to the present invention, it is possible to absorb incident light having a circular polarization of one direction, and to transmit incident light having circular polarization of another direction.

In a liquid-crystal display device according to the present invention, by using a combination of a polarization separation layer, a half-wavelength layer, a bidirectional dichroic polarization layer, and a liquid-crystal cell, it is possible to achieve sufficient intensity and readability, regardless of whether the liquid-crystal display device is operating in the reflective mode or the transmissive mode.

The present invention provides a liquid-crystal display device which makes use of a light-absorbing type bidirectional dichroic polarizing layer at a surface visible from the outside, the retardation value of a liquid-crystal layer being changed in accordance with this dichroic polarizing layer, thereby making use of the birefringence of the liquid-crystal layer so as to achieve good contrast, without a decrease in the utilization rate of light or a decrease in contrast caused by external light, thereby preventing a worsening of the readability of the display.

BRIEF EXPLANATION OF THE DRAWINGS

FIG. 35 is a simplified cross-section view showing an alternative assembly condition of the fifth and sixth embodiments of the present invention.

DESCRIPTION OF PREFERRED EMBODIMENTS OF THE INVENTION

Preferred embodiment of the present invention are described below, with references being made to relevant accompanying drawings.

Figure 1:
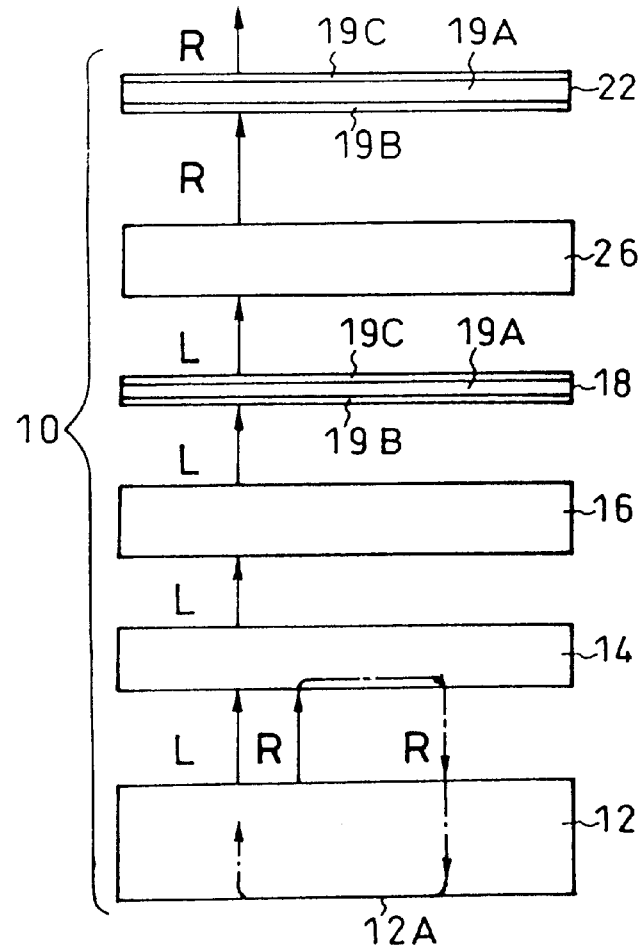
FIG. 1 is an exploded perspective view showing the main part of a combination reflective/transmissive type liquid-crystal display device according to the first embodiment of the present invention.

As shown in FIG. 1, a combination reflective/transmissive liquid-crystal display device 10 according to the first embodiment of the present invention has a light source 12 that emits nonpolarized light, a circular polarization separating layer 14 that acts as a polarization separating layer, a half-wavelength layer 16 that, in response to the on/off switching of a voltage, shifts the phase of polarized light transmitted through the circular polarization separating layer 14 or light incident from the other side by $\pi$ or passes the light without shifting it, a first light-absorbing bidirectional dichroic circular polarizing layer 18 which acts as first bidirectional dichroic polarizing layer, a liquid-crystal cell 20, the retardation value of which is changed by an applied electric field, and which acts to shift the phase of incident polarized light by substantially 0 to $\pi$, and a second light-absorbing bidirectional dichroic circular polarizing layer 22 that acts as a second bidirectional dichroic polarizing layer that receives the above-noted polarized light that has been transmitted through the liquid-crystal cell 20 or external light, these elements being disposed in the above-noted sequence.

Of the incident light from the light source 12 or that has passed through the half-wavelength layer 16, the circular polarization separating layer 14 transmits either left or right circularly (elliptically) polarized light and reflects light of the other circular (elliptical) polarization direction.

The first bidirectional dichroic circular polarizing layer 18 absorbs either left or right circularly polarized light incident thereto after having passed through the half-wavelength layer 16 or the liquid-crystal cell 20, and transmits circularly polarized light of the other polarization direction.

The second bidirectional dichroic circular polarizing layer 22 receives circularly polarized light having passed through the liquid-crystal cell 20 or external light, transmits a component having either a left or right circular (elliptical) polarization, and reflects a component having the other circular (elliptical) polarization direction.

In FIG. 1, the reference symbols R and L indicate right and left circularly polarized light.

A reflective layer 12A is formed on the rear surface of the light source 12 (bottom surface as viewed in FIG. 1). The reflective surface 12A reflects a polarized light component that has been emitted from the light source 12 and reflected by the circular polarization separating layer 14 back to the circular polarization separating layer 14 once again, whereupon the phase of the polarized light component is reversed or the polarization removed, enabling the light to be transmitted through the circular polarization separating layer 14, thereby improving the utilization rate of light.

The circular polarization separating layer 14 is made, for example, of a chlorestic liquid-crystal layer, and the first and second bidirectional dichroic circular polarizing layers 18 and 22 are made, for example, of a dichroic polarizing material such as Polaroid (TM), which transmits light polarized in the transmission axis direction and almost completely absorbs light having a polarization direction pependicular to the light transmission axis direction, onto both surfaces of which λ/4 phase shifting layers (quarter-wavelength layers) 19B and 19C are laminated, so that the lead or lag axis thereof is 45° with respect to the light-absorption axis.

Figure 2:
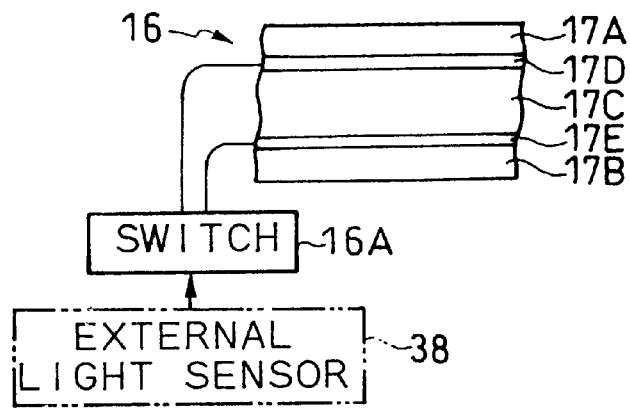
FIG. 2 is an enlarged cross-section view showing the half-wavelength layer in a combination reflective/transmissive type liquid-crystal display device according to the present invention.

The half-wavelength layer 16, as shown in FIG. 2, is made of a liquid-crystal cell (details of which are presented later), this being switched on and of by a switch 16A. When in the off condition, the mode is such that incident light is transmitted as is, and when in the on condition, the mode is such that the incident light is delayed by one half-wavelength, that is, delayed by π. As will be described below, this combination reflective/transmissive liquid-crystal display device 10 operates as a transmissive-type liquid-crystal display device when the half-wavelength layer 16 is in the transmission mode, and operates as a reflective-type liquid-crystal display device when the half-wavelength layer 16 is in the delay mode.

The liquid-crystal layer that forms the half-wavelength layer 16 is a nematic liquid crystal, a ferroelectric liquid crystal, or an anti-ferroelectric liquid crystal having a refractive index and thickness such that, when a voltage is applied, polarized light incident to the liquid-crystal layer is shifted by λ/2 (one half-wavelength). As shown in FIG. 2, the configuration is one in which a liquid-crystal layer 17C is sandwiched between to substrates 17A and 17B, adjacent to the lower surface of the upper substrate 17A and the upper surface of the lower substrate 17C, a pair of pixel electrodes 17D and 17E sandwiching the liquid-crystal layer 17C in the thickness direction. The pixel electrodes 17D and 17E have a voltage applied to them from the switch 16A.

This adjustment can be made by controlling the refractive index and the thickness of the liquid-crystal layer 17C (r=Δnd), which relationship r is the retardation, Δn is the refractive index anisotropy (change in refractive index with a change in direction), and d is the thickness.

The retardation r represents as a distance the difference in the speed of propagation of mutually perpendicular electrical field vectors when linearly polarized light strikes a substance having a refractive index anisotropy of Δn in a given direction.

The refractive index anisotropy Δn for a liquid crystal is usually expressed as the difference in refractive index between the molecular long axis and the molecular short axis directions.

If the liquid crystal molecules are not random but rather aligned in a given direction, the retardation r is proportional to the thickness d of the liquid crystal.

For example, for a liquid-crystal cell having a thickness of 0.6 μm and refractive index anisotropy Δn of 0.1, the retardation r (=Δnd) is 0.1×6 μm=600 nm, so that a phase shift of 1 λ would be imparted to light having a wavelength of 600 nm.

In the same manner, for a liquid-crystal cell having a thickness of 3 μm and a refractive index anisotropy Δn of 0.1, the retardation r is 0.1×3 μm=300 nm, so that a phase shift of λ/2 would be imparted to light having a wavelength of 600 nm.

Figure 3:
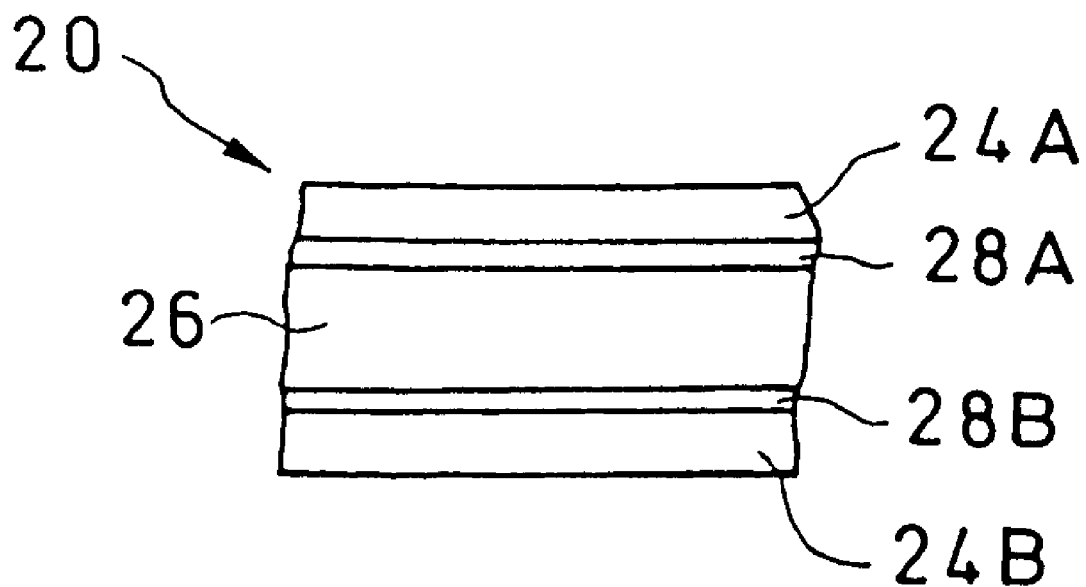
FIG. 3 is an enlarged cross-section view showing a liquid-crystal cell in a combination reflective/transmissive liquid-crystal display device according to the first embodiment of the present invention.

The liquid-crystal cell 20 is configured similarly to the half-wavelength layer 16, with a liquid-crystal layer 26 sandwiched between two substrates 24A and 24B, this being adjacent to the lower surface of the upper substrate 24A and the upper surface of the lower substrate 24B as shown in FIG. 3, a pair of pixel electrodes 28A and 28B sandwiching the liquid-crystal layer 26 in the thickness direction.

The retardation value of the liquid-crystal layer 26 in the liquid-crystal layer 20 is changed by application of an electrical field from the pixel electrodes 28A and 28B, thereby acting to shift the phase of incident circularly polarized light passing through the first or second bidirectional dichroic circular polarizing layers 18 and 22 substantially from 0 to π.

This adjustment can be performed by various known methods of controlling the refractive index and thickness of the liquid-crystal layer 26.

Such liquid crystal are known as ECB (electrically controlled birefringent) liquid crystals, there being various modes, such as the DAP (deformation of vertical aligned phases) mode, the HAN (hybrid aligned nematic) mode, the STN (super twist nematic) mode, the SBE (super twisted birefringence effect) mode, the OCB (optically compensated bend) mode, and the VAN (vertically aligned nematic) mode.

While the OCB mode usually refers to a mode in which a bend aligned liquid-crystal layer and a biaxial phase shifting sheet are sandwiched between light-absorbing type dichroic linear polarizing sheets having light-absorbing axes that are mutually perpendicular, with regard to the present invention, the term will be used to refer to the bend aligned liquid-crystal cell only.

Similarly, while the VAN mode usually refers to a mode in which a VAN aligned cell of vertically sandwiched nematic liquid crystals is sandwiched between light-absorbing type dichroic linear polarizing sheets having light-absorbing axes that are mutually perpendicular, with regard to the present invention, the term will be used to refer to the VAN aligned liquid-crystal cell only. The same thing can be said in other modes.

While the term ECB is often used to refer to a color display method which makes uses of birefringence, with regard to the present invention the term will be used to refer to a mode in which the birefringence value of a liquid-crystal layer changes.

The expression "shift the phase substantially 0 to π" refers to substantially changing the phase at the liquid-crystal layer 26 itself, or to the use of a phase shifting layer separate from the liquid-crystal cell 20, this being formed between the liquid-crystal cell 20 and the above-noted first bidirectional dichroic circular polarizing layer 18 and/or between the liquid-crystal cell 20 and the half-wavelength layer 16, the mutual interaction between the liquid-crystal layer 26 and the phase shifting layer 20 acting to substantially shift the phase of light passing therethrough by 0 to π.

For example, by changing the retardation value on the liquid-crystal layer 26 itself from 0.1 π to 1.1 π, or by the mutual interaction between the liquid-crystal layer 26 and the first bidirectional dichroic circular polarizing layer 18 and/or with a phase shifting layer having a retardation value of substantially 0.1 π provided separately on the half-wavelength layer 16 causes the phase of light passing therethrough to shift substantially from 0 to π.

The above-noted mutual interaction is the action that occurs, for example, when lead axis or lag axis of a phase shifting layer having a retardation value of substantially 0.1 π is caused to intersect perpendicularly with the lead axis or lag axis of a liquid-crystal layer when the retardation thereof is 0.1 π or 1.1 π. For example, the calculations would be 0.1 π−0.1 π=0, and 1.1 π−0.1 π=π.

It will be understood that the action of changing the phase substantially from −π to 0 is also within the scope of the present invention.

When both the half-wavelength layer 16 and liquid-crystal layer 20 cause a shift of π in the phase of circularly polarized light, the result is circularly polarized light having the opposite rotation direction.

The above-noted shift of phase is described below, with reference to the Poincare sphere shown in FIG. 4.

The Poincare sphere is used in describing polarization, and in investigating how the form of the polarization changes when the phase is changed. In FIG. 4, the poles at the top and bottom of the sphere represent left and right circular polarizations, respectively, and a point on the equator representing linear polarization, with other points representing elliptically polarized light.

An arbitrary point H on the equator indicates horizontal polarization, and the point V on other end of a diameter that passes through the point H indicates vertical polarization. The diameter of the sphere is generally taken to be 1, and can alternately be taken as representing the intensity of light.

An arbitrary point P on the surface of a unit radius Poincare sphere is represented by a latitude 2 $\lambda$ and a longitude 2 $\omega$, in which case $\lambda$ and $\omega$ satisfy the conditions $-180° < 2\lambda < 180°$ and $-90° < 2\omega < 90°$, respectively.

The latitude is taken as being positive when measured in the clockwise direction from point H, and the longitude is taken as being positive when measured upward from the equator, that is, toward the pole representing right circular polarization. The coordinates of the point P in FIG. 4, therefore, are positive.

The arbitrary point P represents total elliptical polarization, with a direction angle of $\lambda$ and a ellipticity ratio of tan $|\omega|$. The rotation to the left or right depends upon whether the point P is in the upper or lower hemisphere. Summarizing these conventions, for the cross-section view of elliptical polarization represented by the point P, the following relationships (1) and (2) obtain.

$$\alpha = \lambda \quad (1)$$

$$b/a = \tan|\omega| \quad (2)$$

The orientation of the polarization is right if 2 $\omega$ is positive, and left if 2 $\omega$ is negative. From the foregoing, it can be seen that each point on the Poincare sphere represents a different polarization. More specifically, a particular form of polarization is represented by a single point on the Poincare sphere.

Therefore, if the total left circular polarization at the upper pole of the Poincare sphere is shifted in the positive direction by $\pi/2$ at a direction angle of $\lambda=0$, the point H on the equator of the Poincare sphere will be reached. That is, circular polarization is converted to horizontal linear polarization by shifting it by $\pi/2$. In the same manner, if it is shifted in the positive direction by $\pi$, the polarization is changed to total right circular polarization, represented by the lower pole of the Poincare sphere.

If the total right circular polarization at the lower pole of the Poincare sphere is shifted by $\pi/2$ at a direction angle of $\lambda=0$, the point V on the equator, this point representing vertical linear polarization, will be reached, and if a shift of $\pi$ is made, the upper pole will be reached, this representing total left circular polarization. If the shift is not $\pi/2$ or $\pi$, the polarization is elliptical.

As described above, the circular polarization separating layer 14 is made of, for example, a cholesteric liquid crystal.

In general, the cholesteric liquid crystal exhibits such an optical rotation selection power that splitting an incident light into an optically rotary beam component along one direction and an optically rotary beam component along a reverse direction on the basis of its physical molecular arrangement, and light which is made incident on a helical axis of a planar arrangement is splitted into two circularly polarized light beams, that is, right-handed circularly polarized light and left-handed circularly polarized light. The one thereof is transmitted through the liquid crystal and the other thereof is reflected on the liquid crystal.

This phenomenon is known as circular dichroism. When for incident light, the rotation direction of the circular polarization is appropriately selected, circularly polarized light which has the same circular polarization direction as the helical axis direction of the cholesteric liquid crystal is selectively scattered and reflected.

In this case, the maximum light scattering takes place at the wavelength $\lambda 0$ according to the equation (3):

$$\lambda 0 = nav \times p \quad (3)$$

wherein p represents a helical pitch and nav represents an average refractive index of a plane perpendicular to the helical axis.

At this time, the wavelength band width of the reflected light is represented by the following equation (4):

$$\Delta\lambda = \Delta n \cdot p \quad (4)$$

$\Delta n$ is equal to $n(\|) - n$ (a right angle) wherein $n(\|)$ represents the maximum refractive index inside the plane perpendicular to the helical axis and n(a right angle) represents the minimum refractive index.

It is also known that the wavelength $\lambda_\phi$ of the light which is made incident obliquely on the helical axis of the planar arrangement is shifted to a shorter wavelength than $\lambda 0$.

It is preferred that a material of cholesteric liquid crystal is a chiral nematic liquid crystal compound wherein an optically active 2-methylbutyl group, 2-methylbutoxy group or 4-methylhexyl group is bonded to the terminal group of a nematic liquid crystal compound such as a shift base, or an azo, ester or biphenyl compound.

Generally, a high molecular liquid crystal is a high molecule wherein a mesogen group exhibiting a liquid crystal state is incorporated into its main chain, its side chain, or its main and side chains. A high molecular cholesteric liquid crystal can be obtained by, for example, introducing a cholesteryl group into the side chain.

The polarized beam splitting effect of the cholesteric liquid crystal is that one of circularly polarized light components (right-handed or left-handed rotation) is transmitted through the cholesteric liquid crystal and the other of the components is reflected on the liquid crystal.

The light source 12 is, for example, a thin transparent sheet-like white light source such as a thin-film electroluminescent source sandwiched between transparent resin sheets having transparent electrodes, with a reflective layer 12A made of a metal thin film provided on the rear surface thereof, as described above.

The light source 12 can also be a so-called edge light white light source, in which a linear light source is disposed on a light-guiding sheet.

In the above-noted combination reflective/transmissive liquid-crystal display device 10, when the half-wavelength layer 16 is in the off (transmitting) mode, of the unpolarized light emitted from the light source 12 only a left circularly polarized component L, as shown in FIG. 1, is transmitted through the circular polarization separating layer 14, the half-wavelength layer 16, and the first bidirectional dichroic circular polarizing layer 18.

In contrast, the right circularly polarized light component R is reflected at the circular polarization separating layer 14, thereby reversing its phase or removing its polarization, so that it becomes left circularly polarized light L that passes through the circular polarization separating layer 14 and is incident to the half-wavelength layer 16.

Because no voltage is applied to the liquid-crystal layer 17C of the half-wavelength layer 16, the incident left circularly polarized light L exits as is from the half-wavelength layer 16.

If polarization transmission axis of the first bidirectional dichroic circular polarizing layer 18 is caused to coincide with one of the above-noted two circular polarization directions, for example, left rotation, the left circularly polarized light L is transmitted through the first bidirectional dichroic circular polarizing layer 18 and reaches the liquid-crystal cell 20.

By applying a voltage from the pixel electrodes 24A and 24B to the liquid-crystal layer 26 in the liquid-crystal cell 20, the retardation value is changed, the result being that circularly polarized light that passes through the liquid-crystal cell 20 is shifted substantially by 0 to π by the action of the electrical field. Therefore, when the left circularly polarized light L incident to the liquid-crystal cell 20 is shifted the maximum amount of π, the rotation direction is reversed, so that the light becomes a right circularly polarized light R when it exits the liquid-crystal cell 20.

The polarization axis of the second bidirectional dichroic circular polarizing layer 22 is caused to coincide with the one of the above-noted two circular polarization directions, for example, right rotation, by controlling the electrical field applied to the liquid-crystal layer 26, it is possible to adjust the amount of right circularly polarized light R that is transmitted by the first bidirectional dichroic circular polarizing layer 18, so as to achieve a liquid crystal display function.

Described with reference to the Poincare sphere of FIG. 4, in accordance with shift amounts of 0 to π/2, π/2, and π/2 to π with a direction angle λ of 0, from the upper pole point through the equator and finally to the lower pole point, left circular polarization transitions through left elliptical polarization, horizontal linear polarization, right elliptical polarization, and then finally reaches right circular polarization.

Figure 5:
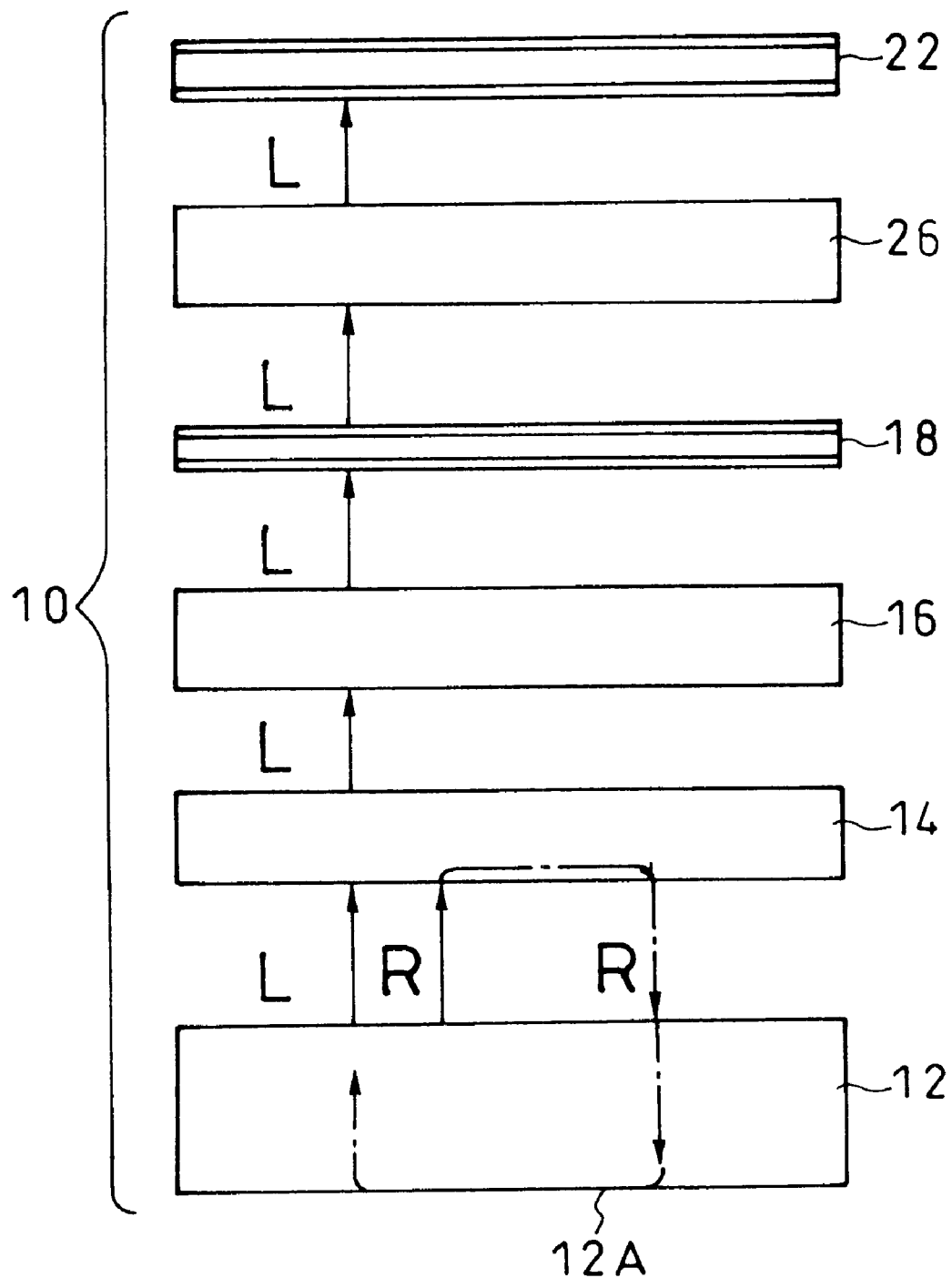
FIG. 5 is a simplified cross-section view showing the dark display condition in the transmissive mode of a combination reflective/transmissive liquid-crystal display device according to the first embodiment of the present invention.

Therefore, in the shift range of 0 to π/2, there is a transition from the dark display condition shown in FIG. 5 to a 50% transmission condition, and in the shift range from π/2 to π, the larger the shift becomes, the more light is transmitted through the second bidirectional dichroic circular polarizing layer 22, so that the light display condition shown in FIG. 1 occurs, thereby enabling display of gradations.

Because the second bidirectional dichroic circular polarizing layer 22 is a light-absorbing type dichroic polarizing sheet, even if external (unpolarized) light strikes the surface of the second bidirectional dichroic circular polarizing layer 22, 50% of the light is absorbed and the remaining 50% is transmitted, so that there is almost no reflected component, the result being a great reduction in the decrease of contrast in the combination reflective/transmissive liquid-crystal display device 10.

When the switch 16A is turned on, a voltage is applied to the half-wavelength layer 16, placing it in the delay mode, so that the combination reflective/transmissive liquid-crystal display device is switched to the reflective mode.

Figure 6:
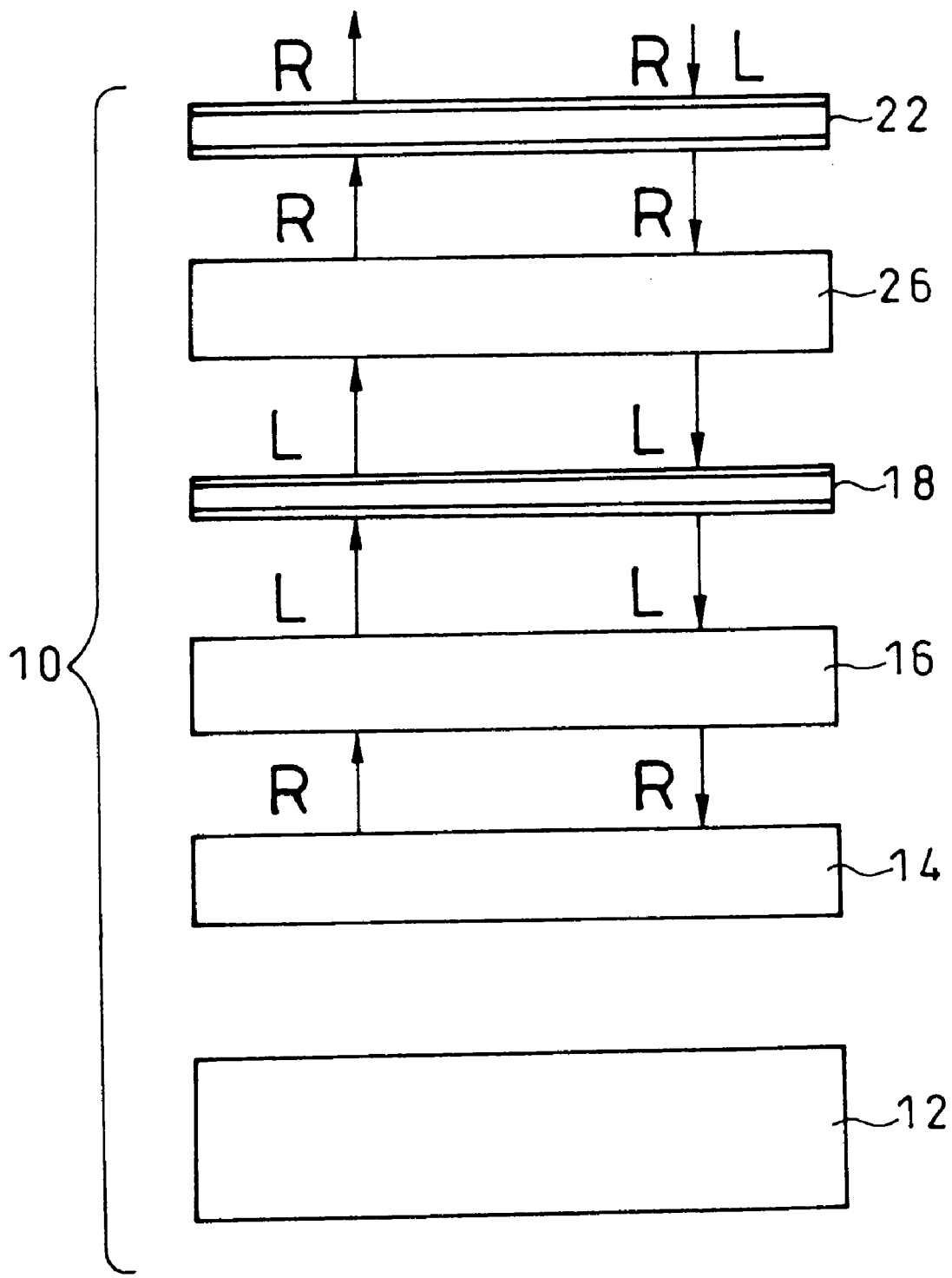
FIG. 6 is a simplified cross-section view showing the bright display condition in the reflective mode of a combination reflective/transmissive liquid-crystal display device according to the first embodiment of the present invention.
Figure 7:
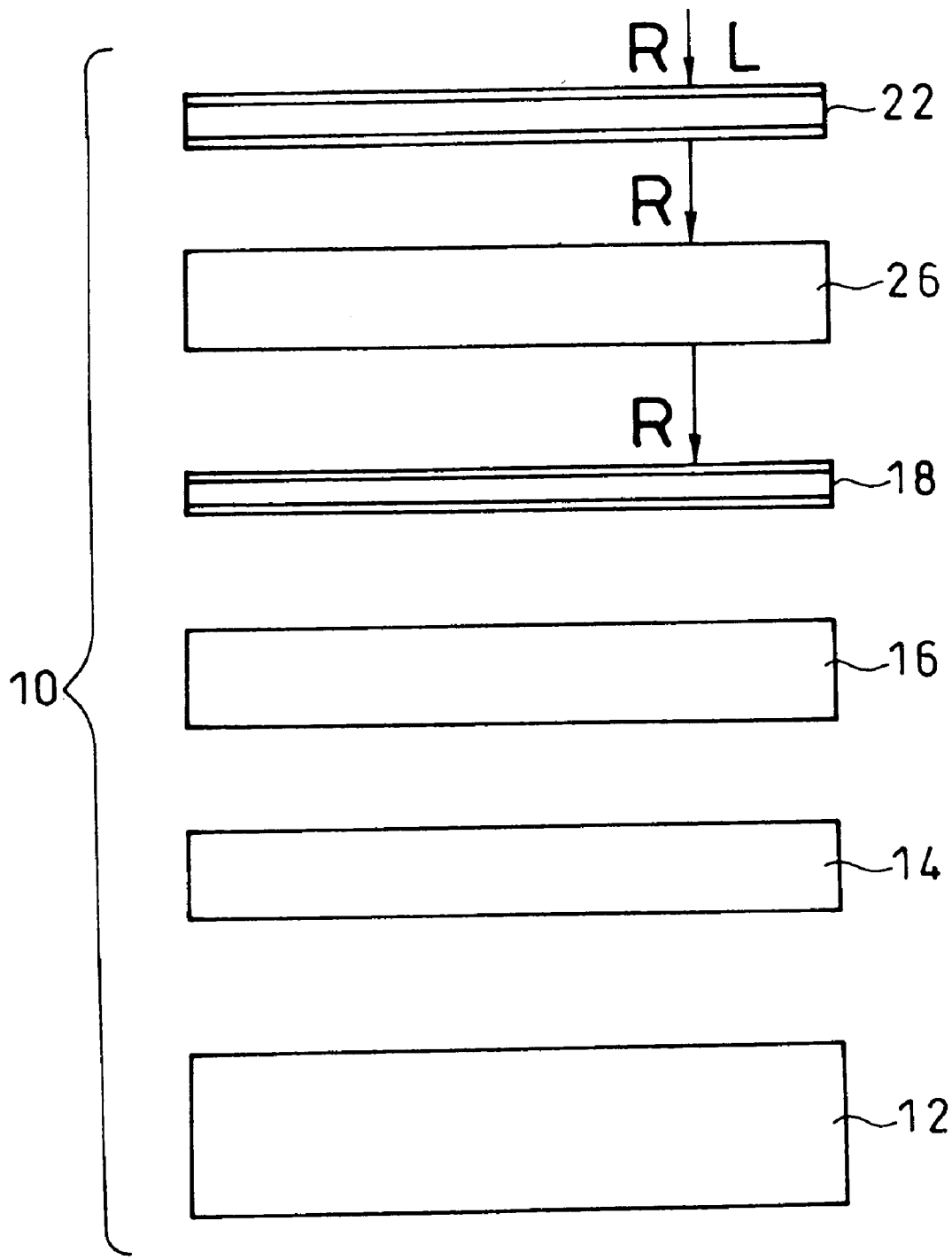
FIG. 7 is a simplified cross-section view showing the dark display condition in the reflective mode of a combination reflective/transmissive liquid-crystal display device according to the first embodiment of the present invention.

In the reflective mode, external (unpolarized) light, as shown in FIG. 6 and FIG. 7, strikes the second bidirectional dichroic circular polarizing layer 22, and of left and right circularly polarized components, only the right circularly polarized component R is transmitted and strikes the liquid-crystal cell 20. The other circularly polarized component of the external light, this being the left circularly polarized component L, is absorbed by the second bidirectional dichroic circular polarizing layer 22, so that the contrast is not reduced by reflected light.

The polarization axis of the right circularly polarized light R that is incident to the liquid-crystal layer 26 is shifted substantially 0 to π by a change in the retardation value of the liquid crystal caused by a change in the electrical field applied to the liquid-crystal cell 20.

Figure 4:
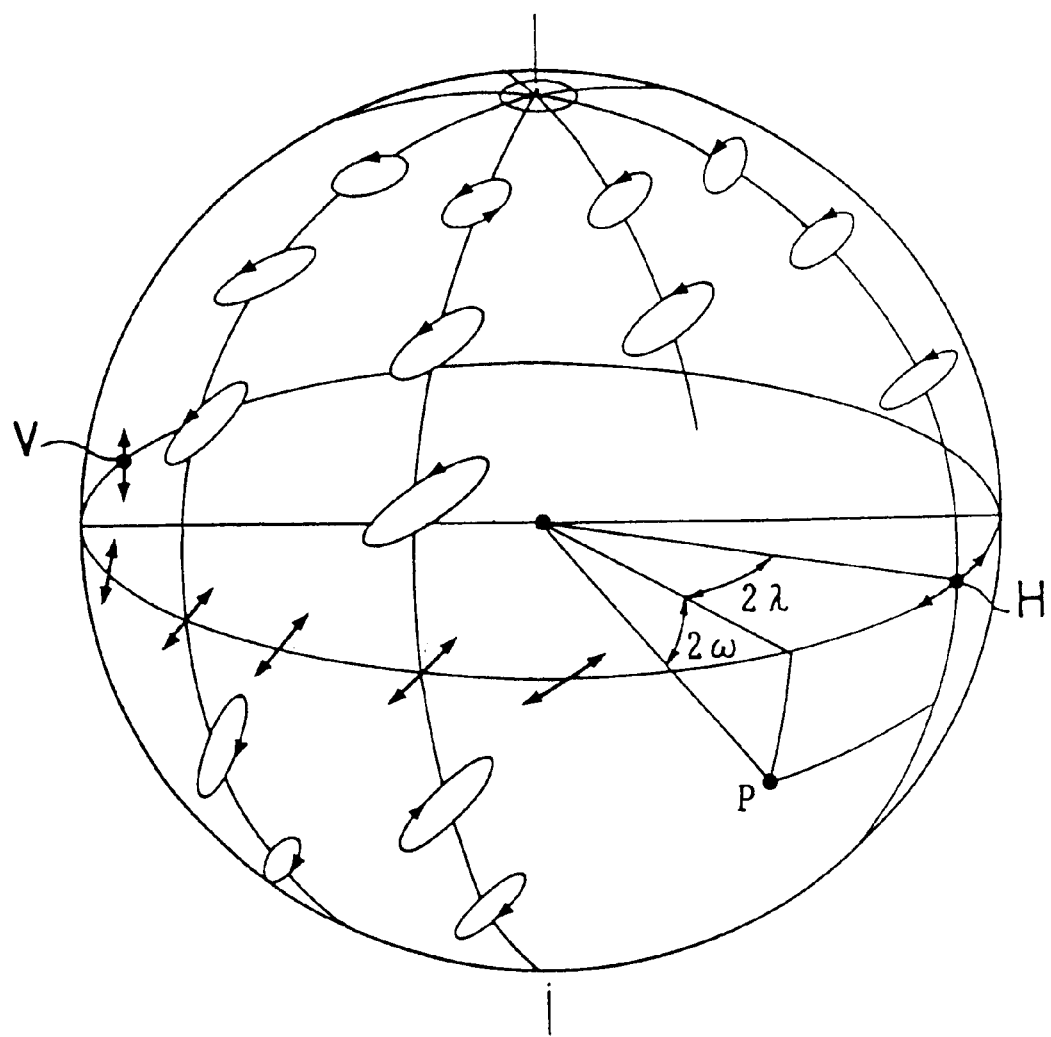
FIG. 4 is a plot showing the Poincare sphere illustrating the polarization condition of light.

Explained with regard to the Poincare sphere of FIG. 4, as shown in FIG. 6, on the Poincare sphere right circularly polarized light R incident to the liquid-crystal cell 20 transitions from the lower pole with a shift amount from 0 to π/2 to right elliptical polarization, and with a shift of π/2 becomes vertical linear polarization, represented by the point V on the equator. With a shift amount from π/2 to π, transitions to left elliptical polarization and at a shift amount of π reaches the upper pole, at which the light exits the liquid-crystal cell as left circularly polarized light directed toward the first bidirectional dichroic circular polarizing layer 18.

At the first bidirectional dichroic circular polarizing layer 18, only left circularly polarized light L is transmitted, as noted above, this light then striking the half-wavelength layer 16, with the right circularly polarized light R being absorbed.

The half-wavelength layer 16 is in the delay mode, so that light incident thereto is phase delayed by an amount of λ/2, that is, by an amount of π, so that this light exits as right circularly polarized light R, directed toward the circular polarization separating layer 14.

As described above, the liquid-crystal layer 17 in the liquid-crystal cell that makes up the half-wavelength layer 16 is made of a nematic liquid crystal, a ferroelectric liquid crystal, or an anti-ferroelectric liquid crystal. Use of a ferroelectric liquid crystal or anti-ferroelectric liquid crystal is particularly preferred because of the memory effect, whereby after a voltage is applied the condition when the voltage is applied is held, until the voltage is dropped to a certain value.

Right circularly polarized light R incident to the circular polarization separating layer 14 is reflected at that point.

Therefore, the amount of light that is reflected by the circular polarization separating layer 14 and transmitted through the liquid-crystal cell 20 can be adjusted by means of the voltage applied to the liquid-crystal layer 26.

The right circularly polarized light R that is reflected by the circular polarization separating layer 14 is converted to left circularly polarized light L by the half-wavelength layer 16 and further passes through the first bidirectional dichroic circular polarizing layer 18 as is, so as to return to the liquid-crystal cell 20 with the same polarization it had when it exited, the polarization axis being again adjusted in the range 0 to π, this light becoming either right circularly or elliptically polarized light R and exiting via the second bidirectional dichroic circular polarizing layer 22.

Next, a combination reflective/transmissive liquid-crystal display device 30 according to the second embodiment of the present invention, shown in FIG. 8, will be described.

Figure 8:
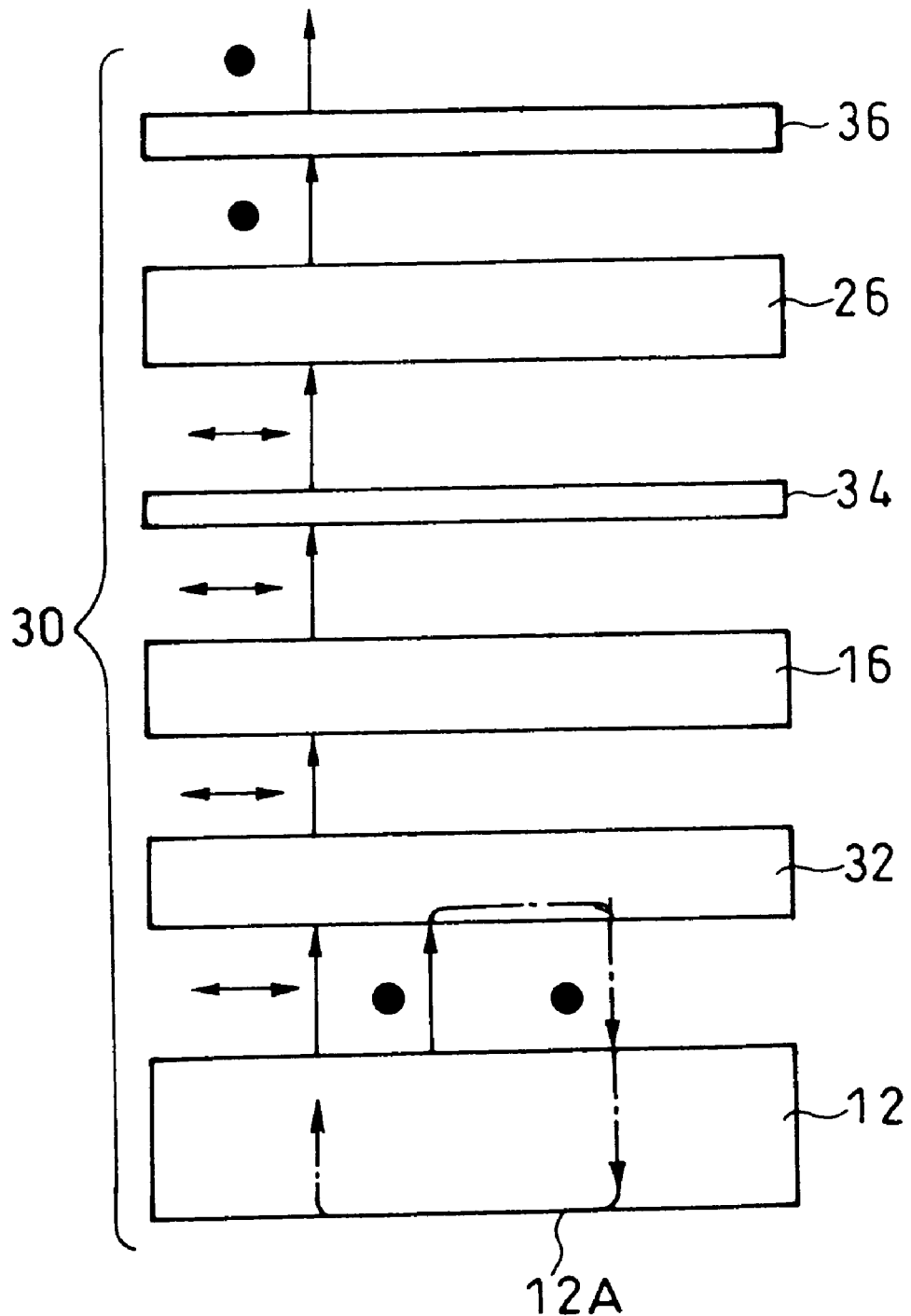
FIG. 8 is a cross-section view similar to the cross-section view of FIG. 1, but showing a combination reflective/transmissive liquid-crystal display device according to the second embodiment of the present invention.

In FIG. 8, the symbols ↔ and • are used to represent electrical field oscillation vectors of linear polarization, with ↔ representing a direction within the plane of the drawing and • representing a direction perpendicular to the plane of the drawing.

In FIG. 8, elements corresponding to elements in the combination reflective/transmissive liquid-crystal display device 10 shown in FIG. 1 are assigned the same reference numeral as in FIG. 1, and will not be explicitly described herein.

In the combination reflective/transmissive liquid-crystal display device 30 in place of the circular polarization separating layer 14 of the combination reflective/transmissive liquid-crystal display device 10 described earlier, a linear polarization separation layer 32 transmits light of only one linear polarization component and reflects a linearly polarized component in a direction that is perpendicular to that direction, and in place of the first and second bidirectional dichroic circular polarizing layers 18 and 22 are first and second bidirectional dichroic linear polarization layers 34 and 36, which, of linearly polarized incident thereto, transmit a component of one linear polarization and absorb a component of a polarization that is perpendicular to the transmitted light.

The bidirectional dichroic linear polarization layer 32 is a multilayer planar structure formed by three or more films exhibiting birefringence. In each of these layers, the difference in the refractive index between the layers adjacent to each other along its thickness direction for one of two light beams having vibration directions perpendicular to each other in a plane is different from the difference in the refractive index between the layers adjacent to each other along its thickness direction for the other of the two light beams.

As disclosed in, for example, JP-A-(TOKUKAI HEI) No. 3-75705, the above described double refraction films can be obtained by, for example, a process of extending a material having in-plane double refraction (refractive index anisotropy) such as polycarbonate resins, polyester resins, polyvinyl alcohol resins and cellulose acetate.

For example, the refractive indexes of the double refraction layers (films) are substantially the same for the light beam vibrating in the X axis direction, that is, $n_x$. Therefore, the difference in the refractive indexes between the layers adjacent to each other in the X axis direction $\Delta n_x$ ($=|n_x-n_x|$) is substantiality zero.

The refractive indexes of the first and third double refraction layers are $n_{1y}$ for the light beam vibrating in the Y axis direction, and the refractive indexes of the second double refraction layer is $n_{y2}$ ($n_{y1} \neq n_{y2}$) for the light beam vibrating in the Y axis direction. Therefore, the difference in the refractive indexes $\Delta n_y$ ($=|n_{y1}-n_{y2}|$) between the layers adjacent to each other in the Y axis direction is not substantially zero.

Polarized light is splitted by using a polarized beam splitter composed of a planar laminated structure wherein in such a manner as above the refractive index difference between the adjacent layers for the one direction of two light beams vibrating direction perpendicular to each other in a plane is different from the refractive index difference between the adjacent layers for the other direction. Namely, the reflection of the light beam vibrating in the direction along which the refractive index difference is large (for example, the Y axis direction) is larger than the reflection of the light beam vibrating in the direction along which the refractive index difference is small (for example, the X axis direction). The transmission of the light beam vibrating in the direction along which the refractive index difference is small (for example, the X axis direction) is larger than the transmission of the light beam vibrating in the direction along which the refractive index difference is large (for example, the Y axis direction).

For this reason, as seen from light vibrating in the X-axis direction, even though the linear polarization separation layer 32 is planar multilayer structure, because the refractive indexes are substantially the same, there is only a very small amount of surface reflection occurring at two locations, these being the point of incidence to the linear polarization separation layer 32 and the point at which light exits therefrom.

In contrast to this, as seen from light vibrating in the Y direction, because the refractive indexes differ between layers within the planar multilayer structure, reflections occur not only at the point of incidence of light to and exit of light from the linear polarization separation layer 32, but also at each boundary between layers thereof, the more layers there are, the more reflections there are of light vibrating in the Y-axis direction.

The first and second bidirectional dichroic linear polarization layers 34 and 36 transmit light polarized in the transmission axis direction and absorb almost all of the light in a direction that is perpendicular to the transmission axis direction, and are made of a dichroic polarizing material such as Polaroid (TM).

In the combination reflective/transmissive liquid-crystal display device 30, when in the transmitting mode, of unpolarized light from the light source 12 only one linearly polarized direction component is transmitted at the linear polarization separation layer 32, the component that is perpendicular thereto being reflected.

When the reflected linearly polarized light is reflected by the reflective layer 12A of the light source 12, or when the light is converted to unpolarized light by a light diffusing sheet disposed in the light path (not shown in the drawing), it passes through the linear polarization separation layer 32.

Linearly polarized light that has passed through the linear polarization separation layer 32 strikes the half-wavelength layer 16.

In the transmissive mode, because the switch 16A is off, and there is no voltage applied to the liquid-crystal layer 17C of the half-wavelength layer 16, the incident linearly polarized light exits as is from the half-wavelength layer 16.

If the polarization transmission axis of the first bidirectional dichroic linear polarization layer 34 is caused to coincide with one of the above-noted two polarization directions, this linearly polarized light is transmitted through the first bidirectional dichroic linear polarization layer 34 and reaches the liquid-crystal layer 20.

By applying a voltage from the pixel electrodes 24A and 24B to the liquid-crystal layer 26 in the liquid-crystal cell 20, the retardation value is changed, the result being that linearly polarized light that passes through the liquid-crystal cell 20 is shifted substantially by 0 to $\pi$ by the action of the electrical field. Therefore, when the left circularly polarized light L incident to the liquid-crystal cell 20 is shifted the maximum amount of $\pi$, the rotation direction is reversed to the perpendicular direction when it exits the liquid-crystal cell 20.

Figure 9:
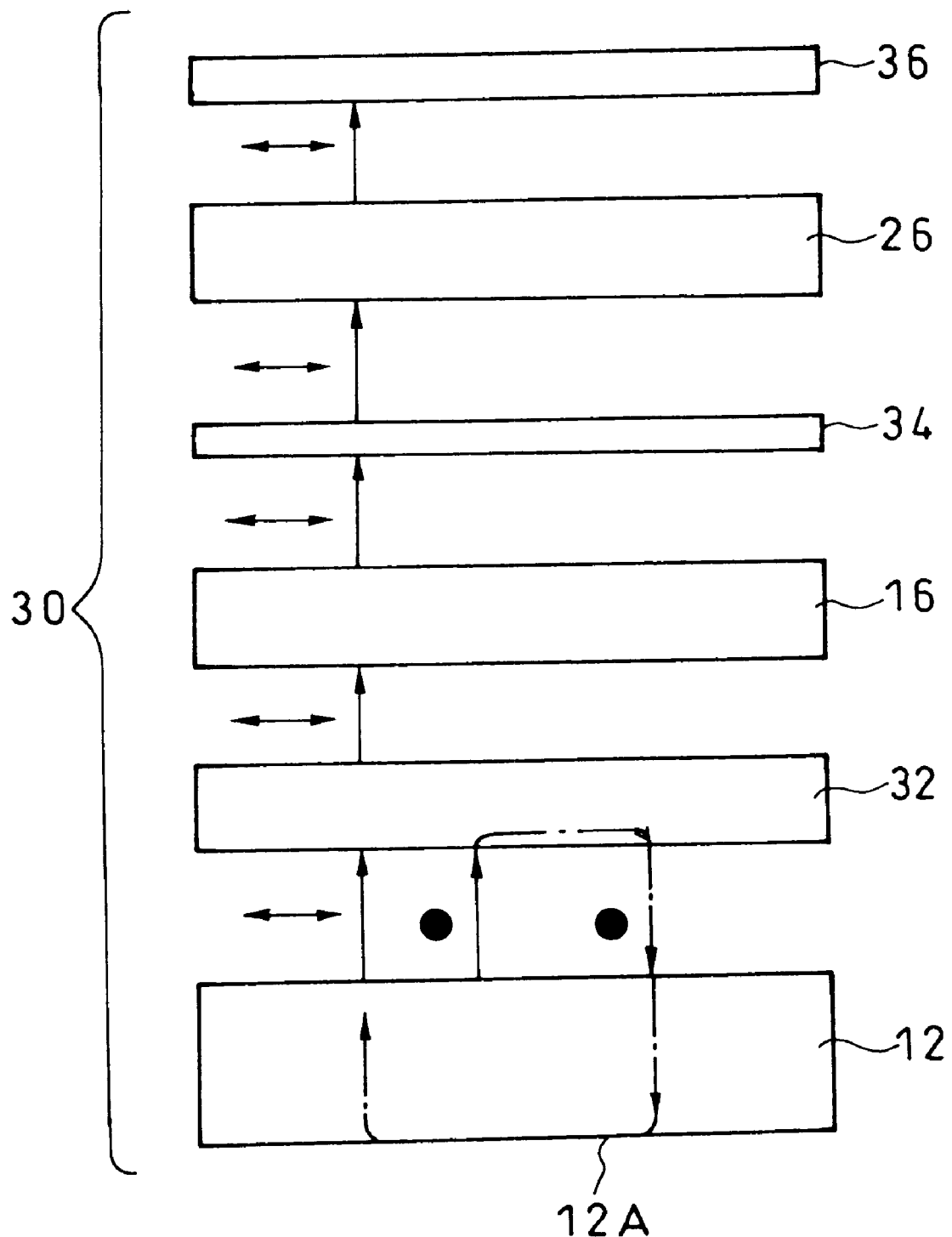
FIG. 9 is a cross-section view showing the dark display condition of the second embodiment in the transmissive mode, similar to that shown in FIG. 5.

Described with regard to the Poincare sphere of FIG. 4, in accordance with the shift from 0 to $\pi$ with a direction angle $\lambda$ of 0, from the point H on the equator, horizontal linearly polarization transitions to right elliptical polarization and then right circular polarization and right elliptical polarization, until it reaches vertical linear polarization. Therefore, the larger the shift amount is, the smaller is the amount of light that is transmitted through the second bidirectional dichroic linear polarization layer 36. The dark display condition is shown in FIG. 9.

Therefore, by controlling the voltage applied to the liquid-crystal layer 26 from the pixel electrodes 24A and 24B, it is possible to adjust the amount of light that is transmitted through the second bidirectional dichroic linear polarization layer 36, which enables a liquid-crystal display function capable of displaying gradations.

This is expressed by the following relationship.

$$I=I_o \sin^2 2\theta \sin^2(\pi d \Delta n(V)/\lambda) \tag{5}$$

In the above, I is the intensity of light transmitted through the second bidirectional dichroic linear polarization layer

36, $I_o$ is the intensity of incident light, θ is the angle that the incident light direction makes with the normal vibration direction within the liquid-crystal cell, Δn (V) and d are the refractive index with an applied voltage of V and the thickness of the liquid-crystal cell, and λ is the wavelength of the incident light. Linearly polarized light that is not transmitted by the second bidirectional dichroic linear polarization layer 36 is absorbed by this layer.

In the combination reflective/transmissive liquid-crystal display device 30, even if unpolarized external light is incident to the second bidirectional dichroic linear polarization layer 36, because 50% thereof is absorbed, it is possible to reduce the decrease in contrast caused by reflection.

Figure 10:
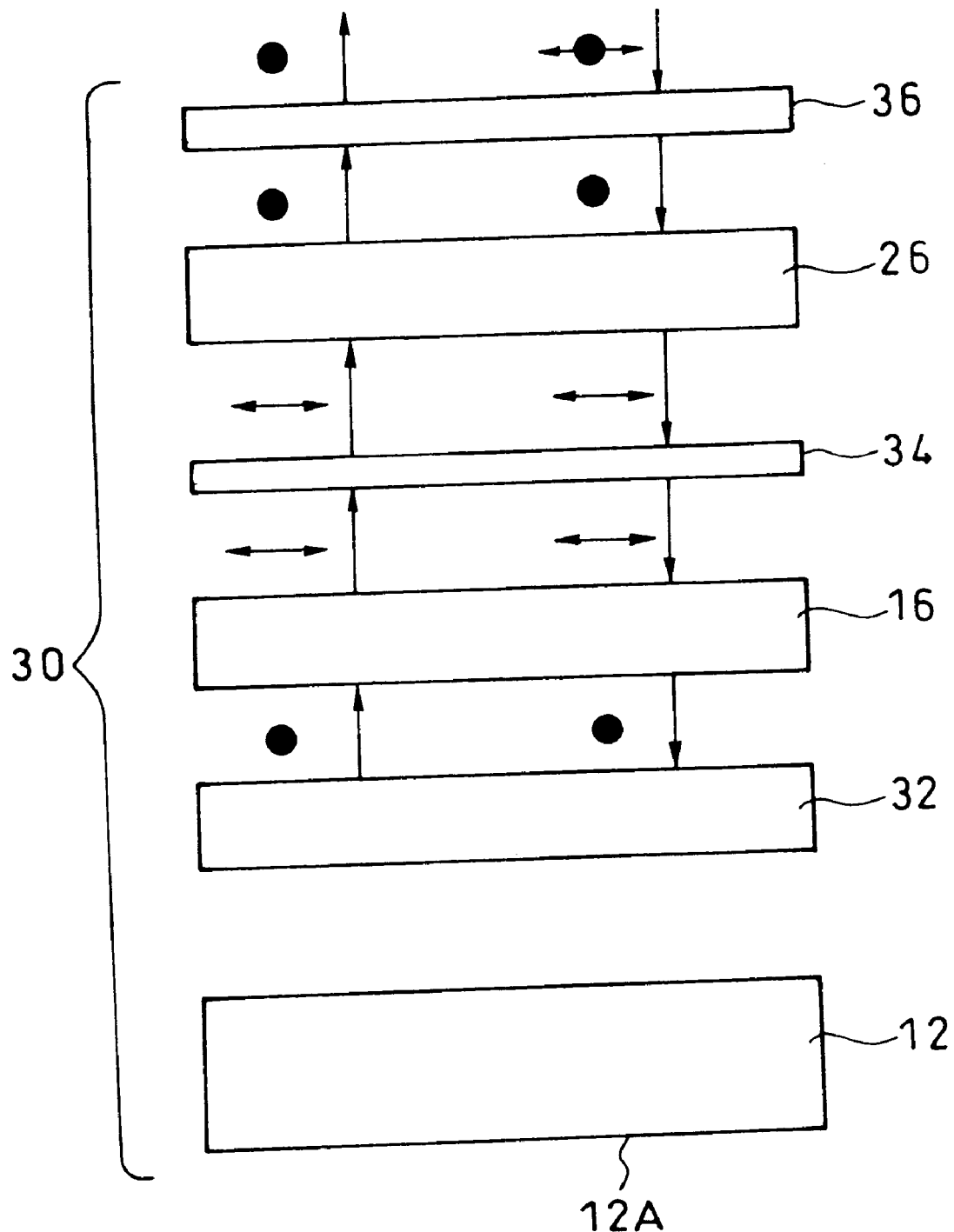
FIG. 10 is a cross-section view showing the light display condition of the second embodiment in the reflective mode, similar to that shown in FIG. 6.
Figure 11:
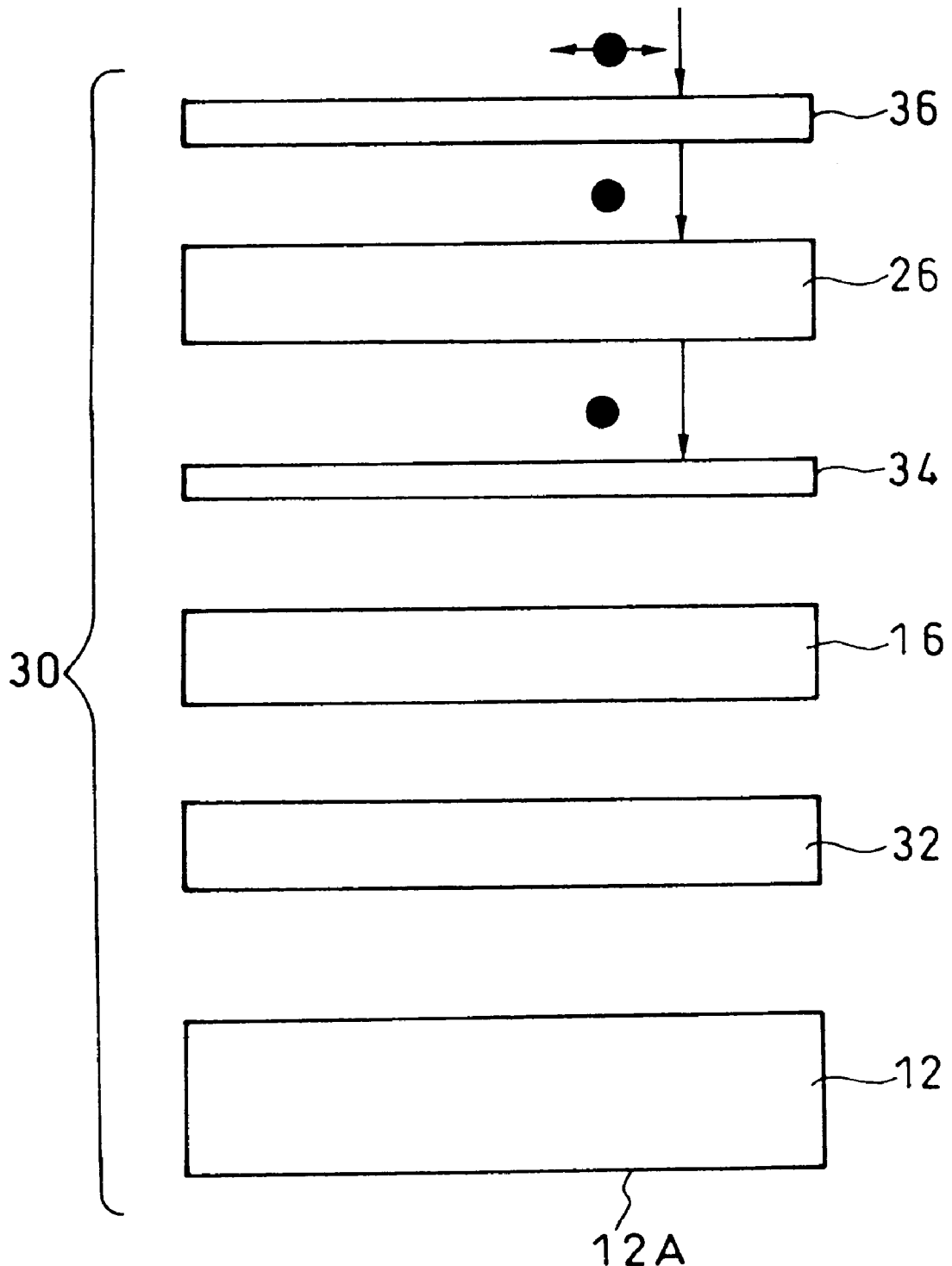
FIG. 11 is a cross-section view showing the dark display condition of the second embodiment in the reflective mode, similar to that shown in FIG. 7.

The reflective mode of the combination reflective/transmissive liquid-crystal display device 30 shown in FIG. 10 and FIG. 11 is described below.

When the switch 16A is in the on condition, a voltage is applied to the half-wavelength layer 16, placing it in the delay mode, so that the combination reflective/transmissive liquid-crystal display device 30 is switched to the reflective mode.

In this reflective mode, if external light (unpolarized light) such as shown in FIG. 10 and FIG. 11 is incident to the second bidirectional dichroic linear polarization layer 36, only one linearly polarized direction of lights indicated by the •, is transmitted so that it strikes the liquid-crystal cell 20. The other polarization component in the external light, that is, the linearly polarized light indicated by the ↔, is absorbed by the second bidirectional dichroic linear polarization layer 36, so that the screen contrast is not reduced by the reflected light.

The phase of the linearly polarized light that is incident to the liquid-crystal layer 26 is substantially shifted 0 to π by means of the changed retardation value on the liquid-crystal layer caused by the application of an electrical field to the liquid-crystal cell 26.

Described with reference to the Poincare sphere shown in FIG. 4, in accordance with the shift amount of 0 to π/2 in the positive direction, there is a transition from the point H on the equator, which represents horizontal linear polarization, to right elliptical polarization, a shift of π/2 causes a transition to total right circular polarization, represented by the lower pole point, a shift in the range π/2 to π causes a transition to right elliptical polarization, and a shift of π causes transition to vertical linear polarization.

Therefore, linearly polarized light exiting from the liquid-crystal cell 20 strikes the first bidirectional dichroic linear polarization layer 34 and at this first bidirectional dichroic linear polarization layer 34, as described above, only ↔ linearly polarized light is transmitted so as to strike the half-wavelength layer 16, with other linearly polarized light being absorbed.

Because the half-wavelength layer 16 is in the delay mode, the phase of incident light is delay by one half-wavelength, this being π, so that the light exits therefrom as • linearly polarized light directed toward the linear polarization separation layer 32. This linearly polarized light is reflected at the linear polarization separation layer 32, the reflected linearly polarized light being made ↔ linearly polarized light by the half-wavelength layer 16 and transmitted through the first bidirectional dichroic linear polarization layer 34 as is, so that it returns to the liquid-crystal cell 20 with the same polarization direction as when it exited therefrom, this light then being shifted from 0 to π, so that • linearly polarized light is transmitted through the second bidirectional dichroic linear polarization layer 36 and exits therefrom, this light being the display light.

When there is no substantial shift in phase of external light at the liquid-crystal cell 20, the dark display shown in FIG. 11 occurs.

Figure 12:
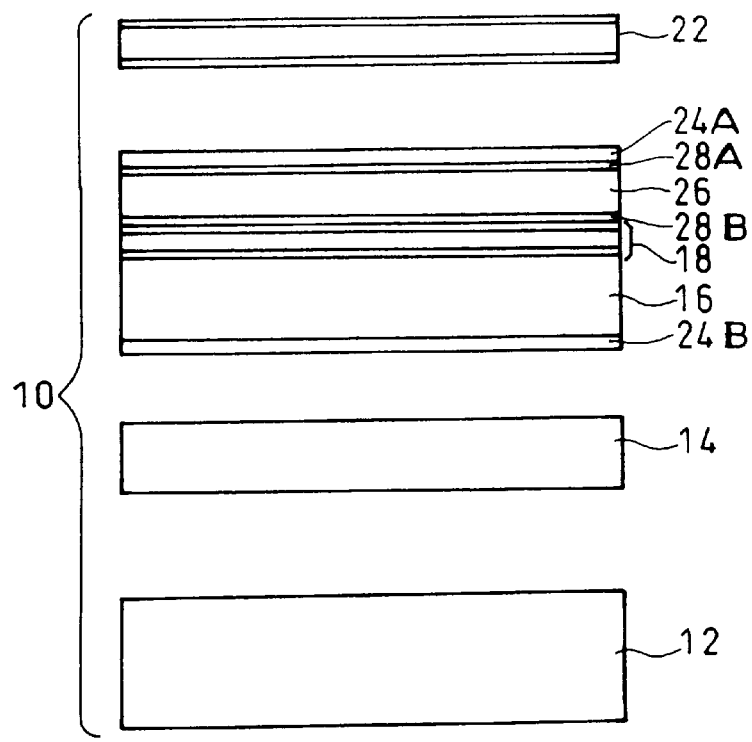
FIG. 12 is a simplified cross-section view showing an alternative assembly condition of the first and second embodiments of the present invention.
Figure 12:
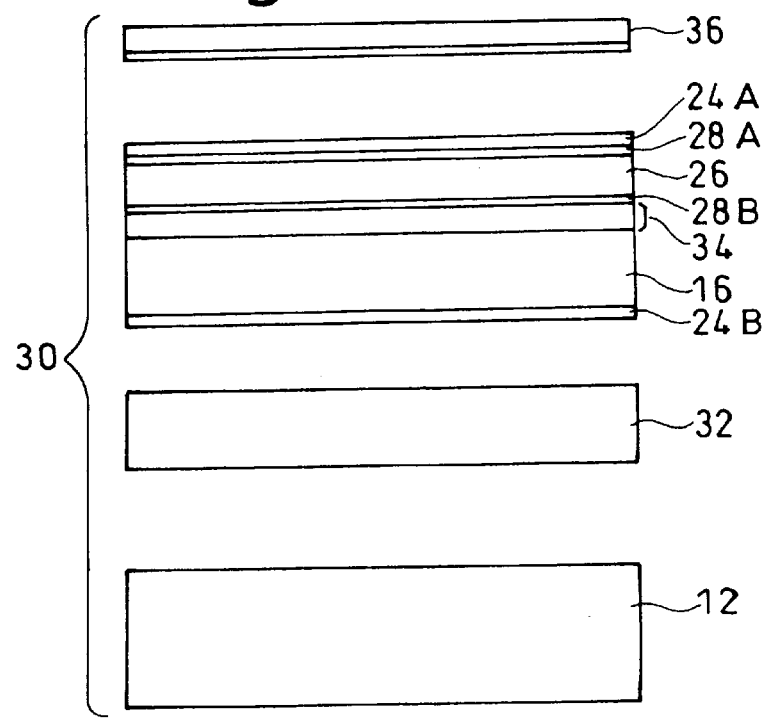

It is alternately possible to have the half-wavelength layer 16 and the first bidirectional dichroic circular polarizing layer 18 of the first embodiment, or the half-wavelength layer 16 and the first bidirectional dichroic linear polarization layer 34 of the second embodiment laminated onto the upper surface of the substrate 24B at the lower side of the liquid-crystal cell 20, and also onto the lower side of the upper substrate 24A, along with the liquid-crystal layer 26 (refer to FIG. 12). If this done, the substrates 24A, 24B become narrower, there is a reduction in parallax, thereby reducing the phenomenon of an image appearing either doubled or out of focus.

Next, a combination reflective/transmissive liquid-crystal display device 40 according to the third embodiment of the present invention, shown in FIG. 13, will be described.

In the combination reflective/transmissive liquid-crystal display device 40 in place of the liquid-crystal cell 20 of the combination reflective/transmissive liquid-crystal display device 10 described earlier, a liquid-crystal cell 42, the retardation value of which is changed by an applied electric field, and which acts to shift the phase of incident circularly polarized light from the bidirectional dichroic circular polarizing layer 18 by substantially π/2 to π/2, or another direction and in place of the second bidirectional dichroic circular polarizing layer 22 is the second bidirectional dichroic linear polarization layers 36 as in the combination reflective/transmissive liquid-crystal display device 30 shown in FIG.8.

Figure 13:
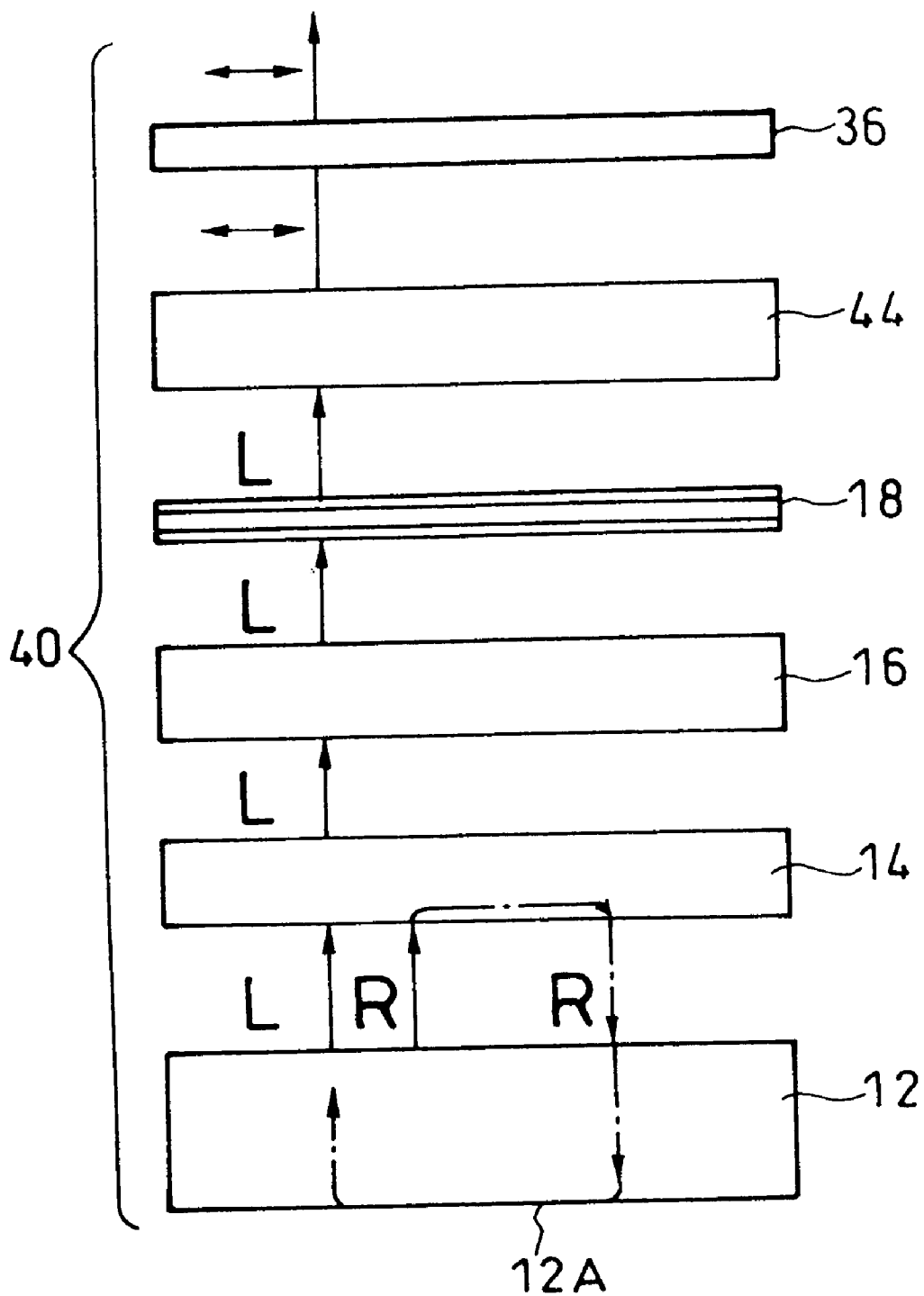
FIG. 13. is a cross-section view similar to the cross-section view of FIG. 1, but showing a combination reflective/transmissive liquid-crystal diplay device according to the third embodiment of the present invention.

In FIG. 13, elements corresponding to elements in the combination reflective/transmissive liquid-crystal display device 10 shown in FIG. 1 are assigned the same reference numeral as in FIG. 1, and will not be explicitly described herein.

Figure 14:
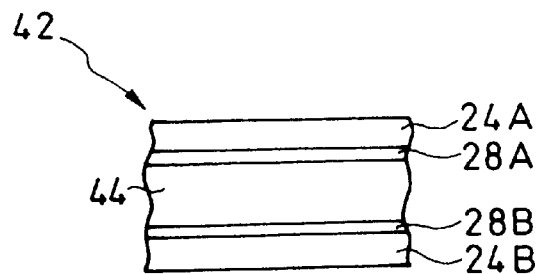
FIG. 14 is an enlarged cross-section view showing a liquid-crystal cell in a combination reflective/transmissive liquid-crystal display device according to the third embodiment of the present invention.

As shown in FIG. 14, the liquid-crystal cell 42 is configured similarly to the liquid-crystal cell 20, with a liquid-crystal layer 44 sandwiched between two substrates 24A and 24B.

The retardation value of the liquid-crystal layer 44 is changed by application of an electrical field from the pixel electrodes 28A and 28B, thereby acting to shift the phase of incident circularly polarized light passing through the bidirectional dichroic circular polarizing layers 18 or the bidirectional dichroic linear polarizing layer 36 substantially from −π/2 to π/2.

This adjustment can be performed by various known methods of controlling the refractive index and thickness of the liquid-crystal layer as like as in the liquid-crystal layer 26 shown in FIG. 3.

The expression "shift the phase substantially −π/2 to π/2" refers to substantially changing the phase at the liquid-crystal layer 44 itself, or to the use of a phase shifting layer separate from the liquid-crystal cell 42, this being formed between the liquid-crystal cell 42 and the above-noted first bidirectional dichroic circular polarizing layer 18 and/or between the liquid-crystal cell 42 and the half-wavelength layer 16, the mutual interaction between the liquid-crystal layer 44 and the phase shifting layer acting to substantially shift the phase of light passing therethrough by −π/2 to π/2.

For example, by changing the retardation value on the liquid-crystal layer 44 itself from 0 to π, by the mutual interaction between the liquid-crystal layer 44 and the bidirectional dichroic circular polarizing layer 18 and/or with a phase shifting layer having a retardation value of substantially π/2 provided separately on the half-wavelength layer 16 causes the phase of light passing therethrough to shift substantially from $-\pi/2$ to $\pi/2$.

The above-noted mutual interaction is the action that occurs, for example, when lead axis or lag axis of a phase shifting layer having a retardation value of substantially $\pi/2$ is caused to intersect perpendicularly with the lead axis or lag axis of a liquid-crystal layer when the retardation thereof is $\pi$. For example, the calculations would be $0-\pi/2=-\pi/2$, and $\pi-\pi/2=\pi/2$.

In the above-noted combination reflective/transmissive liquid-crystal display device 40, when the half-wavelength layer 16 is in the off (transmitting) mode, of the unpolarized light emitted from the light source 12 only a left circularly polarized component L, as shown in FIG. 13, is transmitted through the circular polarization separating layer 14 to the half-wavelength layer 16.

In contrast, the right circularly polarized light component R is reflected at the circular polarization separating layer 14 and the reflective layer 12A, thereby reversing its phase or removing its polarization, so that it becomes left circularly polarized light L that passes through the circular polarization separating layer 14 and is incident to the half-wavelength layer 16.

Because no voltage is applied to the liquid-crystal layer 17C of the half-wavelength layer 16, the incident left circularly polarized light L exits as is from the half-wavelength layer 16.

If polarization transmission axis of the first bidirectional dichroic circular polarizing layer 18 is caused to coincide with one of the above-noted two circular polarization directions, for example, left rotation, the left circularly polarized light L is transmitted through the first bidirectional dichroic circular polarizing layer 18 and reaches the liquid-crystal cell 42.

By applying a voltage from the pixel electrodes 24A and 24B to the liquid-crystal layer 44 in the liquid-crystal cell 42, the retardation value is changed, the result being that circularly polarized light that passes through the liquid-crystal cell 42 is shifted substantially by $-\pi/2$ to $\pi/2$ by the action of the electrical field.

Therefore, when the left circularly polarized light L incident to the liquid-crystal cell 42 is shifted $\pi/2$ so that the light becomes a linearly polarized light, and $-\pi/2$ so that the light becomes linearly polarized light perpendicular to the above when it exits the liquid-crystal cell 42.

The polarization axis of the second bidirectional dichroic linear polarizing layer 36 is caused to coincide with the one of the above-noted two linear polarization directions by controlling the electrical field applied to the liquid-crystal layer 44, it is possible to adjust the amount of right linearly polarized light that is transmitted by the first bidirectional dichroic linearly polarizing layer 36, so as to achieve a liquid crystal display function, such as a function of displaying gradiations.

Described with reference to the Poincare sphere of FIG. 4, in accordance with shift amounts of 0 to $\pi/2$, and 0 to $\pi/2$ with a direction angle $\lambda$ of 0, from the upper pole point through to the point H and V on the equator, left circular polarization transitions through left elliptical polarization, horizontal linear polarization and vertical linear polarization.

Figure 15:
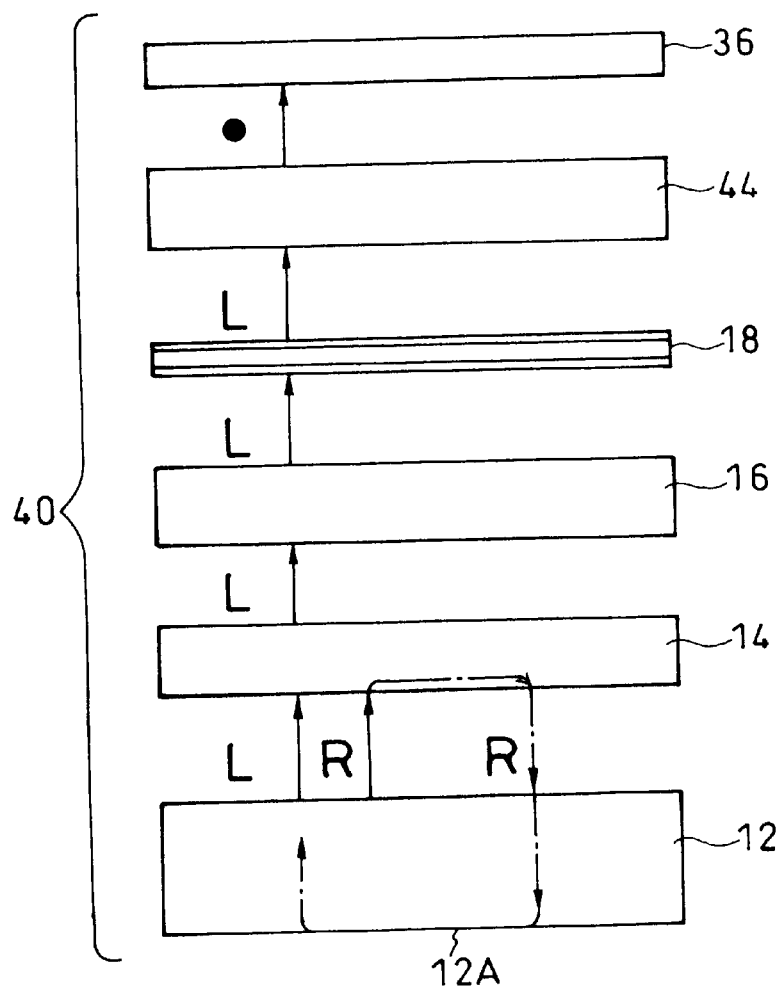
FIG. 15 is a cross-section view showing the dark display condition of the third embodiment in the transmissive mode, similar to that shown in FIG. 5.

Therefore, in the shift range of 0 to $\pi/2$, the larger the shift becomes, the more light is transmitted through the second bidirectional dichroic linear polarizing layer 44, and in the shift range from 0 to $-\pi/2$, the larger the shift becomes, the more darkness is so that the dark display condition shown in FIG. 15 occurs.

When the switch 16A is turned on, a voltage is applied to the half-wavelength layer 16, placing it in the delay mode, so that the combination reflective/transmissive liquid-crystal display device 40 is switched to the reflective mode.

Figure 16:
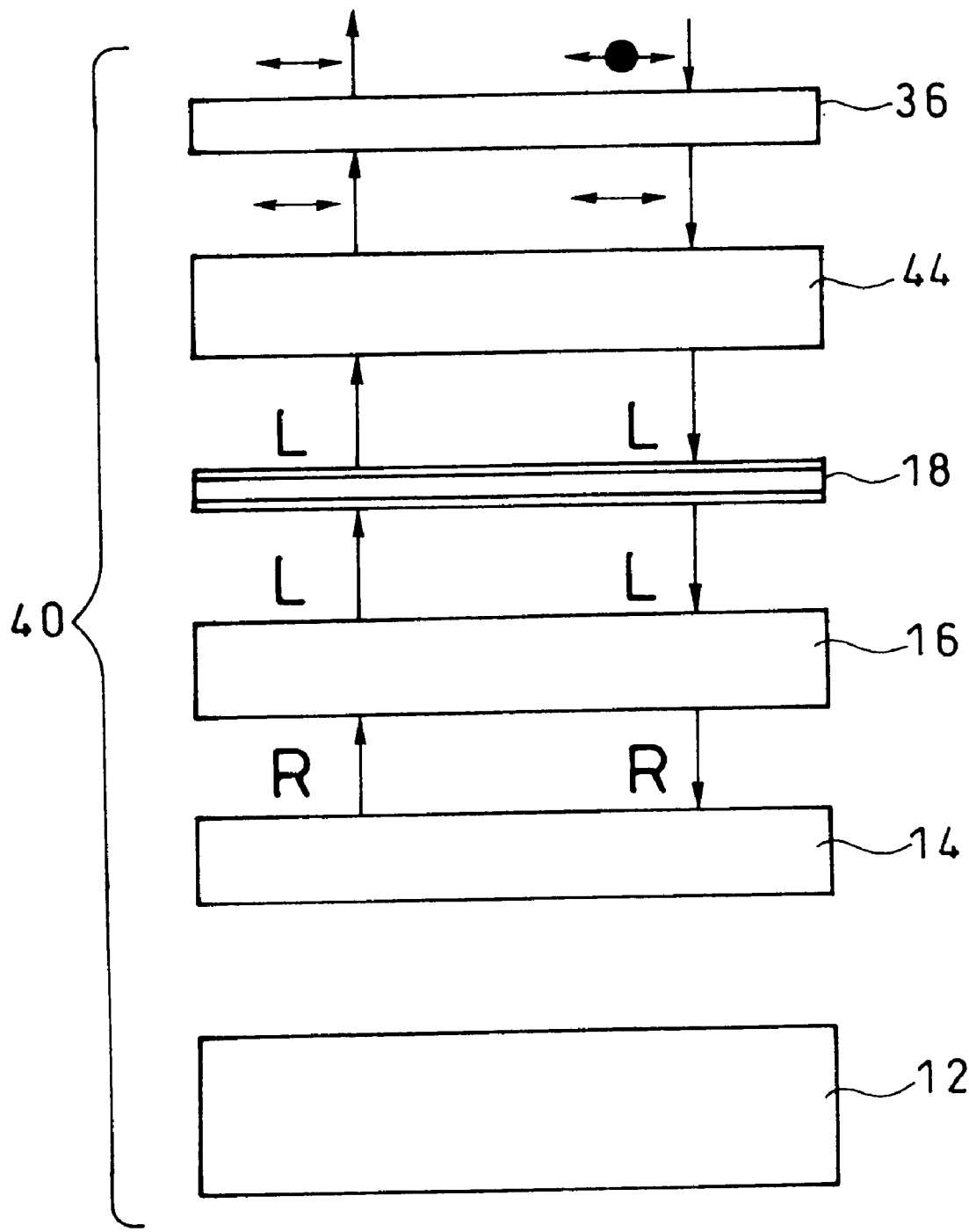
FIG. 16 is a cross-section view showing the light display condition of the third embodiment in the reflective mode, similar to that shown in FIG. 6.
Figure 17:
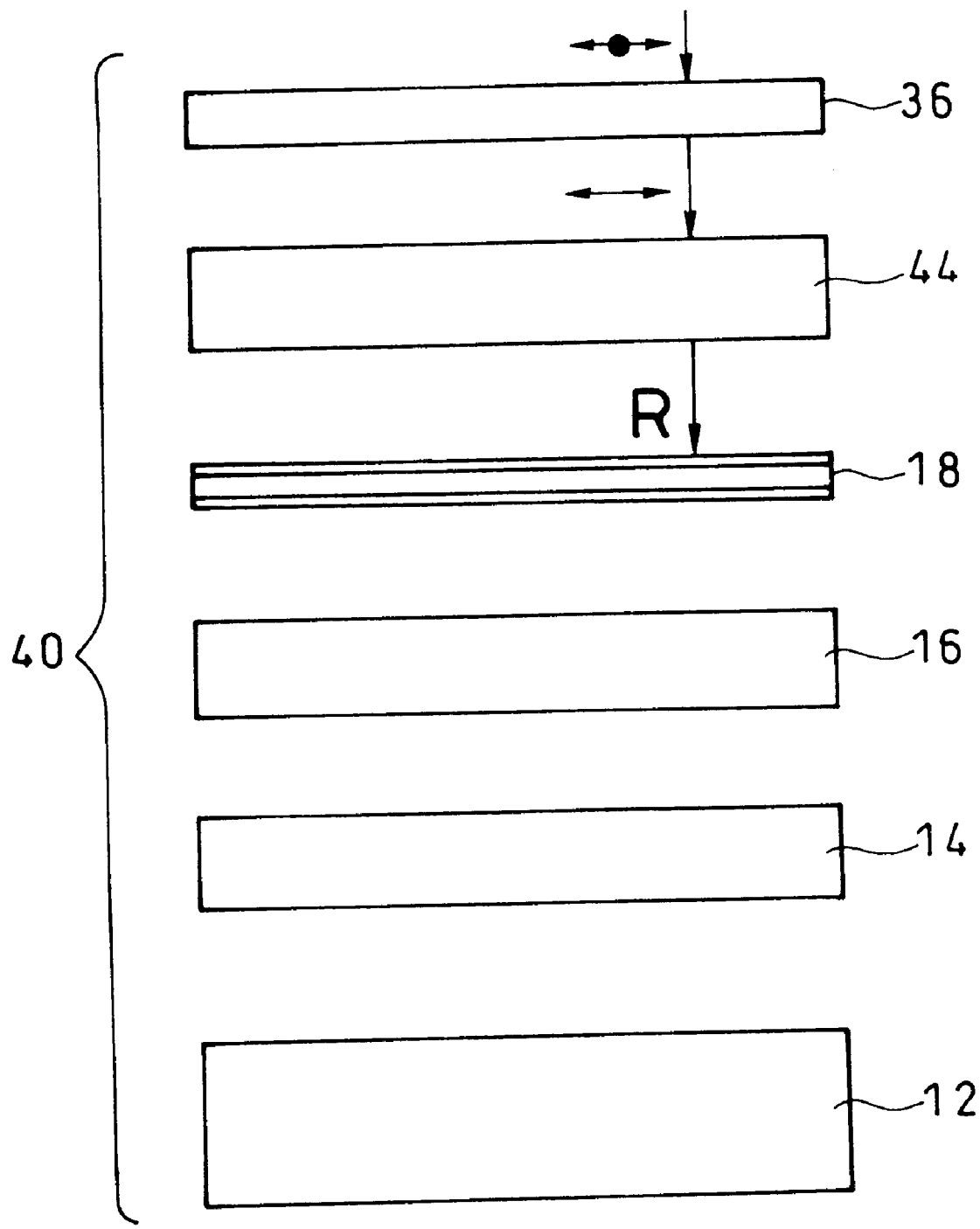
FIG. 17 is a cross-section view showing the dark display condition of the third embodiment in the reflective mode, similar to that shown in FIG. 7.

In the reflective mode, as shown in FIG. 16 and FIG. 17, external (unpolarized) light is incident to the second bidirectional dichroic linear polarization layer 36, and of this light only the one linearly polarized light component indicated by ↔ is transmitted so as to strike the liquid-crystal cell 42. The other polarization component of the external light, this being the linearly polarized light indicated by •, is absorbed by the second bidirectional dichroic linear polarization layer 36, so that there is no reduction in screen contrast caused by reflected light.

The linearly polarized light that is incident to the liquid-crystal layer 44 is shifted substantially $-\pi/2$ to $\pi/2$ by a change in the retardation value of the liquid crystal caused by a change in the electrical field applied to the liquid-crystal layer 44.

Explained with regard to the Poincare sphere of FIG. 4, the horizontal polarized light transitions from the point H on the equator with a shift amount from 0 to $\pi/2$ to right elliptical polarization, and with a shift of $\pi/2$ becomes right circularly polarization, represented by the point on the lower pole. With a shift amount from 0 to $-\pi/2$, transitions to left elliptical polarization and at a shift amount of $-\pi/2$ reaches the upper pole to left circularly polarized light.

At the first bidirectional dichroic circular polarizing layer 18, only left circularly polarized light L is transmitted, as noted above, this light then striking the half-wavelength layer 16, with the right circularly polarized light R being absorbed. Therefore, when all exit light from the liquid-crystal cell 42 become right circularly polarized light R, the dark display condition shown in FIG. 17 occurs.

The half-wavelength layer 16 is in the delay mode, so that light incident thereto is phase delayed by an amount of $\lambda/2$, that is, by an amount of $\pi$, so that this light exits as right circularly polarized light R, directed toward the circular polarization separating layer 14.

Right circularly polarized light R incident to the circular polarization separating layer 14 is reflected at that point.

Therefore, the amount of light that is reflected by the circular polarization separating layer 14 and transmitted through the liquid-crystal cell 42 can be adjusted by means of the voltage applied to the liquid-crystal layer 44.

The right circularly polarized light R that is reflected by the circular polarization separating layer 14 is converted to left circularly polarized light L by the half-wavelength layer 16 and further passes through the first bidirectional dichroic circular polarizing layer 18 as is, so as to return to the liquid-crystal cell 42 with the same polarization it had when it exited, the polarization axis being again adjusted in the range $-\pi/2$ to $\pi/2$, this light becoming linearly polarized light ↔ and exiting via the second bidirectional dichroic linear polarizing layer 36 as the display light.

Next, a combination reflective/transmissive liquid-crystal display device 50 according to the fourth embodiment of the present invention, shown in FIG. 18, will be described.

Figure 18:
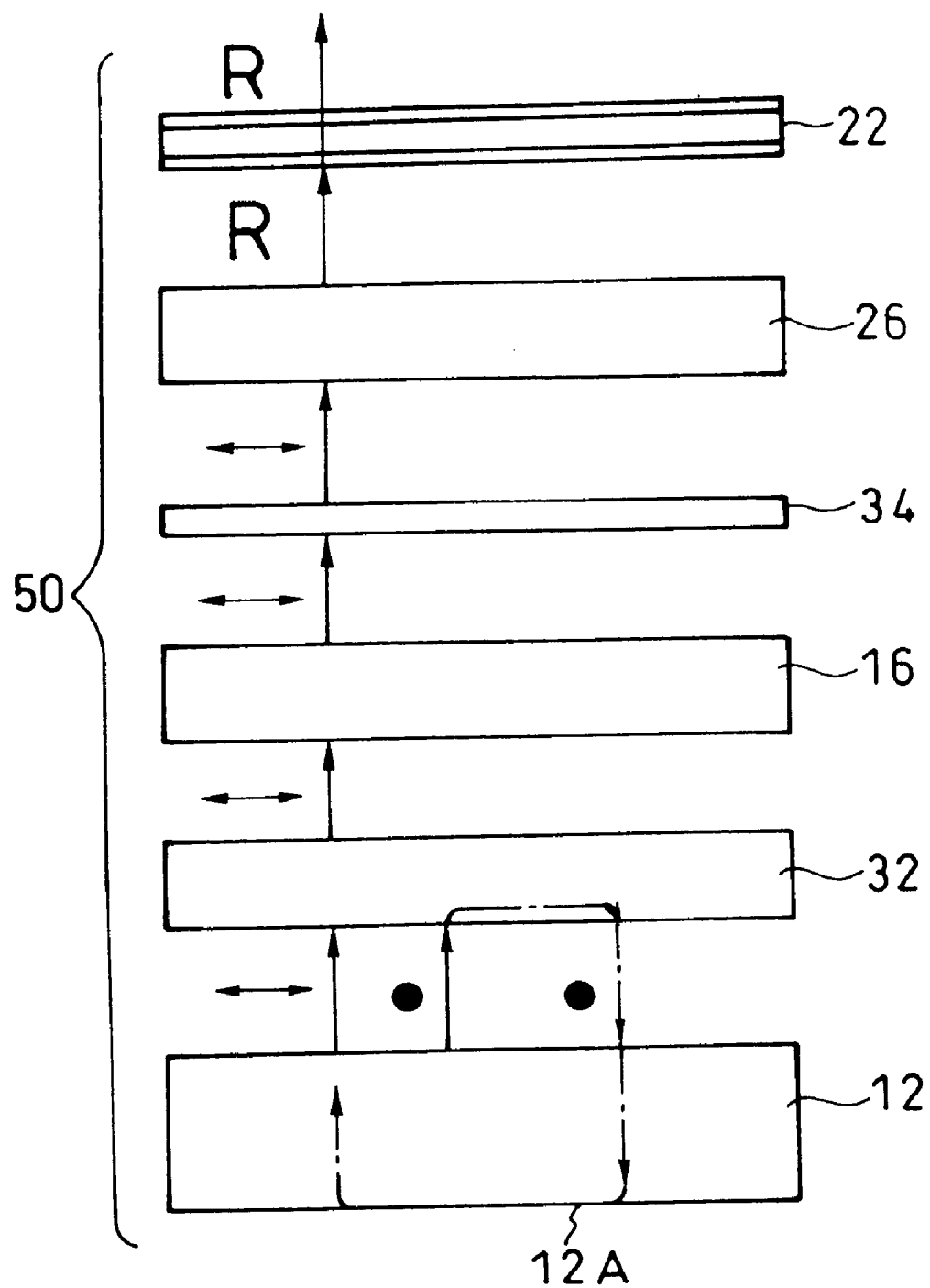
FIG. 18 is a cross-section view similar to the cross-section view of FIG. 1, but showing a combination reflective/transmissive liquid-crystal display device according to the fourth embodiment of the present invention.

In FIG. 18, elements corresponding to elements in the combination reflective/transmissive liquid-crystal display device 40 shown in FIG. 13 are assigned the same reference numeral as in FIG. 13, and will not be explicitly described herein.

In the combination reflective/transmissive liquid-crystal display device 50 in place of the circular polarization separating layer 14 of the combination reflective/transmissive liquid-crystal display device 40 described earlier, a linear polarization separation layer 32 transmits light of only one linear polarization component and in place of the bidirectional dichroic circular polarizing layer 18 and bidirectional dichroic linear polarization layer 36 are the bidirectional dichroic linear polarization layer 34 and the bidirectional dichroic circular polarizing layer 22.

In the combination reflective/transmissive liquid-crystal display device 50, of unpolarized light from the light source 12 only one linearly polarized direction component is transmitted at the linear polarization separation layer 32, the component that is perpendicular thereto being reflected.

When the reflected linearly polarized light is reflected by the reflective layer 12A of the light source 12, or when the light is converted to unpolarized light by a light diffusing sheet disposed in the light path (not shown in the drawing), it passes through the linear polarization separation layer 32.

Linearly polarized light that has passed through the linear polarization separation layer 32 strikes the half-wavelength layer 16.

In the transmissive mode, because the switch 16A is off, and there is no voltage applied to the liquid-crystal layer 17C of the half-wavelength layer 16, the incident linearly polarized light exits as is from the half-wavelength layer 16.

If the polarization transmission axis of the bidirectional dichroic linear polarization layer 34 is caused to coincide with one of the above-noted two polarization directions, this linearly polarized light is transmitted through the bidirectional dichroic linear polarization layer 34 and reaches the liquid-crystal layer 42.

By applying a voltage from the pixel electrodes 24A and 24B to the liquid-crystal layer 44 in the liquid-crystal cell 42, the retardation value is changed, the result being that linearly polarized light that passes through the liquid-crystal cell 42 is shifted substantially by $-\pi/2$ to $\pi/2$ by the action of the electrical field. Therefore, when the linearly polarized light incident to the liquid-crystal cell 42 is shifted the maximum amount of $\pi/2$, it becomes the right circularly polarized light when it exits the liquid-crystal cell 42.

Figure 19:
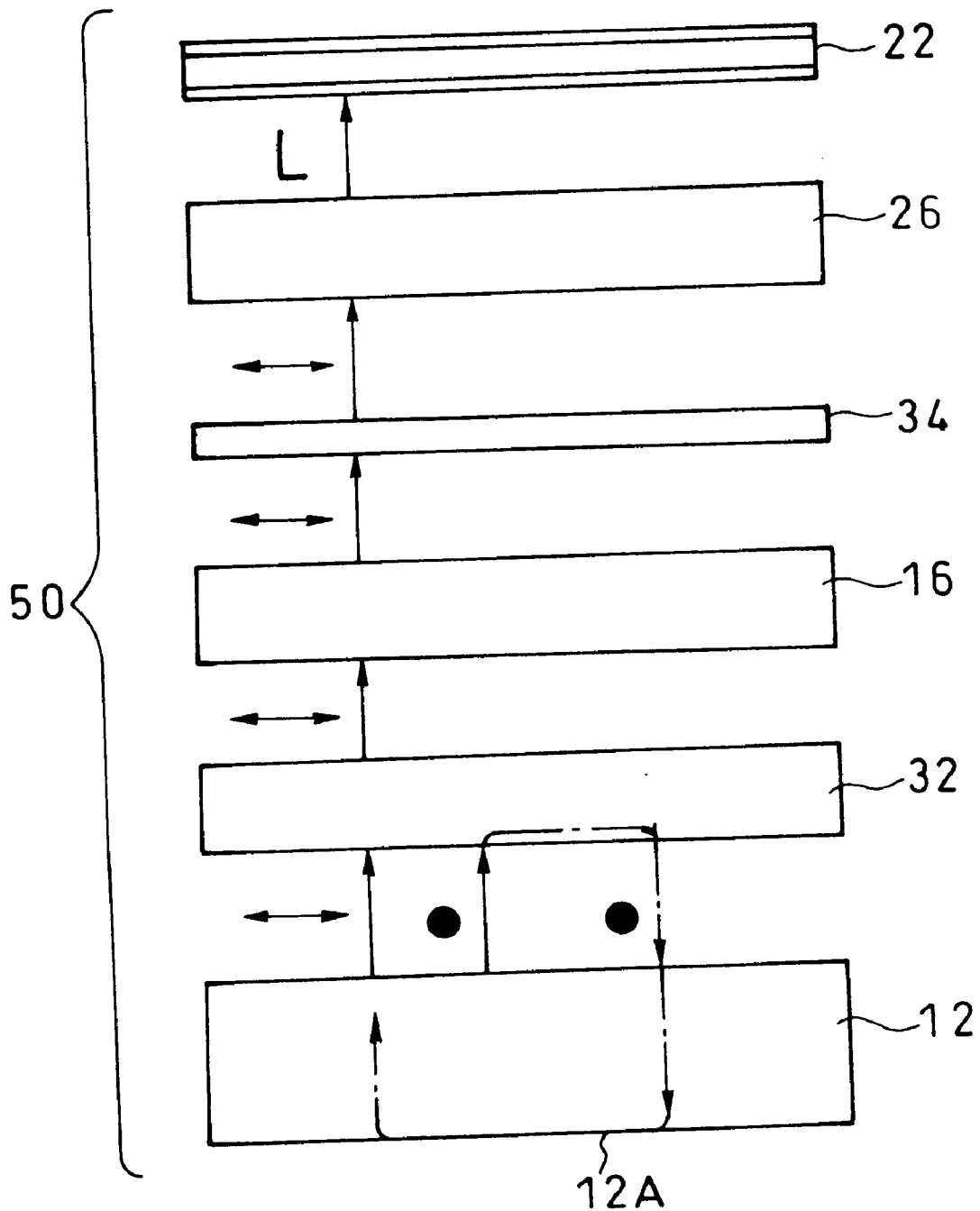
FIG. 19 is a cross-section view showing the dark display condition of the fourth embodiment in the transmissive mode, similar to that shown in FIG. 5.

Described with regard to the Poincare sphere of FIG. 4, in accordance with the shift from 0 to $\pi/2$ with a direction angle $\lambda$ of 0, from the point H on the equator, horizontal linearly polarization transitions to right elliptical polarization and then right circular polarization. Therefore, the larger the shift amount is, the larger is the amount of light that is transmitted through the bidirectional dichroic circular polarization layer 22. In accordance with the shift from $-\pi/2$ to 0, the dark display condition occurs as shown in FIG. 19.

Therefore, by controlling the voltage applied to the liquid-crystal layer 44 from the pixel electrodes 24A and 24B, it is possible to adjust the amount of light that is transmitted through the bidirectional dichroic circular polarization layer 22, which enables a liquid-crystal display function capable of displaying gradations.

In the combination reflective/transmissive liquid-crystal display device 50, even if unpolarized external light is incident to the bidirectional dichroic circular polarization layer 22, because 50% thereof is absorbed, it is possible to reduce the decrease in contrast caused by reflection.

Figure 20:
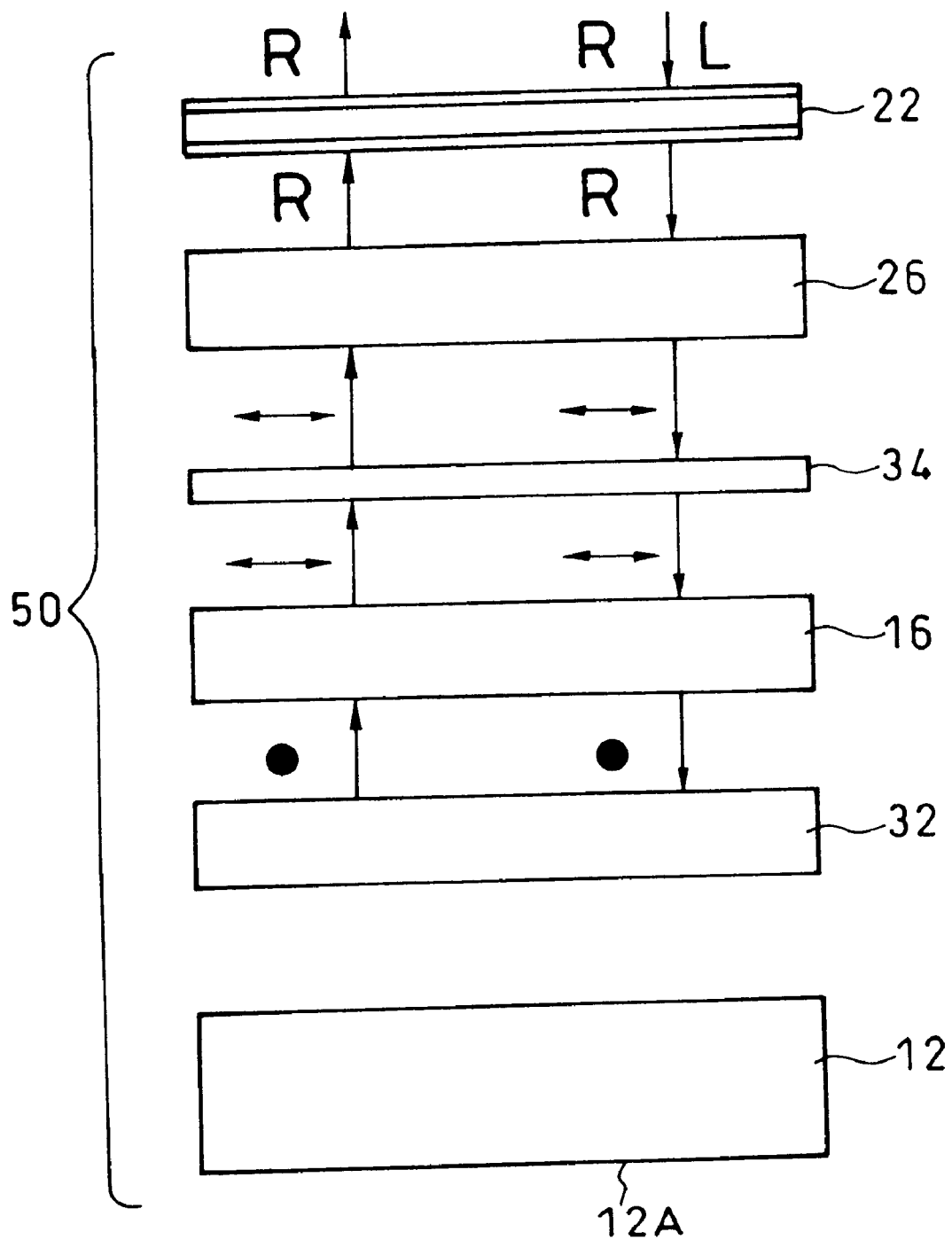
FIG. 20 is a cross-section view showing the light display condition of the fourth embodiment in the reflective mode, similar to that shown in FIG. 6.
Figure 21:
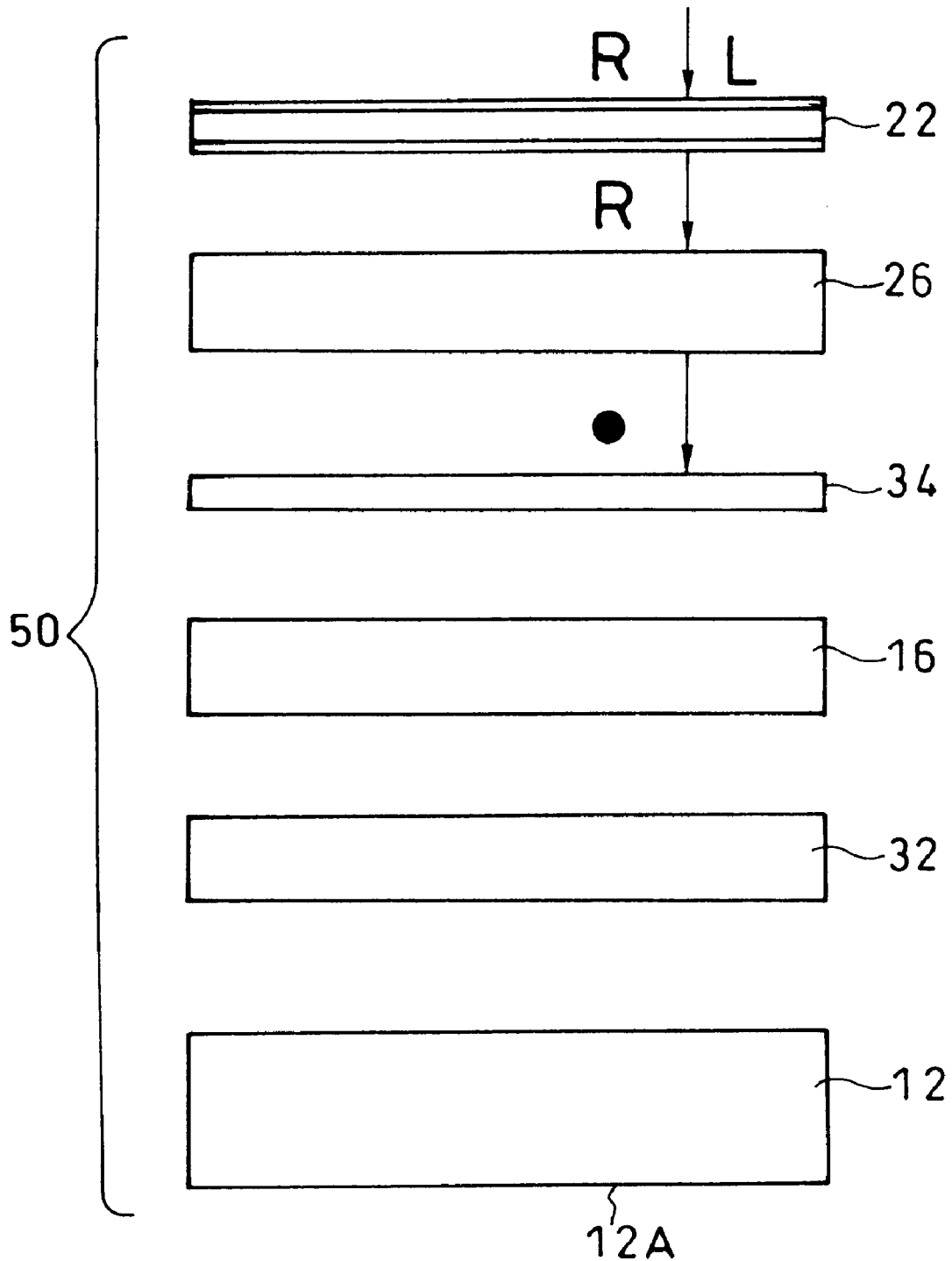
FIG. 21 is a cross-section view showing the dark display condition of the fourth embodiment in the reflective mode, similar to that shown in FIG. 7.

The reflective mode of the combination reflective/transmissive liquid-crystal display device 50 shown in FIG. 20 and FIG. 21 is described below.

When the switch 16A is in the on condition, a voltage is applied to the half-wavelength layer 16, placing it in the delay mode, so that the combination reflective/transmissive liquid-crystal display device 50 is switched to the reflective mode.

In this reflective mode, if external light (unpolarized light) such as shown in FIG. 20 and FIG. 21 is incident to the bidirectional dichroic circular polarization layer 22, only the right circular polarized light R is transmitted so that it strikes the liquid-crystal cell 42. The other polarization component in the external light, that is, the left circularly polarized light L is absorbed by the bidirectional dichroic circular polarization layer 22, so that the screen contrast is not reduced by the reflected light.

The phase of the right circularly polarized light R that is incident to the liquid-crystal layer 44 is substantially shifted $-\pi/2$ to $\pi/2$ by means of the changed retardation value on the liquid-crystal layer caused by the application of an electrical field to the liquid-crystal cell 42.

Described with reference to the Poincare sphere shown in FIG. 4, in accordance with the shift amount of 0 to $\pi/2$ in the positive direction, there is a transition from the point represented by the lower pole point, to right elliptical polarization, a shift of 0 to $\pi/2$ causes a transition to the point V on the equator, which represents vertical linear polarization, a shift in the range 0 to $-\pi/2$ causes a transition to the point on upper semisphere, and a shift of $-\pi/2$ causes transition to horizontal linear polarization.

Therefore, linearly polarized light exiting from the liquid-crystal cell 42 strikes the bidirectional dichroic linear polarization layer 34 and at this bidirectional dichroic linear polarization layer 34, as described above, only ↔ linearly polarized light is transmitted so as to strike the half-wavelength layer 16, with other linearly polarized light being absorbed.

Because the half-wavelength layer 16 is in the delay mode, the phase of incident light is delay by one half-wavelength, this being $\pi$, so that the light exits therefrom as • linearly polarized light directed toward the linear polarization separation layer 32. This linearly polarized light is reflected at the linear polarization separation layer 32, the reflected linearly polarized light being made ↔ linearly polarized light by the half-wavelength layer 16 and transmitted through the first bidirectional dichroic linear polarization layer 34 as is, so that it returns to the liquid-crystal cell 42 with the same polarization direction as when it exited therefrom, this light then being shifted from $-\pi/2$ to $\pi/2$, so that right circularly polarized light is transmitted through the bidirectional dichroic circular polarization layer 36 and exits therefrom, this light being the display light.

When there is no substantial shift in phase of external light at the liquid-crystal cell 42, the dark display shown in FIG. 21 occurs.

Figure 22A:
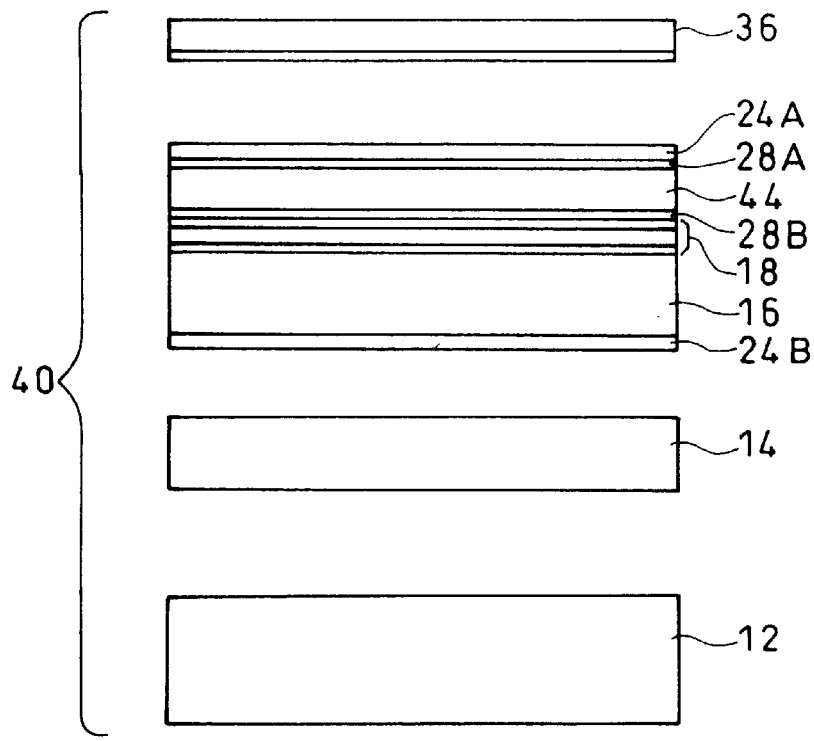
FIG. 22 is a simplified cross-section view showing an alternative assembly condition of the third and fourth embodiments of the present invention.
Figure 22B:
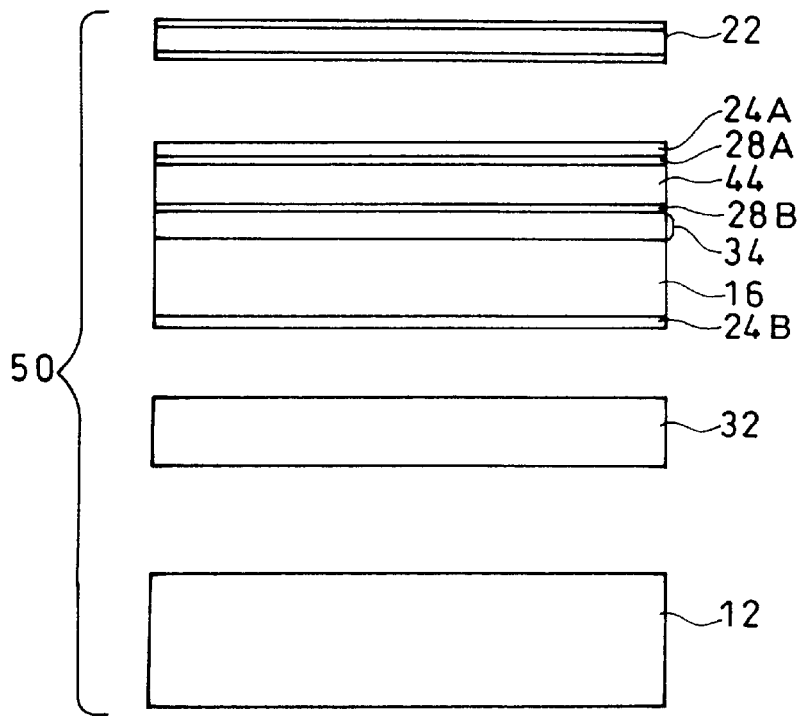

It is alternately possible to have the half-wavelength layer 16 and the bidirectional dichroic circular polarizing layer 18 of the third embodiment, or the half-wavelength layer 16 and the bidirectional dichroic linear polarization layer 34 of the fourth embodiment laminated onto the upper surface of the substrate 24B at the lower side of the liquid-crystal cell 42, and also onto the lower side of the upper substrate 24A, along with the liquid-crystal layer 46 (refer to FIG. 22). If this done, the substrates 24A, 24B become narrower, there is a reduction in parallax, thereby reducing the phenomenon of an image appearing either doubled or out of focus.

The fifth embodiment of the present invention is described below.

Figure 23:
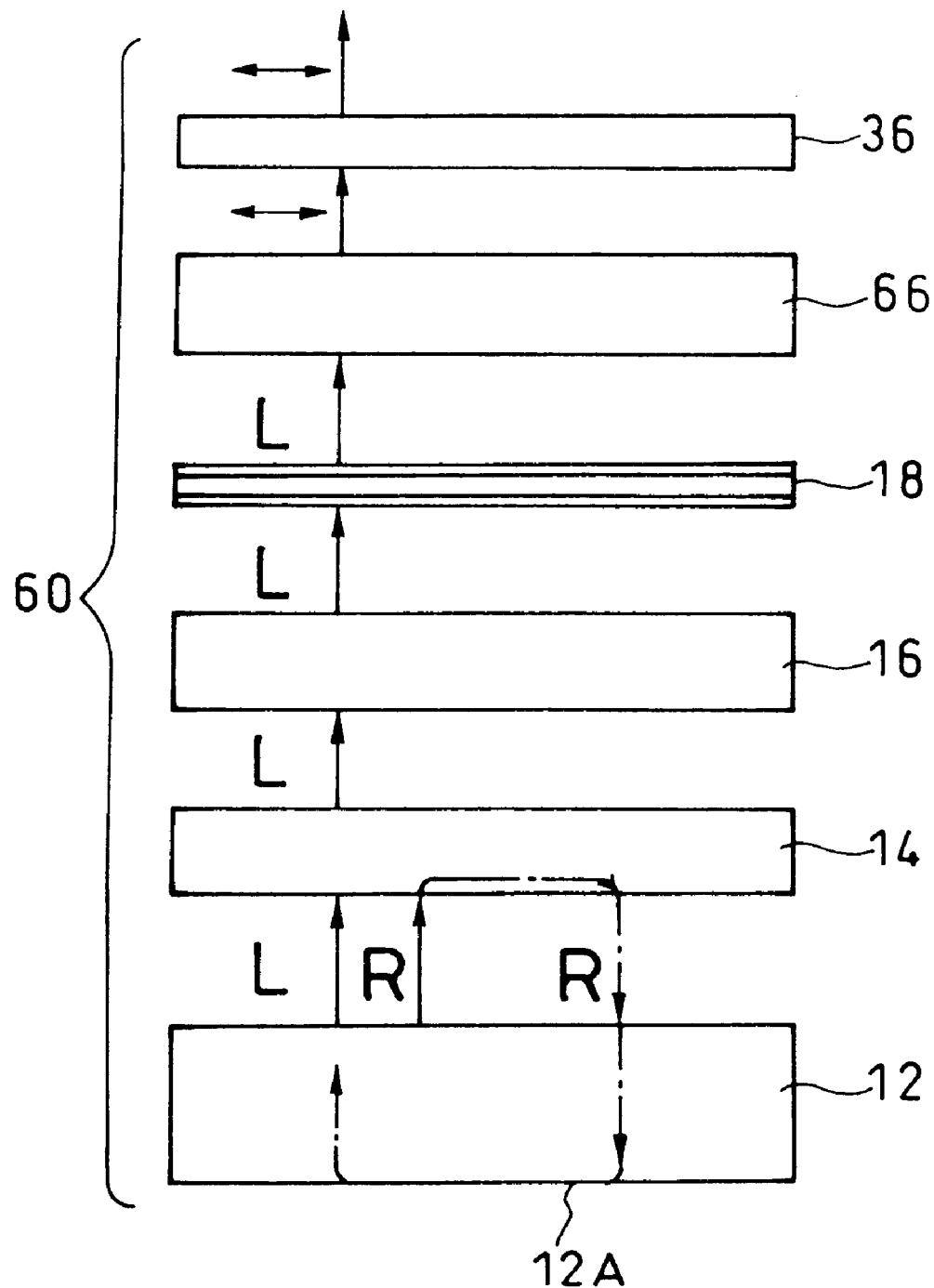
FIG. 23 is a simplified exploded cross-section view showing a combination reflective/transmissive liquid-crystal display device according to the fifth embodiment of the present invention.

As shown in FIG. 23, a combination reflective/transmissive liquid-crystal display device 60 according to the fifth embodiment of the present invention has in place of the second bidirectional dichroic circular polarizing layer 22 of the combination reflective/transmissive liquid-crystal display device 10 of FIG. 1 a bidirectional dichroic linear polarization layer 36, and has a different liquid-crystal cell 62. Other parts of the configuration of the fifth embodiment are the same as the combination reflective/transmissive liquid-crystal display device 10, and elements that correspond to elements shown in FIG. 1 have been assigned the same reference numerals, and will not be explicitly described herein.

The liquid-crystal cell 62 of the combination reflective/transmissive liquid-crystal display device 60 has a liquid-crystal layer 64 (refer to FIG. 24) having a retardation value that substantially shifts the phase of incident light by $\pi/2$, and pixel electrodes 68A and 68B that apply an electrical field to the liquid-crystal layer 64. Circularly polarized light that is incident via the circular polarization separating layer 14 is converted to linearly polarized light before it exits in the direction opposite from the circular polarization separating layer 14, and linearly polarized light that is incident from the opposite direction and linearly polarized light that exits in the direction of the first bidirectional dichroic circular polarizing layer 18 are converted to circularly polarized light, an electrical field being applied to the liquid-crystal layer 22 from the pixel electrodes 68A and 68B, so as to change the director direction of the liquid crystal, thereby changing the above-noted linearly polarized light or circularly polarized light.

Figure 24:
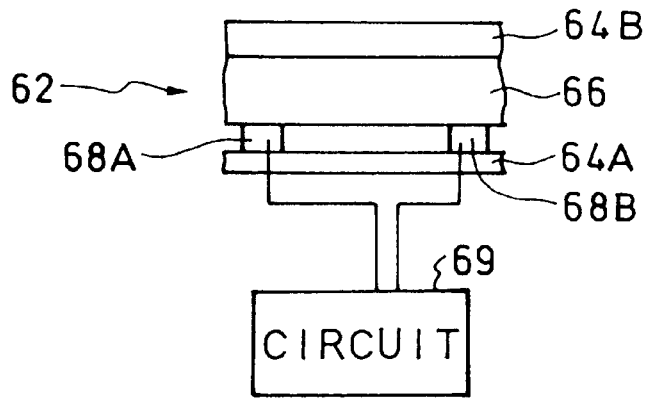
FIG. 24 is an enlarged cross-section view showing a liquid-crystal cell in the fifth embodiment of the present invention.

The liquid-crystal cell 62, as shown in FIG. 24 is formed by a liquid-crystal layer 66 sandwiched between the two substrates 64A and 64B, and two pixel electrodes 68A and 68B, which are disposed on the upper surface of the lower substrate 64B separated from one another in a direction parallel to that surface. The direction of the electrical field when a voltage is applied between the pixel electrodes 68A and 68B by the circuit 69 is substantially parallel to the surfaces of the substrates, so that the directors D of most of the liquid crystal molecules within the liquid-crystal layer 66 rotate substantially in parallel with the substrate surface, this generally being referred to as the plain switching mode.

Figure 25:
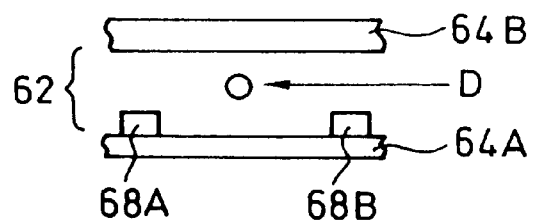
FIG. 25 is an enlarged cross-section view showing the direction of a liquid crystal director in a liquid-crystal cell of the fifth embodiment of the present invention.
Figure 26:
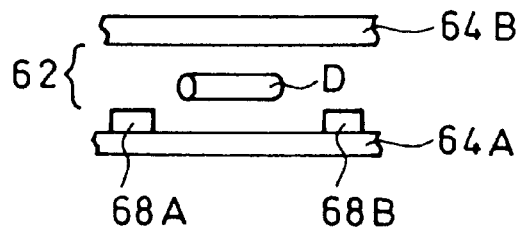
FIG. 26 is an enlarged cross-section view showing the liquid crystal director when an electric field is applied in the fifth embodiment of the present invention.

The director D direction of the liquid crystal within the liquid-crystal layer 66 is described in further detail as follows. As shown in FIG. 25, with no electrical field applied between pixel electrodes 68A and 68B, the direction of the liquid crystal director D is substantially perpendicular to the plane of the drawing and, as shown in FIG. 26, when an electrical field is applied between the pixel electrodes 68A and 68B, the director D of the liquid crystal moves so as to be substantially parallel to the plane of the drawing.

The dielectric constant anisotropy $\Delta \in$ of the liquid crystal in FIG. 25 is shown as being positive. If, however, the dielectric constant anisotropy $\Delta \in$ is negative, in the condition in which there is no electrical field applied between the pixel electrodes 68A and 68B, the liquid crystal director D direction is substantially parallel to the plane of the drawing, and when an electrical field is applied between the pixel electrodes 68A and 68B, the director D of the liquid crystal moves so as to be substantially perpendicular to the plane of the drawing.

The liquid-crystal layer 66 is adjusted so as to have a retardation value such that the phase of transmitted light is shifted substantially $\pi/2$, this retardation value being almost constant, regardless of whether or not there is an electrical field applied between the pixel electrodes 68A and 68B,. This adjustment can be performed by various known methods of adjusting the refractive index and thickness of the liquid-crystal layer, for example, using a nematic (Nn) liquid crystal. It should be noted that the direction of the liquid crystal director D is substantially parallel to the substrates 64A and 64B.

The term "substantially" in the above-noted expressions "substantially shifted $\pi/2$" and "substantially parallel to the substrates 64A and 64B" should be understood as including the case in which, for example, the pre-tilt angle of the liquid crystal and various external disturbances exhibit a slight difference from the ideal conditions.

Additionally, the expression "substantially shifted $\pi/2$" should be understood as referring to substantially changing the phase at the liquid crystal layer 66 itself or to the use of a phase shifting layer separate from the liquid-crystal cell 62, this being formed between the liquid-crystal cell 62 and the above-noted bidirectional dichroic circular polarizing layer 18 and/or between the liquid-crystal cell 62 and the half-wavelength layer 16, the mutual interaction between the liquid-crystal layer 66 and the phase shifting layer acting to substantially shift the phase of light passing therethrough by $\pi/2$.

In the example of the change of the liquid crystal director D shown in FIG. 23, when the polarization condition of circularly polarized light striking the liquid-crystal cell 62 is shifted to linearly polarization, the direction of the linear polarization axis is changed, this being a change in the direction angle $\lambda$ direction, that is, a change in latitude on the Poincare sphere shown in FIG. 4.

With regard to circular polarization, the change in the director D of the liquid crystal causes a change in the polarization axis, this being the case in which, for example, right circular polarization, represented by the upper pole of the Poincare sphere, is shifted to a point on the equator in the direction of an arbitrary longitude.

When the half-wavelength layer 16 is in the off condition (transmissive mode) the above-noted combination reflective/transmissive liquid-crystal display device 60, operates as follows.

Of the unpolarized light emitted from the light source 12, for example as shown in FIG. 23, only a left circularly polarized component L is transmitted through the circular polarization separating layer 14 so as to reach the half-wavelength layer 16.

The other, right circularly polarized, component R is reflected at the circular polarization separating layer 14, the phase of this light being reversed or the polarization of which being removed when reflected by the reflective layer 12A of the light source 12, so that it becomes left circularly polarized light L that passes through the circular polarization separating layer 14 and strikes the half-wavelength layer 16.

Because there is no voltage applied to the liquid-crystal layer 17C of the half-wavelength layer 16, the incident left circularly polarized light L exits as is from the half-wavelength layer 16.

If the polarization transmission axis of the bidirectional dichroic circular polarizing layer 18 is caused to coincide with the one of the above-noted rotation directions, for example that of left rotation, the left circularly polarized light L is transmitted through the bidirectional dichroic circular polarizing layer 18 and reaches the liquid-crystal cell 62.

The left circularly polarized light transmitted through the liquid-crystal cell 62, upon passing therethrough, is substantially shifted $\pi/2$, regardless of whether or not there is an electrical field applied. Therefore, circularly polarized light incident to the liquid-crystal cell 62 exits from the liquid-crystal cell 62 as linearly polarized light.

In the same manner, by applying a voltage from the pixel electrodes 68A and 68B to the liquid-crystal layer 66, the direction the liquid crystal director D is changed without changing the retardation value, thereby enabling modulation of the polarization axis of the polarized light transmitted therethrough, this enabling the display of gradations.

It is preferable to provide a circuit 69, which controls the voltage between the electrodes so that, in the case in which circularly polarized light strikes the liquid-crystal layer 66, the director direction of the liquid crystal is shifted −45 to +45 degrees with respect to the light transmission axis of the bidirectional dichroic linear polarization layer as a reference.

If the polarization transmission axis of the bidirectional dichroic linear polarization layer 36 is caused to be either parallel or perpendicular to the polarization axis of linearly polarized light exiting from the liquid-crystal cell 62, by controlling the electrical field applied to the liquid-crystal layer 62 using the circuit 69, so that the electrical field causes a change of substantially −45 to 45 degrees in the direction of the director of the liquid crystal with respect to the linear polarization axis of the bidirectional dichroic linear polarization layer 36, it is possible to adjust the amount of light transmitted through the bidirectional dichroic linear polarization layer 22 from a maximum value to a minimum value, thereby enabling a high-quality liquid-crystal display function, such as a function of displaying gradations.

Figure 27:
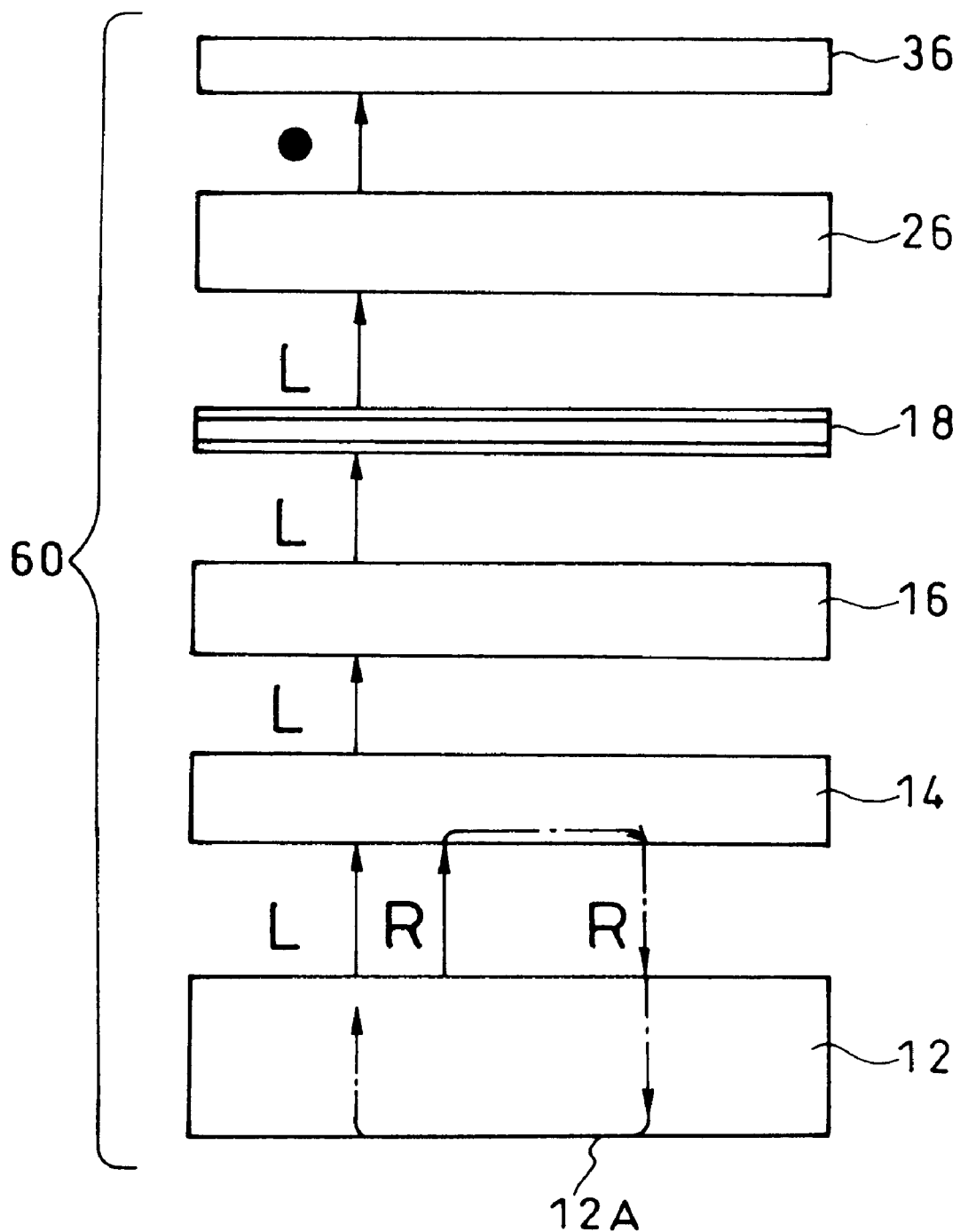
FIG. 27 is a simplified cross-section view showing the dark display condition in the transmissive mode of a combination reflective/transmissive liquid-crystal display device according to the fifth embodiment.

While FIG. 23 shows the so-called light display condition of linearly polarized light exiting from the bidirectional dichroic linear polarization layer, if the direction of the director D of the liquid crystal within the liquid-crystal cell 62 is made a direction that is perpendicular to the polarization direction of linearly polarized light exiting from the liquid-crystal cell 62 as shown in FIG. 27, the so-called dark display condition occurs.

Because the bidirectional dichroic linear polarization layer 36 is a light-absorbing type of dichroic polarizer, even if external (unpolarized) light strikes this layer, 50% thereof is absorbed, the remaining 50% being transmitted, so that there is almost no reflected component, there enabling a great reduction in the decrease of screen contrast in the combination reflective/transmissive liquid-crystal display device 60.

If the switch 16A is turned on, a voltage is applied to the half-wavelength layer 16, thereby placing it in the delay mode, so that the combination reflective/transmissive liquid-crystal display device operates in the reflective mode.

Figure 28:
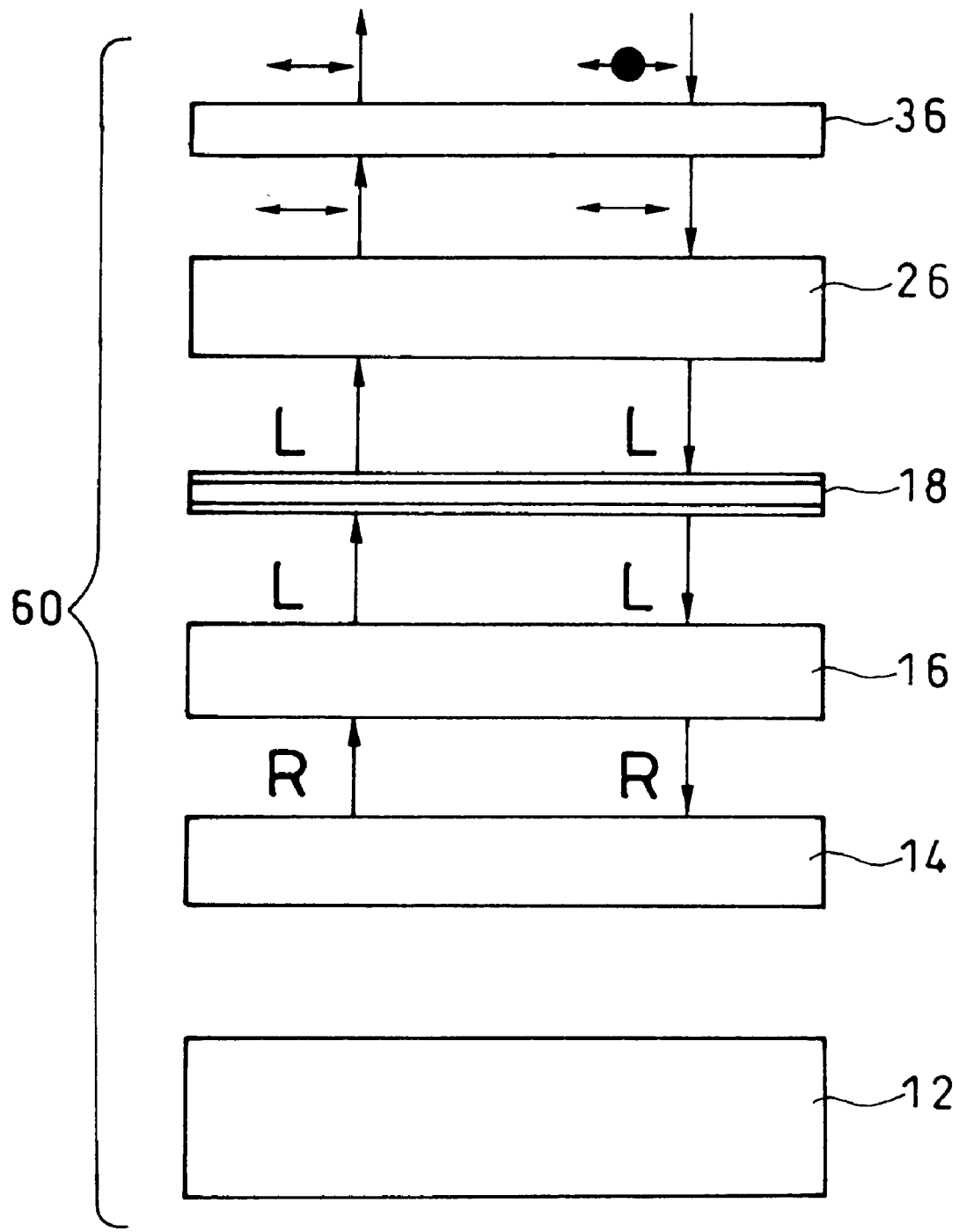
FIG. 28 is a simplified cross-section view showing the light display condition in the reflective mode of a combination reflective/transmissive liquid-crystal display device according to the fifth embodiment.
Figure 29:
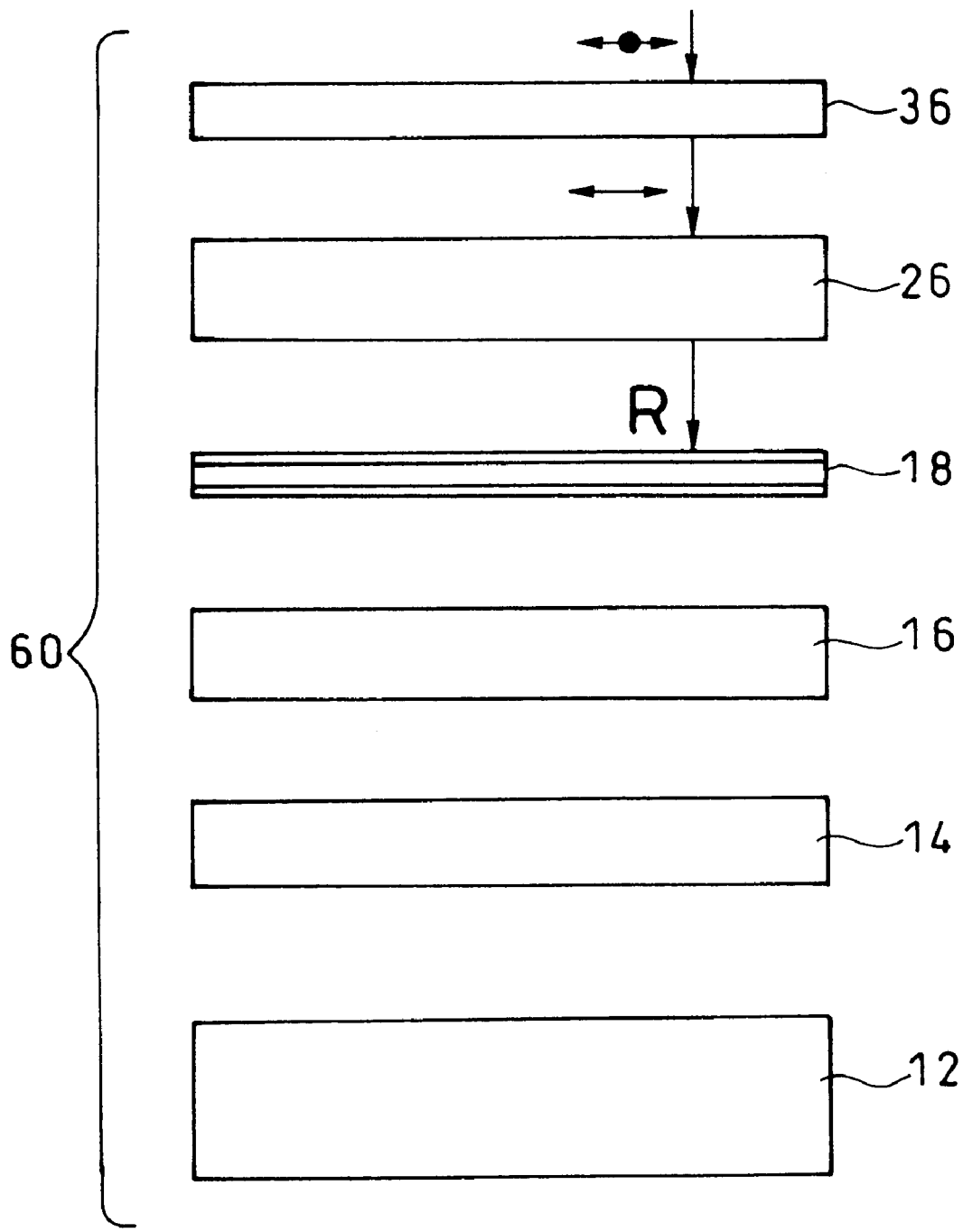
FIG. 29 is a simplified cross-section view showing the dark display condition in the reflective mode a combination reflective/transmissive liquid-crystal display device according to the fifth embodiment.

In this reflective mode, as shown in FIG. 28 and FIG. 29 external (unpolarized) light is incident to the bidirectional dichroic linear polarization layer 36, with only one linearly polarized light direction ↔ being transmitted so as to reach the liquid-crystal cell 62. Because the other polarization component of the external light, that is the • linear polarization component, is absorbed by the bidirectional dichroic linear polarization layer 36, there is no reduction in screen contrast caused by reflected light.

The polarization axis of the linearly polarized light incident from the bidirectional dichroic polarization layer 36 is modulated by a change in the electrical field applied to the liquid-crystal cell 62. Because the liquid-crystal layer 66, as described above, has a retardation value that causes a substantial shift of $\pi/2$ in the phase of transmitted light, it acts to convert linearly polarized light to circularly polarized light.

The rotation direction of this circularly polarized light is established by modulation of the polarization axis, as noted above, and when this light is incident to the circular polarization separating layer 14, it is reflected when the rotation direction is right and transmitted when the rotation direction is left.

Described with reference to the Poincare sphere of FIG. 4, by changing the director D of the liquid crystal by −45 to +45 degrees, incident horizontal linearly polarized light is transitioned from a point H on the equator. In the case of a shift of −45 to 0 degrees, movement is from the upper pole to the point H, so that the light changes from left circular polarization to linear polarization. If the shift is 0 to 45 degrees, movement is from the lower pole to the point H, so that the light changes from right circular polarization to linear polarization.

At the bidirectional dichroic circular polarizing layer 18 only left circularly polarized light L is transmitted, as described above, this then striking the half-wavelength layer 16, with right circularly polarized light being absorbed.

Because the half-wavelength layer 16 is in the delay mode, the phase of the incident left circularly polarized light L is delayed by one half-wavelength, this being $\pi$, so that the light exits therefrom as right circularly polarized light R directed toward the circular polarization separating layer 14.

Right circularly polarized light R incident to the circular polarization separating layer 14 is reflected at this point. The right circularly polarized light incident to the circular polarization separating layer 14 is changed to left circularly polarized light at the half-wavelength layer 16, and then is transmitted as is by the bidirectional dichroic circular polarizing layer 18, thereby being returned to the liquid-crystal cell 62 with the same rotation direction as when it exited, the polarization axis of this light being again $\pi/2$-modulated, so that only ↔ linearly polarized light passes through the bidirectional dichroic circular polarizing layer 36 and exits as the display light.

Therefore, it is possible to modulate the amount of light transmitted reflected at the circular polarization separating layer 14 and transmitted through the liquid-crystal cell 62 by means of the voltage applied to the liquid-crystal layer 62. That is, it is possible to display gradations. As a result of the change in direction of the director D of the liquid-crystal cell 62, when only right circularly polarized light exits to the bidirectional dichroic circular polarizing layer 18, the dark display condition shown in FIG. 29 occurs.

The sixth embodiment of the present invention is described below.

Figure 30:
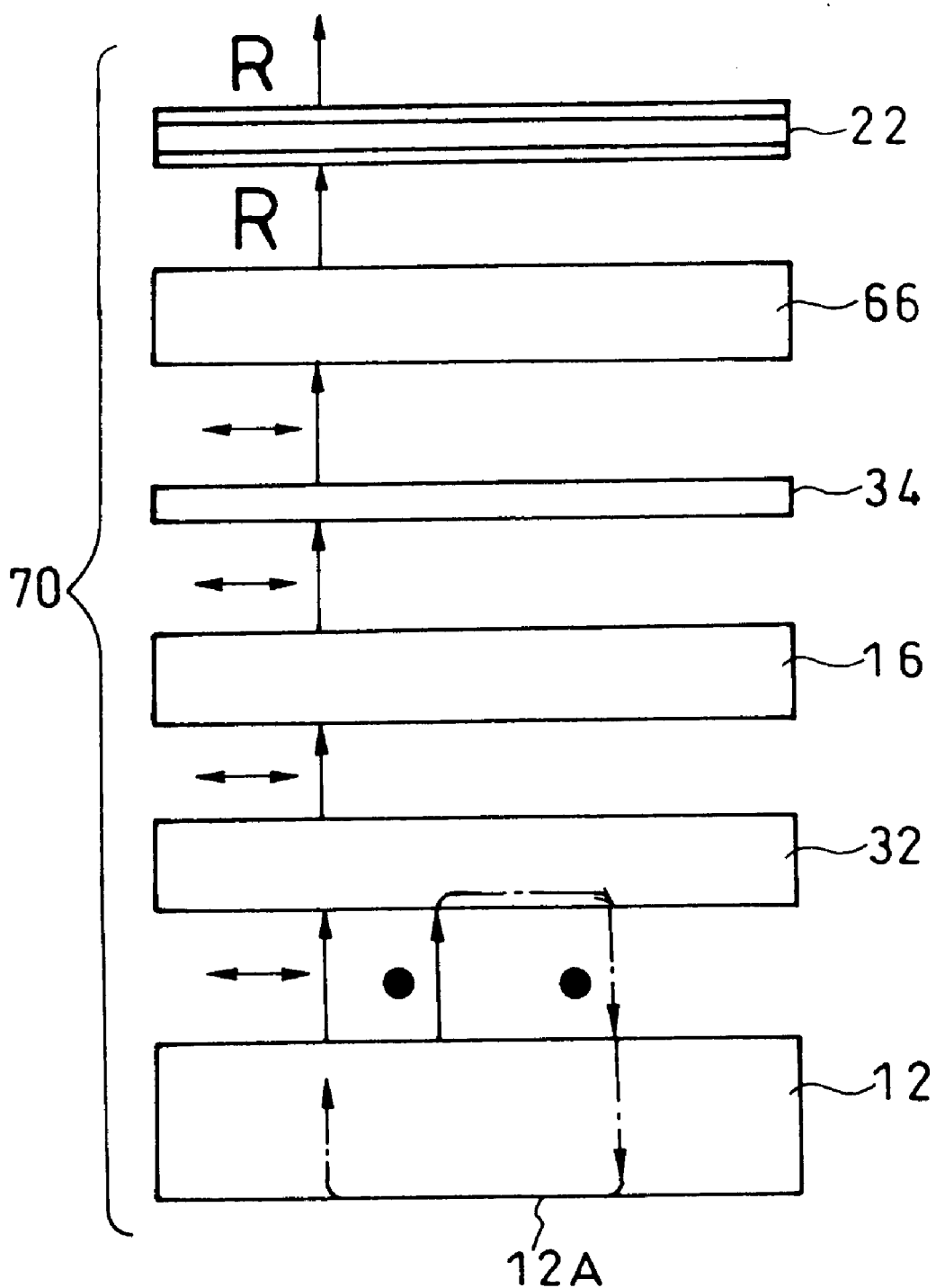
FIG. 30 is a simplified exploded cross-section view showing a combination reflective/transmissive liquid-crystal display device according to the sixth embodiment of the present invention.

As shown in FIG. 30, a combination reflective/transmissive liquid-crystal display device 70 according to the sixth embodiment of the present invention has in place of the circular polarization separating layer 14, the bidirectional dichroic circular polarizing layer 18 and the bidirectional dichroic linear polarizing layer 36 of the combination reflective/transmissive liquid-crystal display device 30 of FIG. 23 the linear polarization separating layer 32, the bidirectional dichroic linear polarizing layer 34 and the bidirectional dichroic circular polarization layer 22. Other parts of the configuration of the fifth embodiment are the same as the combination reflective/transmissive liquid-crystal display device 30, and elements that correspond to elements shown in FIG. 23 have been assigned the same reference numerals, and will not be explicitly described herein.

When the half-wavelength layer 16 is in the off condition (transmissive mode) the above-noted combination reflective/transmissive liquid-crystal display device 70, operates as follows.

Of the unpolarized light emitted from the light source 12, only a light of one linear polarization direction is transmitted through the linear polarization separating layer 32, the linearly polarized component perpendicular to this is reflected.

At the circular polarization separating layer 14, the phase of reflected light being reversed or the polarization of which being removed when reflected by the reflective layer 12A of the light source 12 or when passed through a light diffusing plate (not shown) set in the light path, so that it passes through the linear polarization separating layer 32.

Because there is no voltage applied to the liquid-crystal layer 17C of the half-wavelength layer 16, the incident linearly polarized light exits as is from the half-wavelength layer 16.

If the polarization transmission axis of the bidirectional dichroic linear polarizing layer 34 is caused to coincide with the one of the above-noted polarization directions, the linearly polarized light is transmitted through the bidirectional dichroic linear polarizing layer 34 and reaches the liquid-crystal cell 62.

The linearly polarized light transmitted through the liquid-crystal cell 62, upon passing therethrough, is substantially shifted $\pi/2$, regardless of whether or not there is an electrical field applied. Therefore, linearly polarized light incident to the liquid-crystal cell 62 exits from the liquid-crystal cell 62 as circularly polarized light.

In the same manner, by applying a voltage from the pixel electrodes 68A and 68B to the liquid-crystal layer 66, the direction the liquid crystal director D is changed.

Therefore, by applying a voltage from the pixel electrodes 68A and 68B to the liquid-crystal layer 66, it is possible to adjust the amount of light transmitted through the bidirectional dichroic linear polarization layer 22 from a maximum value to a minimum value, thereby enabling a liquid-crystal display function, such as a function of displaying gradations.

Figure 31:
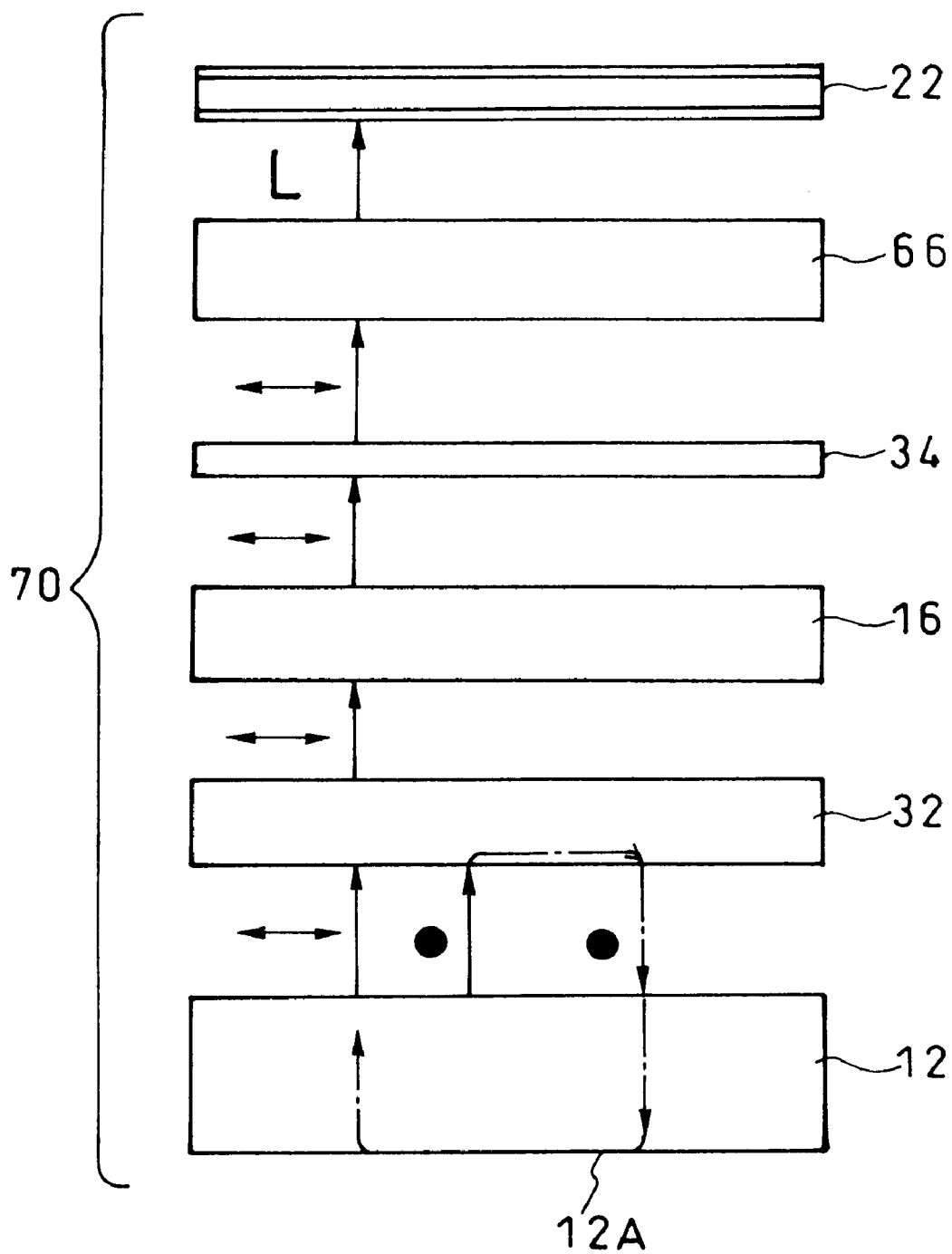
FIG. 31 is a simplified cross-section view showing the dark display condition in the transmissive mode of a combination reflective/transmissive liquid-crystal display device according to the sixth embodiment.

If the direction of the director D of the liquid crystal within the liquid-crystal cell 62 is made a direction so as to change the incident light to the total left circularly polarized light exiting from the liquid-crystal cell 62 as shown in FIG. 31, the so-called dark display condition occurs.

Because the bidirectional dichroic circular polarization layer 22 is a light-absorbing type of dichroic polarizer, even if external (unpolarized) light strikes this layer, 50% thereof is absorbed, the remaining 50% being transmitted, so that there is almost no reflected component, there enabling a great reduction in the decrease of screen contrast in the combination reflective/transmissive liquid-crystal display device 70.

If the switch 16A is turned on, a voltage is applied to the half-wavelength layer 16, thereby placing it in the delay mode, so that the combination reflective/transmissive liquid-crystal display device 70 operates in the reflective mode.

Figure 32:
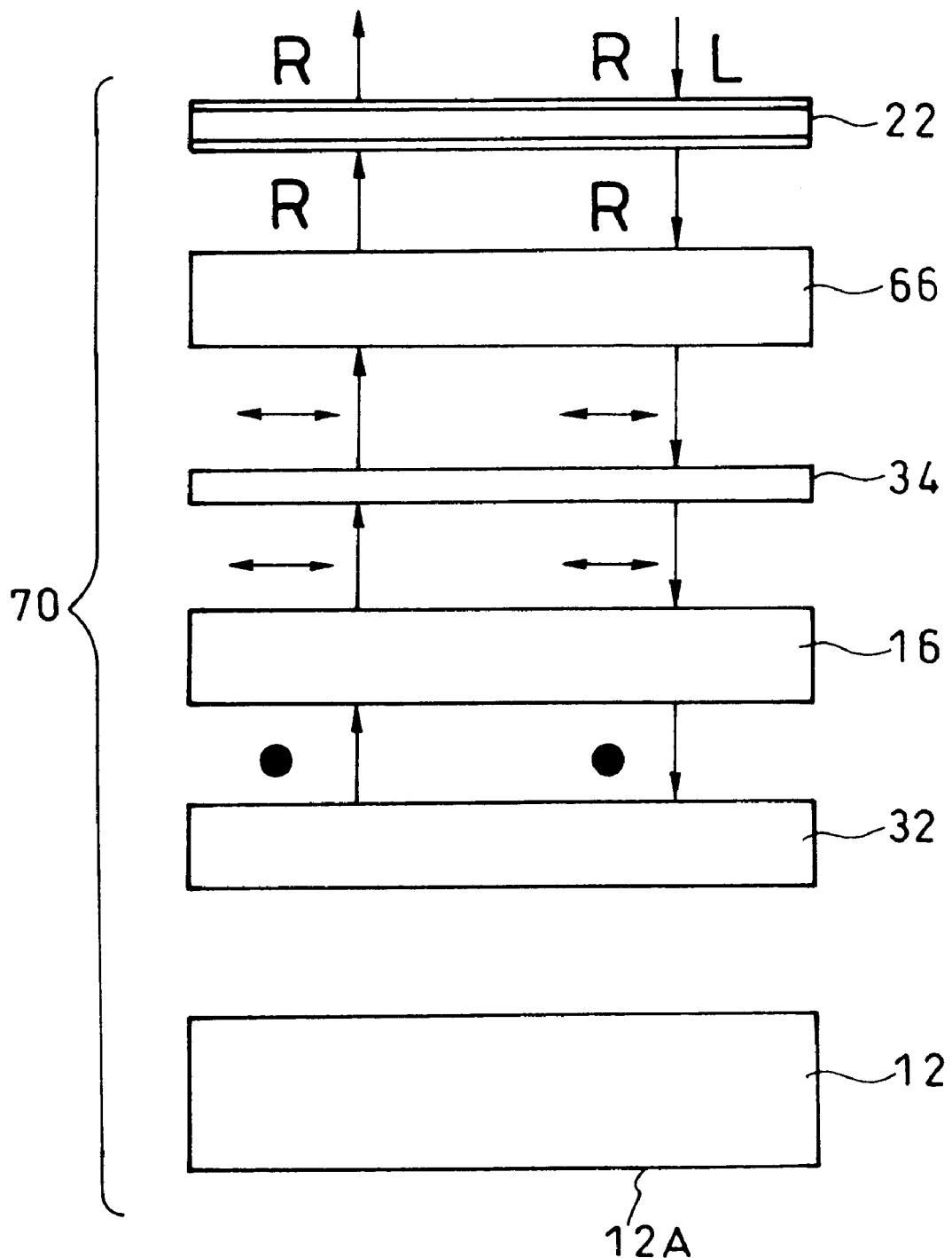
FIG. 32 is a simplified cross-section view showing the light display condition in the reflective mode of a combination reflective/transmissive liquid-crystal display device according to the sixth embodiment.
Figure 33:
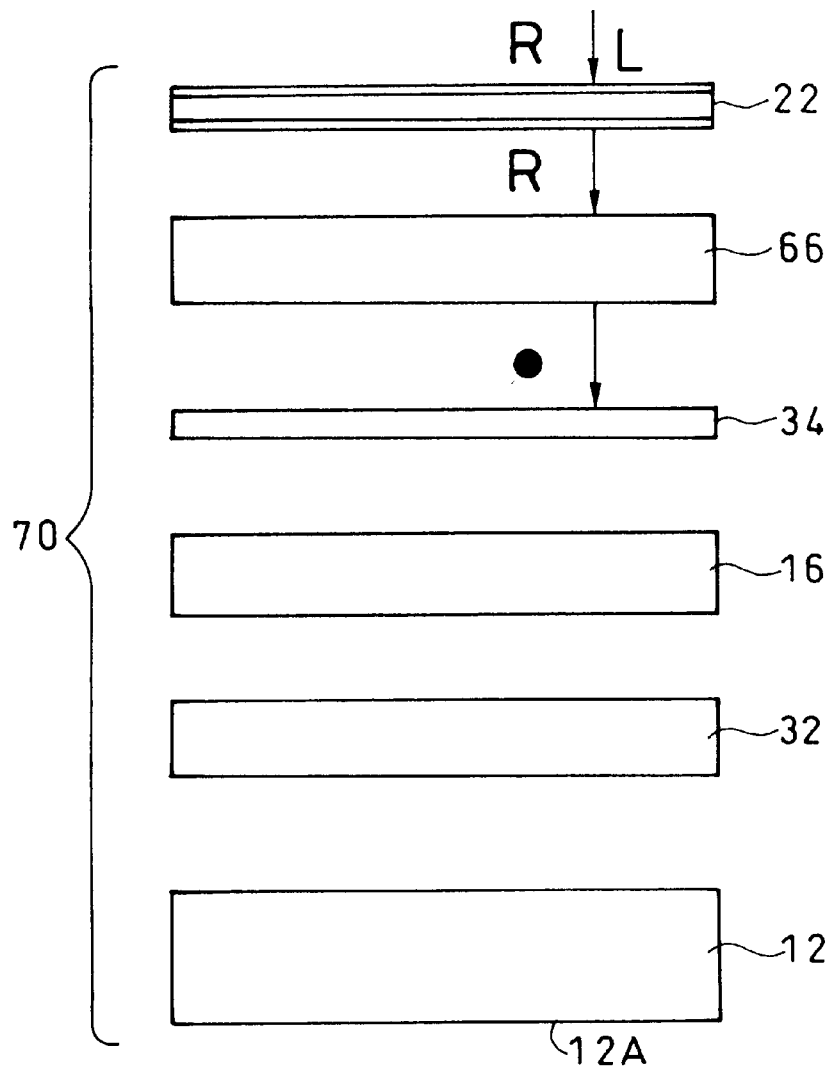
FIG. 33 is a simplified cross-section view showing the dark display condition in the reflective mode a combination reflective/transmissive liquid-crystal display device according to the sixth embodiment.

In this reflective mode, as shown in FIG. 32 and FIG. 33 external (unpolarized) light is incident to the bidirectional dichroic circular polarization layer 22, with only right circularly polarized light R being transmitted so as to reach the liquid-crystal cell 62. Because the other polarization component of the external light, that is the left circularly polarized light L, is absorbed by the bidirectional dichroic circular polarization layer 22, there is no reduction in screen contrast caused by reflected light.

The polarization axis of the right circularly polarized light R incident from the bidirectional dichroic circular polarization layer 22 is modulated in the linearly polarized light between ↔ and • by changing the director D of the liquid crystal by a change in the electrical field applied to the liquid-crystal cell 62.

The direction of this linearly polarized light is established by modulation of the polarization axis, as noted above, and when this light is incident to the bidirectional dichroic linear polarizing layer 34, only linearly polarized light ↔ is transmitted, as described above, this then striking the half-wavelength layer 16, with another linearly polarized light being absorbed.

Because the half-wavelength layer 16 is in the delay mode, the phase of the incident polarized light is delayed by one half-wavelength, this being $\pi$, so that the light exits therefrom as linearly polarized light • directed toward the linear polarization separating layer 32.

The linearly polarized light incident to the linear polarization separating layer 32 is reflected at this point. The linearly polarized light incident to the linear polarization separating layer 32 is changed to linearly polarized light ↔ at the half-wavelength layer 16, and then is transmitted as is by the bidirectional dichroic linear polarizing layer 34, thereby being returned to the liquid-crystal cell 62 with the same polarization direction as when it exited, the polarization axis of this light being again $\pi/2$-modulated, so that only right circularly polarized light passes through the bidirectional dichroic circular polarizing layer 22 and exits as the display light.

When all polarized light incident to the liquid-crystal cell 62 is shifted to the linearly polarized light •, the exit linearly polarized light from the liquid-crystal cell 62 is absorbed by the bidirectional dichroic linear polarizing layer 34, the dark display condition shown in FIG. 33 occurs.

Figure 34:
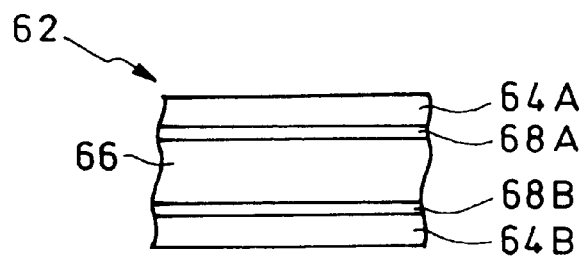
FIG. 34 is a cross-section view showing an alternate configuration of a liquid-crystal cell.

The adjustment of the liquid-crystal layer 66 can alternately be performed, for example, with a ferroelectric liquid crystal (SmC*) or an anti-ferroelectric liquid crystal (SmCA*). In this case, the characteristics of the liquid-crystal layer are slightly different than the above-described IPS mode using a nematic (N) liquid crystal. That is, whereas FIG. 24 through FIG. 26 illustrate the example of the IPS mode, in the case of a ferroelectric liquid crystal (SmC*) or an anti-ferroelectric liquid crystal (SmCA*), the liquid-crystal layer 66 is sandwiched between the electrodes 68A and 68B, as shown in FIG. 34.

In the above-noted case, to align the liquid crystal an alignment film made of polyimide or the like is disposed between the substrates 64A and 64B on the liquid-crystal layer 66. When this is done, rubbing by a known method can be done to the alignment film, and alternately polarized UV can be used to perform optical alignment. The electrodes are made of a transparent material such as ITO, and the substrates 64A and 64B are made of a transparent material such as glass.

It is alternately possible to have the half-wavelength layer 16 and the bidirectional dichroic circular polarizing layer 18 of the fifth embodiment, or the half-wavelength layer 16 and the first bidirectional dichroic linear polarization layer 34 of the sixth embodiment laminated onto the upper surface of the substrate 64B at the lower side of the liquid-crystal cell 62, and also onto the lower side of the upper substrate 64A, along with the liquid-crystal layer 66 (refer to FIGS. 35(A) and 35(B)). If this done, the substrates 64A, 64B become narrower, there is a reduction in parallax, thereby reducing the phenomenon of an image appearing either doubled or out of focus.

The seventh embodiment of the present invention is described below.

Figure 36:
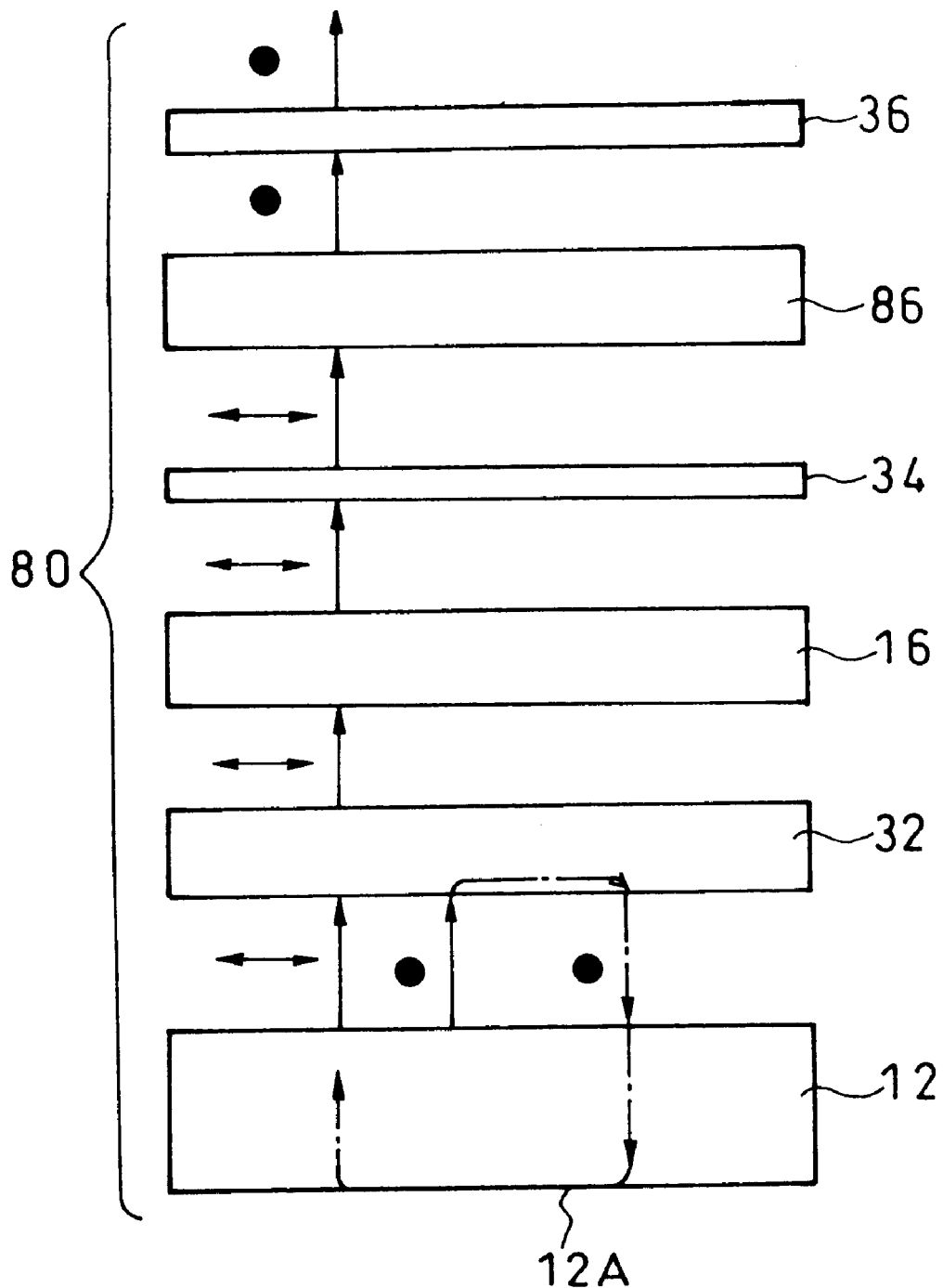
FIG. 36 is a simplified exploded cross-section view showing a combination reflective/transmissive liquid-crystal display device according to the seventh embodiment of the present invention.

As shown in FIG. 36, a combination reflective/transmissive liquid-crystal display device 80 according to the seventh embodiment of the present invention has in place of the liquid-crystal cell 62 of the combination reflective/transmissive liquid-crystal display device 30 of FIG. 8 a different liquid-crystal cell 82. Other parts of the configuration of the fifth embodiment are the same as the combination reflective/transmissive liquid-crystal display device 30, and elements that correspond to elements shown in FIG. 8 have been assigned the same reference numerals, and will not be explicitly described herein.

Figure 37:
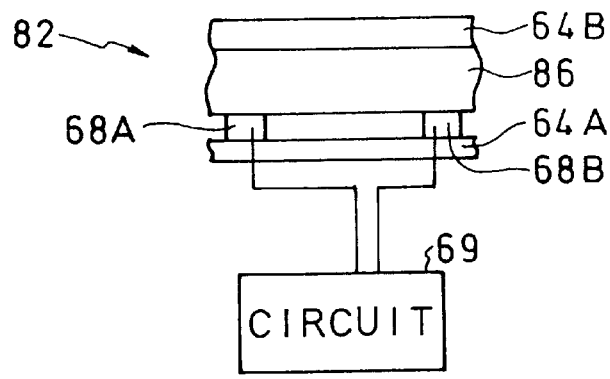
FIG. 37 is an enlarged cross-section view showing a liquid-crystal cell in the seventh embodiment of the present invention.

The liquid-crystal cell 82 of the combination reflective/transmissive liquid-crystal display device 82 has a similar construction to the liquid-crystal cell 62 shown in FIGS. 24–26 and has a liquid-crystal layer 86 (refer to FIG. 37) having a retardation value that substantially shifts the phase of incident light by $\pi$, and pixel electrodes 68A and 68B that apply an electrical field to the liquid-crystal layer 86. Linearly polarized light that is incident via the circular polarization separating layer 32 and linearly polarized light that is incident from the opposite direction are shifted in the polarization direction by applying an electrical field to the liquid-crystal layer 86 from the pixel electrodes 68A and 68B, so as to change the director direction of the liquid crystal.

It is preferable to provide a circuit 69, which controls the voltage between the electrodes so that, in the case in which circularly polarized light strikes the liquid-crystal layer 86, the director direction of the liquid crystal is shifted –45 to +45 degrees with respect to the light transmission axis of the bidirectional dichroic linear polarization layer as a reference.

The term "substantially" in the above-noted expressions "substantially shifted $\pi$" and "substantially parallel to the substrates 64A and 64B" should be understood as including the case in which, for example, the pre-tilt angle of the liquid crystal and various external disturbances exhibit a slight difference from the ideal conditions.

Additionally, the expression "substantially shifted $\pi$" should be understood as referring to substantially changing the phase at the liquid crystal layer 86 itself or to the use of a phase shifting layer separate from the liquid-crystal cell 82, this being formed between the liquid-crystal cell 82 and the above-noted bidirectional dichroic linear polarizing layer 34 and/or between the liquid-crystal cell 82 and the above-noted bidirectional dichroic linear polarizing layer 36, the mutual interaction between the liquid-crystal layer 86 and the phase shifting layer acting to substantially shift the phase of light passing therethrough by $\pi$.

When the half-wavelength layer 16 is in the off condition (transmissive mode) the above-noted combination reflective/transmissive liquid-crystal display device 80, operates as follows.

Of the unpolarized light emitted from the light source 12, only one linearly polarized component is transmitted through the linear polarization separating layer 32 so as to reach the half-wavelength layer 16.

Another linearly polarized component is reflected at the linear polarization separating layer 32, the phase of this light being reversed or the polarization of which being removed when reflected by the reflective layer 12A of the light source 12 or passes through a light diffusing plate (not shown), so that it becomes one linearly polarized light that passes through the linear polarization separating layer 32 and strikes the half-wavelength layer 16.

Because there is no voltage applied to the liquid-crystal layer 17C of the half-wavelength layer 16, the incident left linearly polarized light exits as is from the half-wavelength layer 16.

If the polarization transmission axis of the bidirectional dichroic linear polarizing layer 34 is caused to coincide with the one of the above-noted directions, this linearly polarized light is transmitted through the bidirectional dichroic linear polarizing layer 34 and reaches the liquid-crystal cell 82.

The linearly polarized light transmitted through the liquid-crystal cell 82, upon passing therethrough, is substantially shifted $\pi$, regardless of whether or not there is an electrical field applied. Therefore, linearly polarized light incident to the liquid-crystal cell 82 exits from the liquid-crystal cell 82 as linearly polarized light in the direction perpendicular to the above.

In the same manner, by applying a voltage from the pixel electrodes 68A and 68B to the liquid-crystal layer 86, the direction the liquid crystal director D is changed without changing the retardation value, thereby enabling modulation of the polarization axis of the polarized light transmitted therethrough, this enabling the display of gradations.

Described with reference to the Poincare sphere of FIG. 4, by changing the director D of the liquid crystal without changing the retardation value $\pi$ of the liquid-crystal layer 86, incident horizontal linearly polarized light is transitioned from a point V on the equator to other point on the equator.

Therefore, it is possible to modulate the amount of light transmitted through the bidirectional dichroic circular polarizing layer 36 by means of the voltage applied to the pixel electrodes 68A, 68B. That is, it is possible to display gradations.

Figure 38:
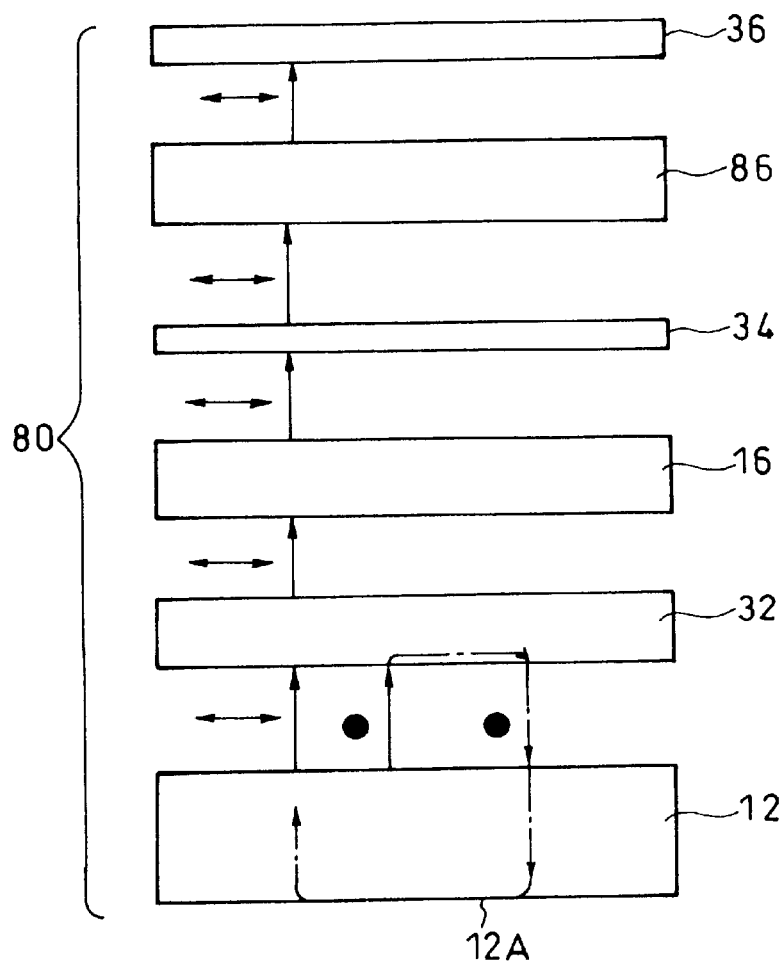
FIG. 38 is a simplified cross-section view showing the dark display condition in the transmissive mode of a combination reflective/transmissive liquid-crystal display device according to the seventh embodiment.

While FIG. 36 shows the so-called light display condition of linearly polarized light exiting from the bidirectional dichroic linear polarization layer, if the direction of the director D of the liquid crystal within the liquid-crystal cell 82 is made a direction that is perpendicular to the polarization direction of linearly polarized light exiting from the liquid-crystal cell 82 as shown in FIG. 38, the so-called dark display condition occurs.

Because the bidirectional dichroic linear polarization layer 36 is a light-absorbing type of dichroic polarizer, even if external (unpolarized) light strikes this layer, 50% thereof is absorbed, the remaining 50% being transmitted, so that there is almost no reflected component, there enabling a great reduction in the decrease of screen contrast in the combination reflective/transmissive liquid-crystal display device 80.

If the switch 16A is turned on, a voltage is applied to the half-wavelength layer 16, thereby placing it in the delay mode, so that the combination reflective/transmissive liquid-crystal display device 80 operates in the reflective mode.

Figure 39:
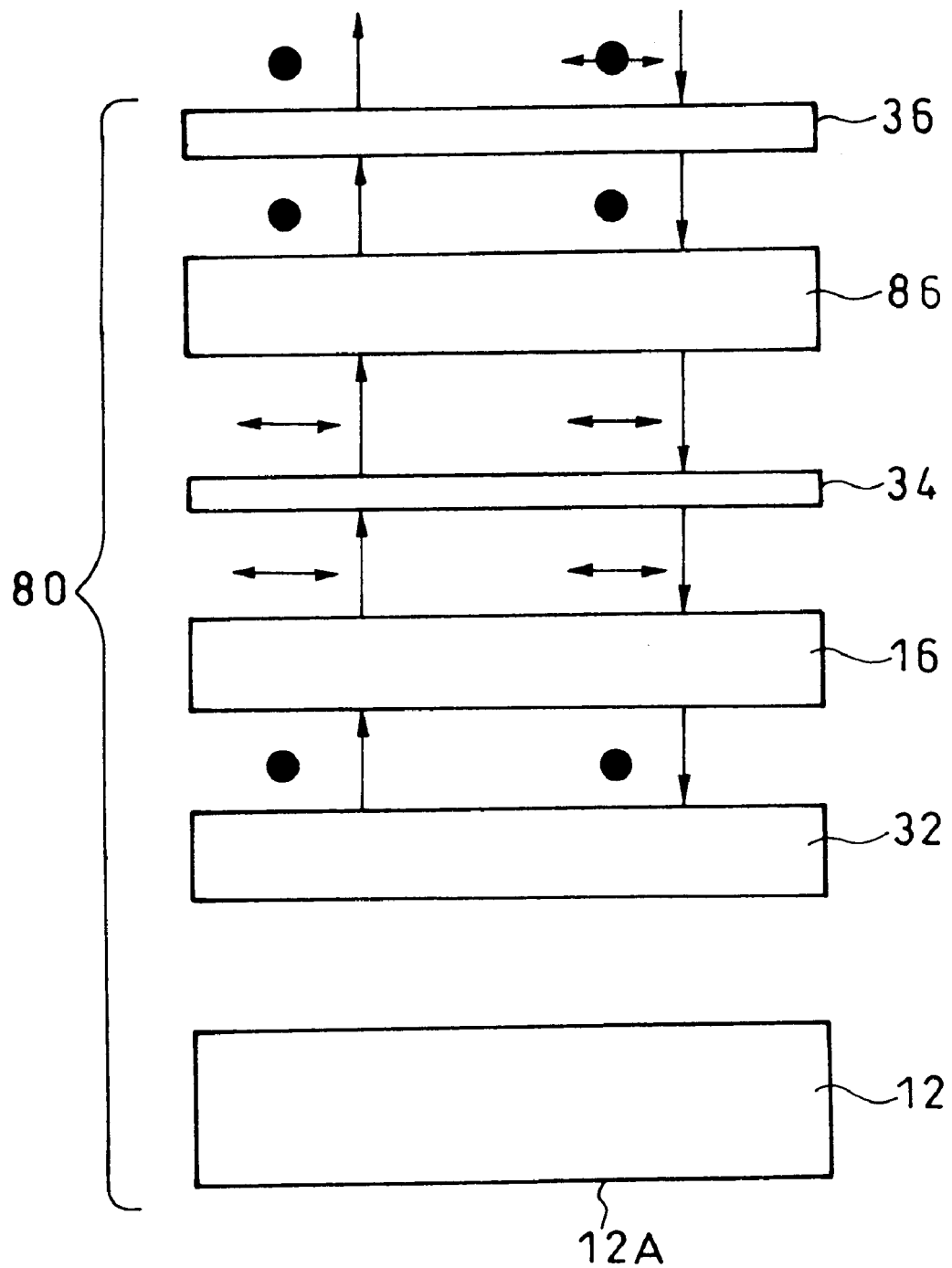
FIG. 39 is a simplified cross-section view showing the light display condition in the reflective mode of a combination reflective/transmissive liquid-crystal display device according to the seventh embodiment.
Figure 40:
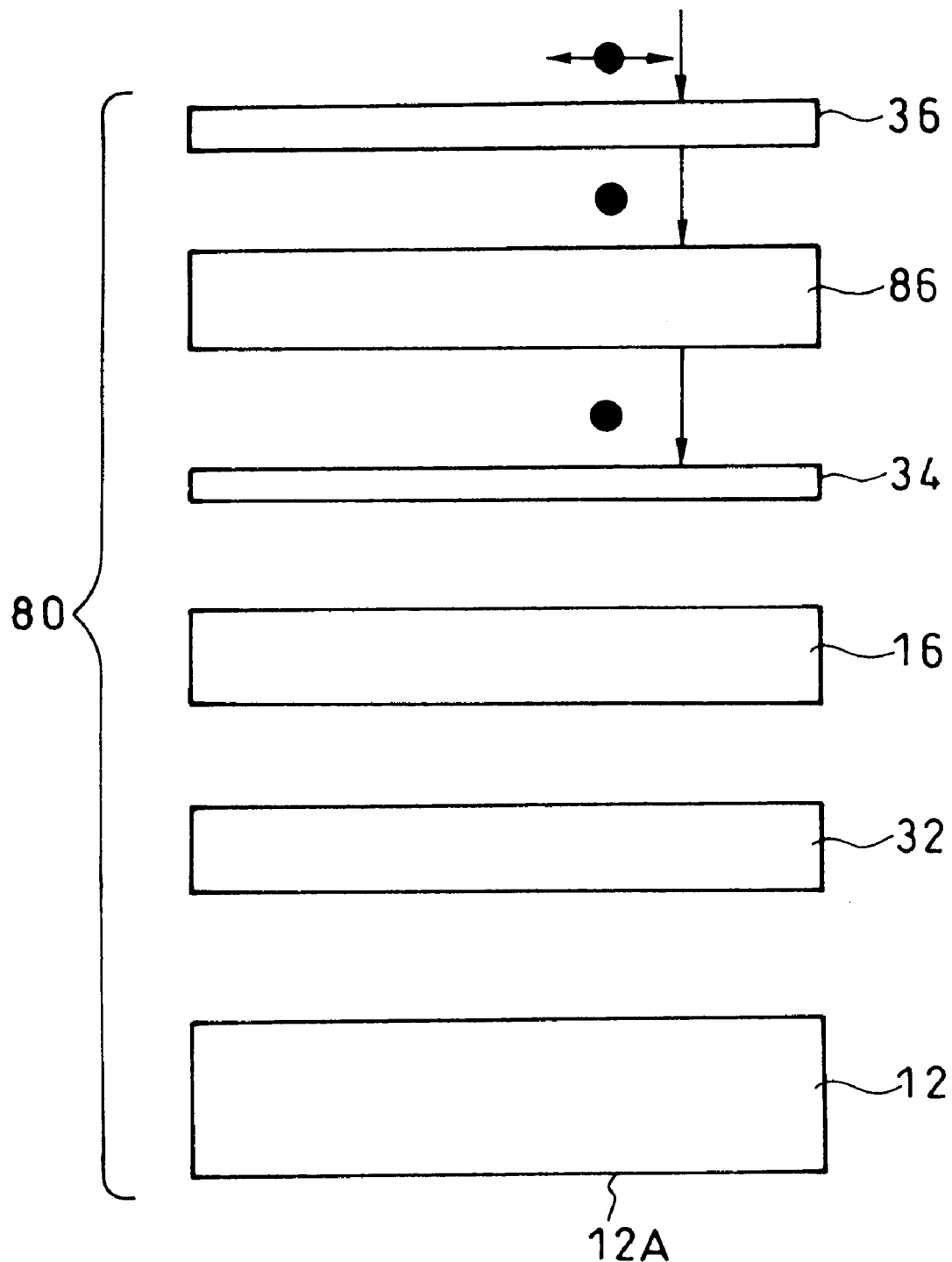
FIG. 40 is a simplified cross-section view showing the dark display condition in the reflective mode a combination reflective/transmissive liquid-crystal display device according to the seventh embodiment.

In this reflective mode, as shown in FIG. 39 and FIG. 40 external (unpolarized) light is incident to the bidirectional dichroic linear polarization layer 36, with only one linearly polarized light direction • being transmitted so as to reach the liquid-crystal cell 82. Because the other polarization component of the external light, that is the ↔ linear polarization component, is absorbed by the bidirectional dichroic linear polarization layer 36, there is no reduction in screen contrast caused by reflected light.

The polarization axis of the linearly polarized light incident from the bidirectional dichroic polarization layer 36 is modulated to linearly polarized light direction between ↔ and • by a change in the electrical field applied to the liquid-crystal cell 82.

Therefore, linearly polarized light exiting from the liquid-crystal cell 82 strikes the first bidirectional dichroic linear polarization layer 34, whereat, as described earlier, only the ↔ linearly polarized light is transmitted so as to cause it to strike the half-wavelength layer 16, with the other linearly polarized light being absorbed.

Because the half-wavelength layer 16 is in the delay mode, it delays incident light by one half-wavelength, that is, by $\pi$, so that the light exits toward the linear polarization separation layer 32 as • linearly polarized light. This linearly polarized light is reflected at the linear polarization separation layer 32, the reflected linearly polarized light being changed to ↔ linearly polarized light at the half-wavelength layer 16 and further being transmitted as is by the first bidirectional dichroic linear polarization layer 34 so that it returns to the liquid-crystal cell 82 with a polarization direction the same as when it exited, the polarization axis thereof being modulated again, so that a • linearly polarized light component is transmitted through the second bidirectional dichroic linear polarization layer 36 and exits therefrom as the display light.

Therefore, it is possible to modulate the amount of light transmitted reflected at the linear polarization separating layer 32 and transmitted through the liquid-crystal cell 82 by means of the voltage applied to the liquid-crystal layer 86. That is, it is possible to display gradations.

When all linearly polarized light is modulated in the direction • at the liquid-crystal cell 82, the dark display condition shown in FIG. 40 occurs.

Figure 41:
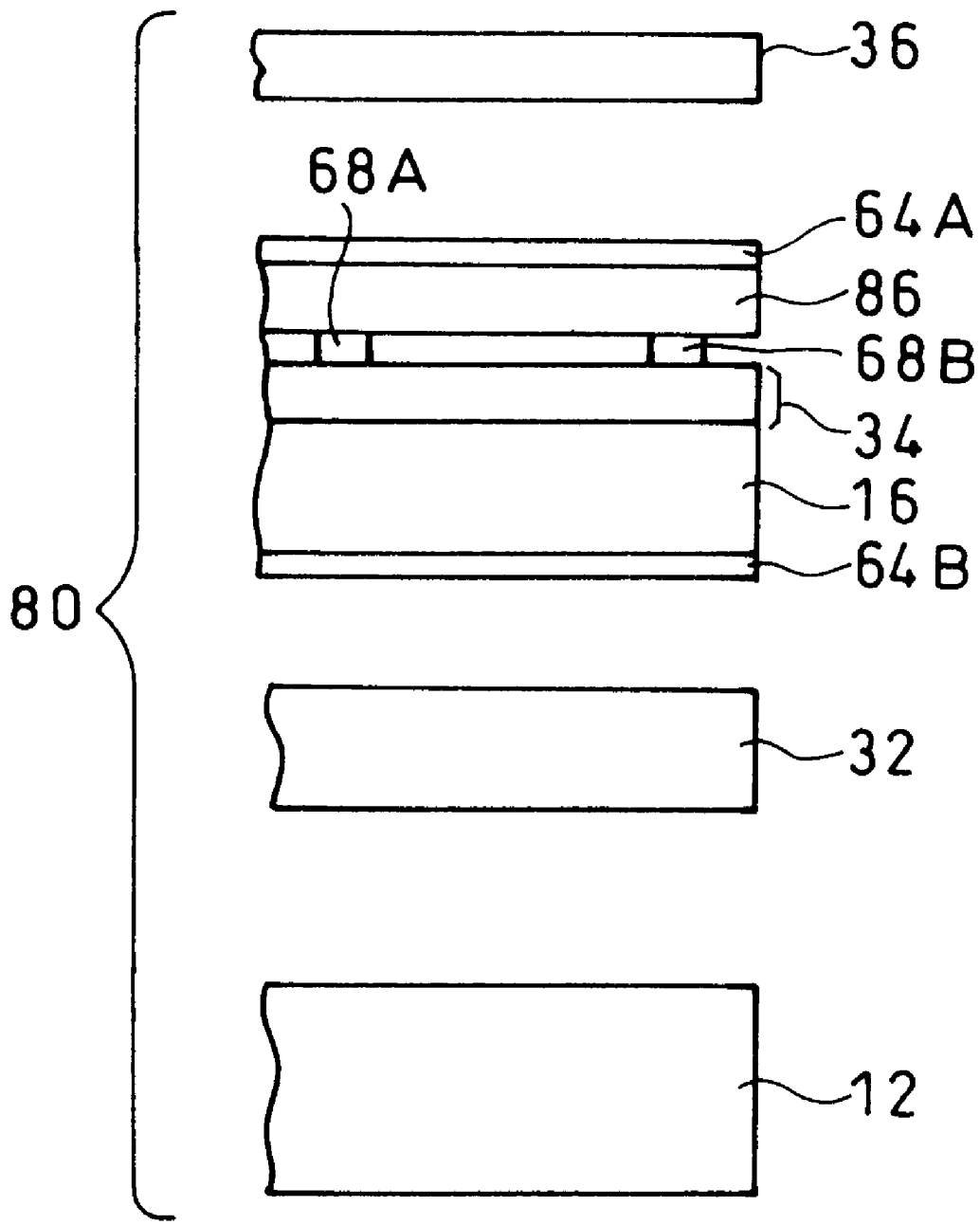
FIG. 41 is a simplified cross-section view showing an alternative assembly condition of the seventh embodiment of the present invention.

Furthermore, it is alternately possible to have the half-wavelength layer 16 and the first bidirectional dichroic linear polarizing layer 34 laminated onto the upper surface of the substrate 64B at the lower side of the liquid-crystal cell 82, and also onto the lower side of the upper substrate 64A, along with the liquid-crystal layer 86 (refer to FIG. 41). If this done, the substrates 64A, 64B become narrower, there is a reduction in parallax, thereby reducing the phenomenon of an image appearing either doubled or out of focus.

The eighth embodiment of the present invention is described below.

Figure 42:
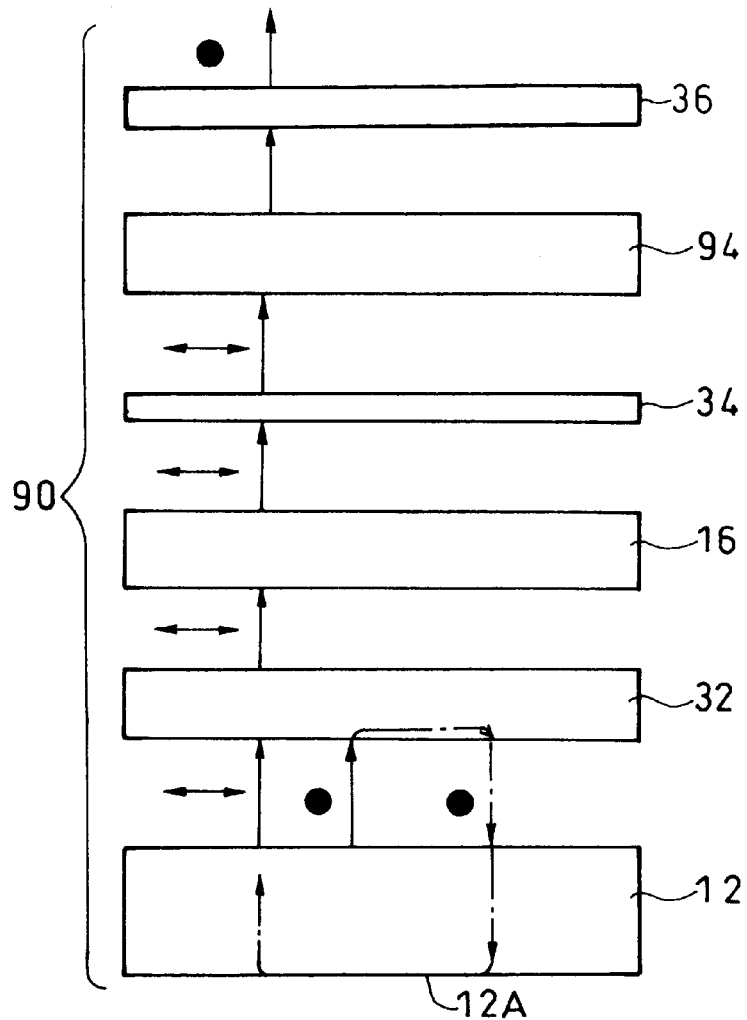
FIG. 42 is a simplified exploded perspective view showing the main part of a combination reflective/transmissive liquid-crystal display device according to the eighth embodiment of the present invention.

As shown in FIG. 42, a combination reflective/transmissive liquid-crystal display device 90 according to the eighth embodiment of the present invention is different from the combination reflective/transmissive liquid-crystal display device 80 of FIG. 36 at a different liquid-crystal cell. Other parts of the configuration of the eighth embodiment are the same as the combination reflective/transmissive liquid-crystal display device 80, and elements that correspond to elements shown in FIG. 36 have been assigned the same reference numerals, and will not be explicitly described herein.

Figure 43:
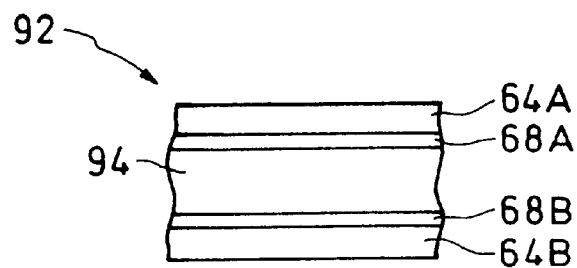
FIG. 43 is an enlarged cross-section view showing the liquid-crystal cell in the combination reflective/transmissive liquid-crystal display device according to the eighth embodiment of the present invention.

A liquid-crystal cell 92 of a combination reflective/transmissive liquid-crystal display device 90 according to the eighth embodiment of the present invention includes a liquid-crystal layer 94 and pixel electrodes 68A and 68B which apply a electrical field to the liquid-crystal layer 94 (refer to FIG. 43), an electrical field being applied to the liquid-crystal layer 94 from the pixel electrodes 68A and 68B so as to change the rotation of light of the liquid crystal, thereby acting so as to shift the polarization plane of light transmitted through the first bidirectional dichroic linear polarization layer 34 or of linearly polarized light that is incident from the other side when it exits from the liquid-crystal layer 94.

The rotation of the liquid crystal in the liquid-crystal layer 94 of the liquid-crystal cell 92 is changed by application of an electrical field from the pixel electrodes 68A and 68B, thereby acting to shift the polarization direction of linearly polarized light that passes through the linear polarization separation layer 32 when it exits from the liquid-crystal layer 94.

This adjustment can be made by a variety of known liquid crystal types, taking into consideration the liquid crystal material, the alignment film material, and cell configuration.

This type of liquid crystal is known as twisted nematic liquid crystal, and has such modes as the STN (super twisted nematic) mode, the SBE (super twisted birefringence effect) mode, and the TN-FEN (twisted nematic field effect) mode.

In the combination reflective/transmissive liquid-crystal display device 90, when the switch 16A is in the off condition, thereby placing the device in the transmissive mode, of the unpolarized light from the light source 12 only light of one linear polarization direction is transmitted at the linear polarization separation layer 32, the linearly polarized component perpendicular to this being reflected.

If the polarization transmission axis of the first bidirectional dichroic linear polarization layer 34 is caused to coincide with one of the two polarization directions, it passes through the first bidirectional dichroic linear polarization layer 34 and reaches the liquid-crystal cell 92.

By applying a voltage to the liquid-crystal layer 94 of the liquid-crystal cell 92 from the pixel electrodes 64A and 64B, the twist angle of the liquid crystal is changed, so that the linearly polarized light transmitted through the liquid-crystal cell 92 becomes linearly polarized light maximumly shifted by $\pi/2$ when exiting from the liquid-crystal cell 92.

Figure 44:
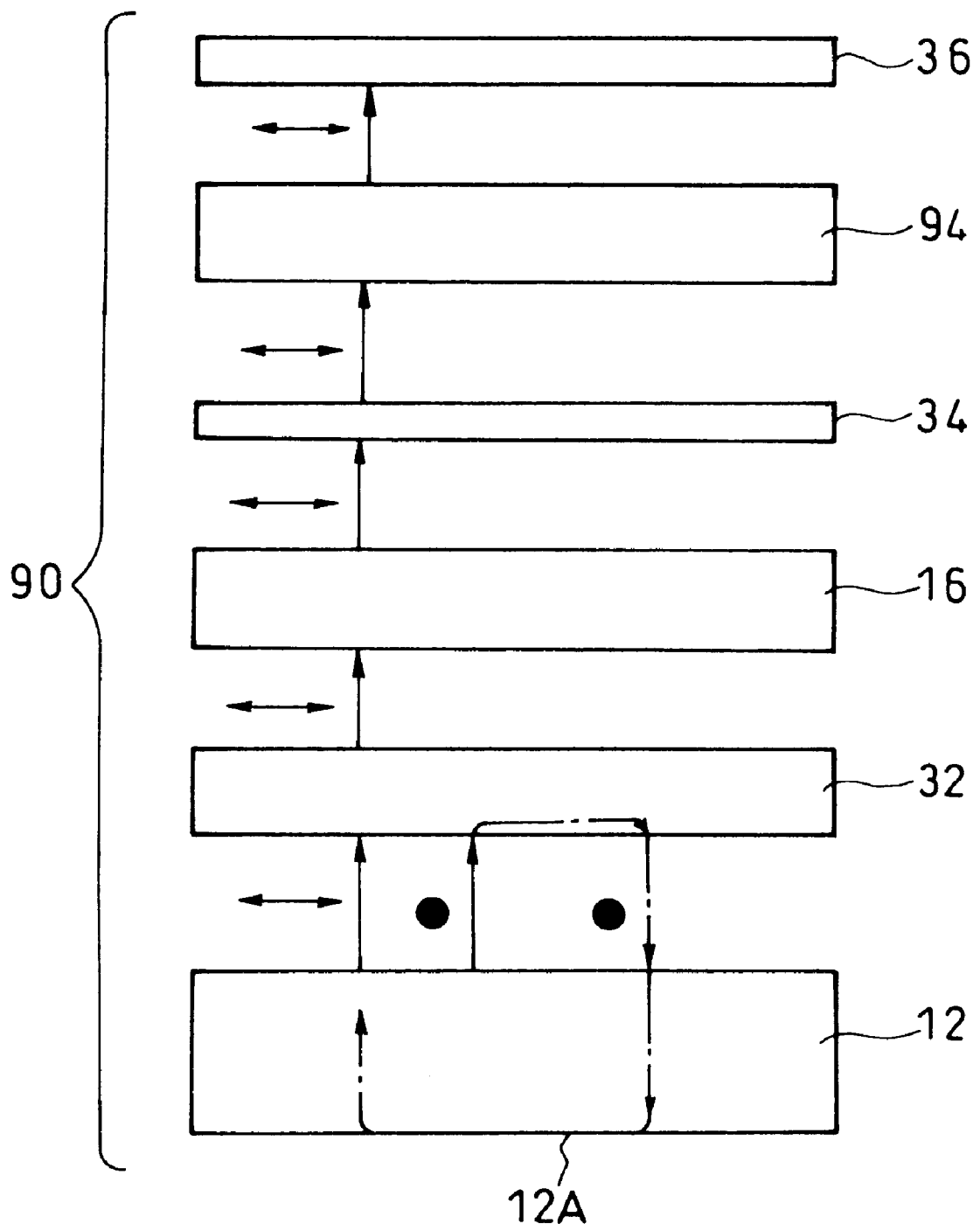
FIG. 44 is a simplified cross-section view showing the dark display condition in the transmissive mode of a combination reflective/transmissive liquid-crystal display device according to the fifth embodiment of the present invention.

Therefore, the closer the shift amount is to $\pi/2$, the greater will be the amount of light transmitted through the second bidirectional dichroic linear polarization layer 36. When a voltage is applied to the liquid crystal, because rotation of transmitted light does not occur, the incident linearly polarized light exits as is, and because there is total absorption by the second bidirectional dichroic linear polarization layer 36, the dark display condition shown in FIG. 44 occurs.

Therefore, the amount of light transmitted by the second bidirectional dichroic linear polarization layer 36 increases in direct proportion to the size of the rotation of light at the liquid-crystal layer 92, this effect enabling the display of gradations.

Because the second bidirectional dichroic linear polarization layer 36 is a light-absorbing type of dichroic polarizer, even if external (unpolarized) light strikes the surface of the second bidirectional dichroic circular polarizing layer 36, 50% of the light is absorbed and the remaining 50% is transmitted, so that there is almost no reflected component, the result being a great reduction in the decrease of contrast in the combination reflective/transmissive liquid-crystal display device 90.

When the switch 16A is turned on, a voltage is applied to the half-wavelength layer 16, placing it in the delay mode, so that the combination reflective/transmissive liquid-crystal display device 90 is switched to the reflective mode.

Figure 45:
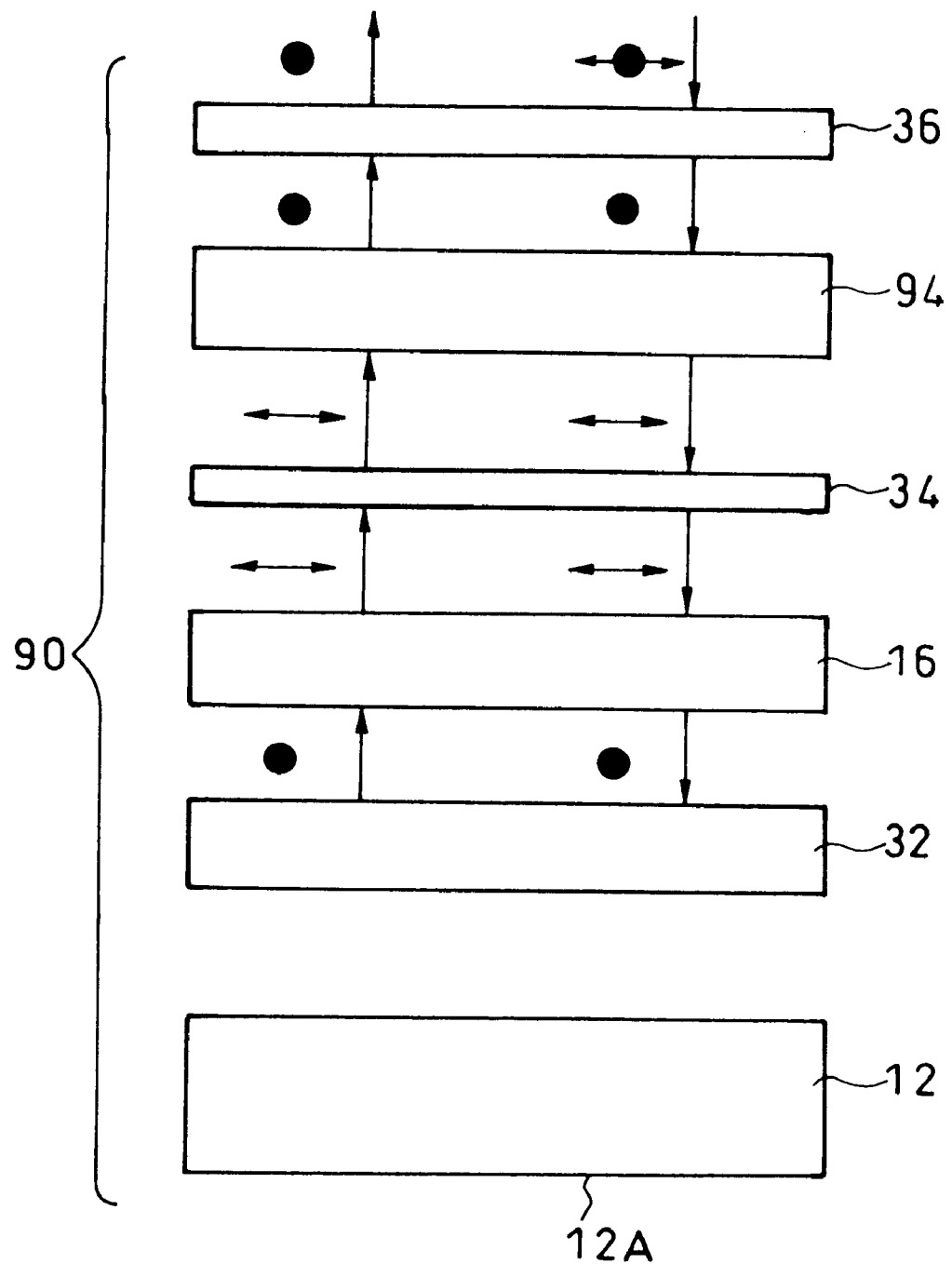
FIG. 45 is a simplified cross-section view showing the light display condition in the reflective mode of a combination reflective/transmissive liquid-crystal display device according to the eighth embodiment.
Figure 46:
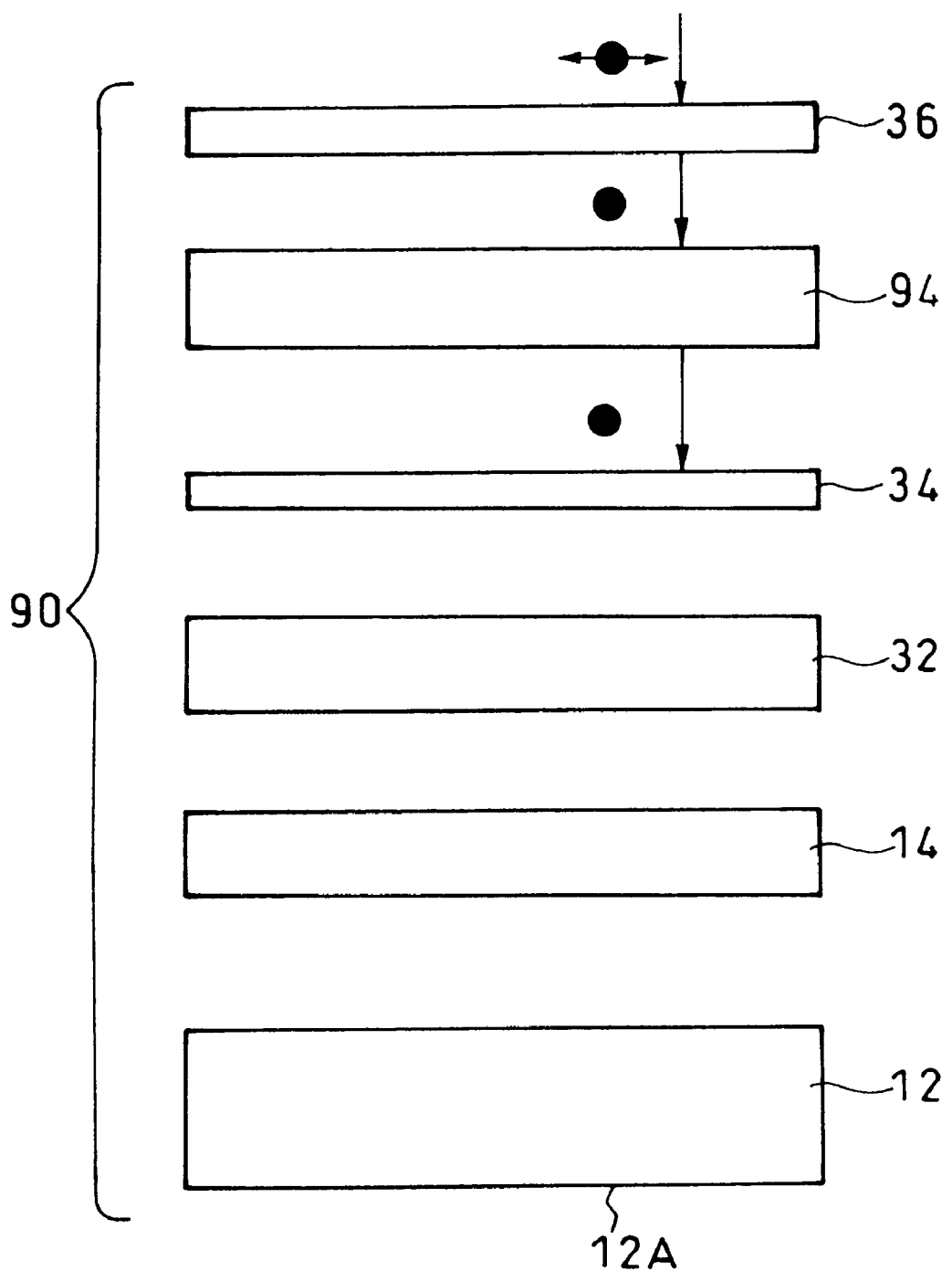
FIG. 46 is a simplified cross-section view showing the dark display condition in the reflective mode a combination reflective/transmissive liquid-crystal display device according to the fifth embodiment of the present invention.

In the reflective mode, as shown in FIG. 45 and FIG. 46, external (unpolarized) light is incident to the second bidirectional dichroic linear polarization layer 36, and of this light only the one linearly polarized light component indicated by • is transmitted so as to strike the liquid-crystal cell 92. The other polarization component of the external light, this being the linearly polarized light indicated by ↔, is absorbed by the second bidirectional dichroic linear polarization layer 36, so that there is no reduction in screen contrast caused by reflected light.

The rotation of the linearly polarized light that is incident to the liquid-crystal layer 94 that is imparted by the liquid-crystal layer 94 can be changed by an electrical field applied to the liquid-crystal layer 94.

Therefore, linearly polarized light exiting from the liquid-crystal cell 92 strikes the first bidirectional dichroic linear polarization layer 34, whereat, as described earlier, only the ↔ linearly polarized light is transmitted so as to cause it to strike the half-wavelength layer 16, with the other linearly polarized light being absorbed.

Because the half-wavelength layer 16 is in the delay mode, it delays incident light by one half-wavelength, that is, by $\pi$, so that the light exits toward the linear polarization separation layer 32 as • linearly polarized light. This linearly polarized light is reflected at the linear polarization separation layer 32, the reflected linearly polarized light being changed to ↔ linearly polarized light at the half-wavelength layer 16 and further being transmitted as is by the first bidirectional dichroic linear polarization layer 34 so that it returns to the liquid-crystal cell 92 with a polarization direction the same as when it exited, the polarization axis thereof being modulated from 0 to π, so that a • linearly polarized light component is transmitted through the second bidirectional dichroic linear polarization layer 36 and exits therefrom as the display light.

When no voltage is applied, so that the liquid-crystal cell 92 does not act to rotate light, the dark display condition shown in FIG. 46 occurs.

Figure 47:
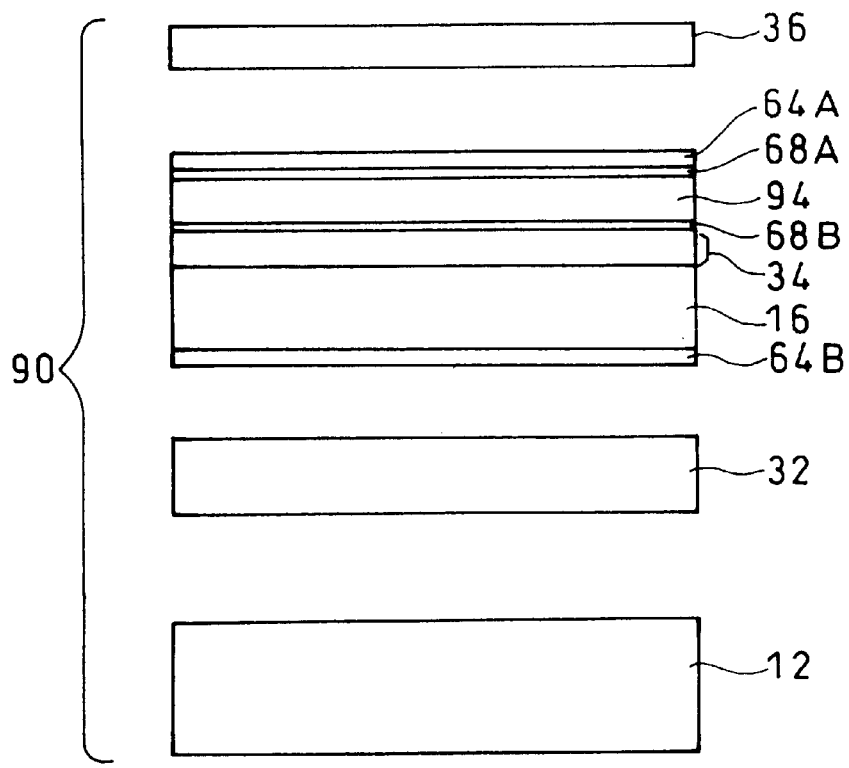
FIG. 47 is a simplified cross-section view showing an alternate assembly condition in a combination reflective/transmissive liquid-crystal display device according the eighth embodiment of the present invention.
Figure 48:
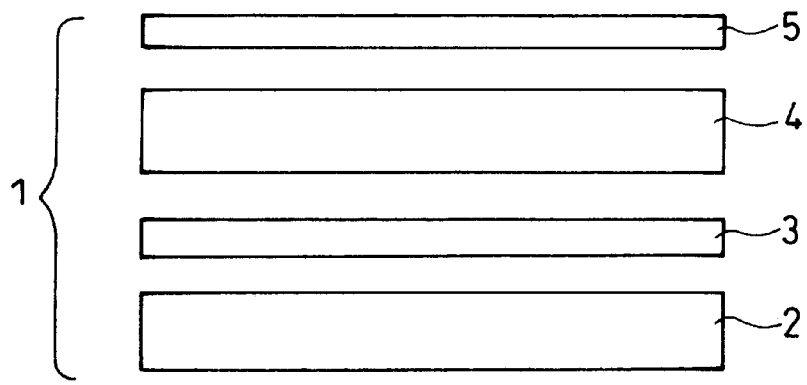
FIG. 48 is a cross-section view of a liquid-crystal display device according to the prior art, similar to that of FIG. 1.

Furthermore, it is alternately possible to have the half-wavelength layer 16 and the eighth bidirectional dichroic linear polarizing layer 34 laminated onto the upper surface of the substrate 64B at the lower side of the liquid-crystal cell 92, and also onto the lower side of the upper substrate 64A, along with the liquid-crystal layer 94 (refer to FIG. 47). If this done, the substrates 64A, 64B become narrower, there is a reduction in parallax, thereby reducing the phenomenon of an image appearing either doubled or out of focus.

While in the foregoing embodiments the light source 12 is a thin transparent sheet-like white light source such as a thin-film electroluminescent source having transparent electrodes, a reflective layer of, for example a metal thin film, being provided on the rear surface thereof, the present invention is not restricted in this regard, and can alternately make use of light source that provides light from a side edge of a light-guiding sheet, in which case the other side of the light-guiding sheet can be provided with a reflective layer of a metal thin film, for example, white PET (polyethylene telephthalate) also being usable.

Although the switch 16A is provided as a means for switching the half-wavelength layer 16 on and off, as shown in FIG. 2, an external light sensor 38 can be provided which detects external light and switches the switch 16A on when the external light exceeds a prescribed value, but keeps the switch 16A at below that value.

Additionally, in the foregoing embodiments, although the half-wavelength layer 16 is in the transmissive mode with no voltage applied and the reflective mode with a voltage applied, this can also be a half-wavelength layer which is in the reflective mode with no voltage applied and the transmissive mode with a voltage applied.

Additionally, although a pixel in the liquid-crystal cell used in the foregoing combination reflective/transmissive liquid-crystal display device 10 and 30 to 90 brightest when a voltage is applied to the liquid-crystal cell and darkest when no voltage is applied, this being the so-called "normal black" mode, it is also possible to apply the present invention to the "normal white" mode, in which the brightness of a pixel is greatest when no voltage is applied.

It is also possible to laminate onto the liquid-crystal layer side of a circular polarization separating layer or linear polarization separation layer a phase-shifting layer that has a retardation value that substantially shifts the phase of transmitted light by π/2, thereby achieving the same effect as a linear polarization separation layer or circular polarization separating layer.

It is also possible to use an arrangement in which the phase of light transmitted through the liquid-crystal cell is substantially shifted or the polarization axis of exiting light is rotated with no voltage is applied to the liquid-crystal layer of the liquid-crystal cell from the pixel electrodes, there being no substantial change in the phase or polarization axis rotation with a voltage applied to the electrodes.

The combination reflective/transmissive liquid-crystal display device 10 shown in FIG. 1 is fabricated as a laminated structure using a cholesteric liquid-crystal layer as the circular polarization separating layer 14, using an anti-ferroelectric liquid crystal as the half-wavelength layer 16, using a nematic liquid crystal which substantially shifts the phase of light by 0 to π in the liquid-crystal cell 20, and uses a light-absorbing type of dichroic linearly polarizing layer with a λ/4-wavelength phase-shifting layer laminated thereonto as the first and second bidirectional dichroic circular polarizing layers 18 and 22.

By switching the half-wavelength layer 16 on and off, it is possible to switch between the reflective mode and the transmissive mode, and to achieve sufficient intensity in both modes. With an electrical field applied to the liquid-crystal cell 20, by changing the retardation value of the liquid crystal, it is possible to achieve an improvement in the efficiency of utilization of light, without a great decrease in screen contrast caused by external light.

The combination reflective/transmissive liquid-crystal display device 30 shown in FIG. 8 is fabricated using an extended multilayer structure as the linear polarization separation layer 32, using a laminate structure of a half-wavelength layer 16 and a liquid-crystal cell 20 as noted above, and additionally light-absorbing type bidirectional dichroic linear polarization layers 34 and 36. As is the case with the above-noted configuration, by switching the half-wavelength layer 16 on and off it is not only possible to switch between the reflective and transmissive modes, but also to achieve sufficient intensity in both modes. It is possible with this configuration to improve the efficiency of light utilization, without a great decrease in contrast caused by external light.

The combination reflective/transmissive liquid-crystal display device 40 shown in FIG. 13 is fabricated as a laminated structure using a cholesteric liquid-crystal layer as the circular polarization separating layer 14, using an anti-ferroelectric liquid crystal as the half-wavelength layer 16, using a nematic liquid crystal which substantially shifts the phase of light by $-\pi/2$ to $\pi/2$ in the liquid-crystal cell 20, and uses a light-absorbing type of dichroic linearly polarizing layer with a λ/4-wavelength phase-shifting layer laminated thereonto as the bidirectional dichroic circular polarizing layers 18.

By switching the half-wavelength layer 16 on and off, it is possible to switch between the reflective mode and the transmissive mode, and to achieve sufficient intensity in both modes. With an electrical field applied to the liquid-crystal cell 42, by changing the retardation value of the liquid crystal, it is possible to achieve an improvement in the efficiency of utilization of light, without a great decrease in screen contrast caused by external light.

The combination reflective/transmissive liquid-crystal display device 50 shown in FIG. 18 is fabricated using an extended multilayer structure as the linear polarization separation layer 32, using a laminate structure of a half-wavelength layer 16 and a liquid-crystal cell 42 as noted above, and additionally light-absorbing type bidirectional dichroic linear polarization layers 34 and a bidirectional dichroic circularly polarizing layer 36. As is the case with the above-noted configuration, by switching the half-wavelength layer 16 on and off it is not only possible to switch between the reflective and transmissive modes, but also to achieve sufficient intensity in both modes. It is possible with this configuration to improve the efficiency of light utilization, without a great decrease in contrast caused by external light.

The combination reflective/transmissive liquid-crystal display device 60 shown in FIG. 23 is fabricated as a laminated structure, using a cholesteric liquid-crystal layer as the circular polarization separating layer 14, using an anti-ferroelectric liquid-crystal cell as the half-wavelength layer 16, using a liquid-crystal cell having a retardation value that substantially shifts the phase of light by π/2, and using a light-absorbing type of dichroic linearly polarizing layer with a λ/4-wavelength phase-shifting layer laminated onto both sides thereof as a bidirectional dichroic circular polarizing layer, and further has a light-absorbing type dichroic linearly polarizing layer laminated thereonto.

By switching the half-wavelength layer 16 on and off, it is not only possible to obtain good switching between the reflective and transmissive modes, but also to obtain sufficient intensity in both modes. Additionally, by applying an electrical field to the liquid-crystal cell 62 so as to change the director thereof while maintaining the retardation value thereof, it is possible to improve the efficiency of light utilization without a great decrease in contrast caused by external light.

The combination reflective/transmissive liquid-crystal display device 70 shown in FIG. 30 is fabricated using an extended multilayer structure as the linear polarization separation layer 32, using a laminate structure of a half-wavelength layer 16 and a liquid-crystal cell 62 as noted above, and additionally light-absorbing type bidirectional dichroic linear polarization layers 34 and a bidirectional dichroic circularly polarizing layer 22. As is the case with the above-noted configuration, by switching the half-wavelength layer 16 on and off it is not only possible to switch between the reflective and transmissive modes, but also to achieve sufficient intensity in both modes. It is possible with this configuration to improve the efficiency of light utilization, without a great decrease in contrast caused by external light.

The combination reflective/transmissive liquid-crystal display device 80 shown in FIG. 36 is fabricated as a laminated structure, using an extended multilayer structure as the circular polarization separating layer 14, using an anti-ferroelectric liquid-crystal cell as the half-wavelength layer 16, using a liquid-crystal cell 82 having a retardation value that substantially shifts the phase of light by π/2, and using light-absorbing type of dichroic linearly polarizing layers 34, 36.

By switching the half-wavelength layer 16 on and off, it is not only possible to obtain good switching between the reflective and transmissive modes, but also to obtain sufficient intensity in both modes. Additionally, by applying an electrical field to the liquid-crystal cell 82 so as to change the director thereof while maintaining the retardation value thereof, it is possible to improve the efficiency of light utilization without a great decrease in contrast caused by external light.

The combination reflective/transmissive liquid-crystal display device 90 shown in FIG. 42 was fabricated as a laminated structure, using an extended multilayer structure as the linear polarization separation layer 32, using an anti-ferroelectric liquid crystal as the half-wavelength layer 16, and using a TN liquid crystal which, with the application of a voltage thereto, changes the rotation of light and shifts the polarization of linearly polarized light exiting therefrom in the liquid-crystal cell 92, and the first and second bidirectional dichroic linear polarization layers 34 and 36.

By switching the half-wavelength layer 16 on and off it is possible not only to switch between the reflective and transmissive modes, but also to achieve sufficient intensity in both modes. With an electrical field applied to the liquid-crystal cell 92 so as to change the retardation value of the liquid crystal, it is possible to improve the efficiency of light utilization without a great decrease in contrast caused by external light.

By adopting the constitution as described in the embodiments above, in a combination reflective/transmissive liquid-crystal display device according to the present invention, by switching the half-wavelength layer one and off, it is possible to achieve both good switching between the reflective and transmissive modes, and also to achieve sufficient contrast in both modes. In addition to providing a great improvement in the efficiency of light utilization, it is possible, without a great decrease in contrast caused by external light, to make use of the light rotation action of the liquid-crystal layer to achieve a display condition having good contrast.

What is claimed is:

1. A combination reflective/transmissive liquid-crystal display device comprising:

a light source;

a polarization separation layer comprising one of a function of transmitting one direction of left or right circularly polarized light components incident from said light source or from an opposite direction and reflecting a circularly polarized light component of the opposite direction and a function of transmitting one direction component of linearly polarized light incident from said light source or from an opposite direction and reflecting a component of the other direction which is perpendicular thereto;

a half-wavelength layer, which, in response to on/off switching of a voltage either shifts incident polarized light from said polarization separation layer or from an opposite direction or does not shift said light;

a first light-absorbing type bidirectional dichroic polarization layer disposed on the opposite of the half-wavelength layer from the polarization separating layer, and comprising one of a function of transmitting, of light incident thereto from said half-wavelength layer or from the opposite direction, circularly polarized light of one of the left and right rotation directions and absorbing circularly polarize light of the other rotation direction, and a function of transmitting, of light incident thereto from said half-wavelength layer or from the opposite direction, linearly polarized light of only one direction, and absorbing linear polarized light of the direction perpendicular thereto;

a liquid-crystal layer that converts or does not convert one incident circularly polarized light or linearly polarized light to another circularly polarized light or linearly polarized light before it exits the opposite side, and comprises one of a function of changing the ellipticity when light exits with circular polarization and changing the polarization axis direction when light exits as linearly polarized light;

a second light-absorbing type bidirectional dichroic polarization layer disposed on the opposite of the liquid-crystal layer from the first bidirectional dichroic polarization layer, and comprising one of a function of transmitting, of light incident thereto from said liquid-crystal layer or from the opposite direction, circularly polarized light of one of the left and right rotation directions and absorbing circularly polarize light of the other rotation direction, and a function of transmitting, of light incident thereto from said liquid-crystal cell or from the opposite direction, linearly polarized light of only one direction, and absorbing linear polarized light of the direction perpendicular thereto;

wherein, by switching a voltage with respect to said half-wavelength layer on and off, it is possible to freely select between a reflective mode in which said display device operates in the reflective mode and a transmissive mode in which said display device operates in a transmissive mode, the configuration of the first bidirectional dichroic polarizing layer being such that said first bidirectional dichroic polarizing layer transmits polarized light having passed through said polarization separating layer, and wherein when said half-wavelength layer is in the transmissive mode, polarized light having passed through said polarization separating layer is transmitted without a shift of phase, or with a shift of phase so that it is transmitted through the first bidirectional dichroic polarizing layer, but when said half-wavelength layer is in the reflective mode, the phase of polarized light having passed through said second bidirectional dichroic polarizing layer, said liquid-crystal layer, and said first bidirectional dichroic polarizing layer is shifted so that it is reflected by said phase shifting layer, or not shifted and also polarized light reflected from said phase shifting layer is shifted so as to be transmitted by the first bidirectional dichroic polarizing layer, or not shifted.

2. A combination reflective/transmissive liquid-crystal display device according to claim 1, wherein at least one of said first and second bidirectional dichroic polarizing layers has a quarter-wavelength layer attached to or directly formed onto both sides thereof.

3. A combination reflective/transmissive liquid-crystal display device according to claim 1, wherein:

said polarization separating layer is a circular polarization separating layer that, of the incident light, transmits either right or left rotated circularly polarized light, and reflects circularly polarized light of the other direction;

said first and second bidirectional dichroic polarizing layers are light-absorbing type bidirectional dichroic circularly polarizing layers that, of the incident light, transmit either right or left rotated circularly polarized light, and absorb circularly polarized light of the other direction; and electrodes are provided on said liquid-crystal layer for applying an electrical field thereto, an electrical field being applied from the electrodes to the liquid-crystal layer so as to change the retardation value thereof, so that the phase of circularly polarized light incident via transmission through the first bidirectional dichroic polarizing layer or circularly polarized light incident via transmission through the second bidirectional dichroic polarizing layer is substantially shifted 0 to $\pi$.

4. A combination reflective/transmissive liquid-crystal display device according to claim 1, wherein:

said polarization separating layer is a linear polarization separating layer that, of the incident light, transmits only one linearly polarized light component, and reflects linearly polarized light of the other direction;

said first and second bidirectional dichroic polarizing layers are light-absorbing type bidirectional dichroic linearly polarizing layers that, of the incident light, transmit only one linearly polarized light component, and absorb linearly polarized light of the other direction; and electrodes are provided on said liquid-crystal layer for applying an electrical field thereto, an electrical field being applied from the electrodes to the liquid-crystal layer so as to change the retardation value thereof, so that the phase of linearly polarized light incident via transmission through the first bidirectional dichroic polarizing layer or linearly polarized light incident via transmission through the second bidirectional dichroic polarizing layer is substantially shifted 0 to $\pi$.

5. A combination reflective/transmissive liquid-crystal display device according to claim 1, wherein:

said polarization separating layer is a circular polarization separating layer that, of the incident light, transmits either right or left rotated circularly polarized light, and reflects circularly polarized light of the other direction;

said first bidirectional dichroic polarizing layer is light-absorbing type bidirectional dichroic circularly polarizing layers that, of the incident light, transmit either right or left rotated circularly polarized light, and absorb circularly polarized light of the other direction;

said second bidirectional dichroic polarizing layer is light-absorbing type bidirectional dichroic linearly polarizing layers that, of the incident light, transmit only one linearly polarized light component, and absorb linearly polarized light of the other direction; and electrodes are provided on said liquid-crystal layer for applying an electrical field thereto, an electrical field being applied from the electrodes to the liquid-crystal layer so as to change the retardation value thereof, so that the phase of circularly polarized light incident via transmission through the first bidirectional dichroic polarizing layer or linearly polarized light incident via transmission through the second bidirectional dichroic polarizing layer is substantially shifted $-\pi/2$ to $\pi/2$.

6. A combination reflective/transmissive liquid-crystal display device according to claim 1, wherein:

said polarization separating layer is a linear polarization separating layer that, of the incident light, transmits only one linearly polarized light component, and reflects linearly polarized light of the other direction;

said first bidirectional dichroic polarizing layer is light-absorbing type bidirectional dichroic linearly polarizing layers that, of the incident light, transmit only one linearly polarized light component, and absorb linearly polarized light of the other direction;

said second bidirectional dichroic polarizing layer is light-absorbing type bidirectional dichroic circularly polarizing layers that, of the incident light, transmit either right or left rotated circularly polarized light, and absorb circularly polarized light of the other direction; and electrodes are provided on said liquid-crystal layer for applying an electrical field thereto, an electrical field being applied from the electrodes to the liquid-crystal layer so as to change the retardation value thereof, so that the phase of linearly polarized light incident via transmission through the first bidirectional dichroic polarizing layer or linearly polarized light incident via transmission through the second bidirectional dichroic polarizing layer is substantially shifted $-\pi/2$ to $\pi/2$.

7. A combination reflective/transmissive liquid-crystal display device according to claim 1, wherein:

said polarization separating layer is a circular polarization separating layer that, of the incident light, transmits either right or left rotated circularly polarized light, and reflects circularly polarized light of the other direction;

said first bidirectional dichroic polarizing layer is a light-absorbing type bidirectional dichroic circular polarizing layer that, of the incident light, transmits either right or left rotated circularly polarized light, and absorbs circularly polarized light of the other direction;

said second bidirectional dichroic polarizing layer is a light-absorbing type bidirectional dichroic linearly polarizing layer that, of the incident light, transmits only one linearly polarized light component, and absorbs linearly polarized light of the other direction;

said liquid-crystal layer has a retardation value that substantially shifts transmitted light $\pi/2$ and is provided with electrodes for applying an electrical field thereto, the action of which is that circularly polarized light incident via transmission through said first bidirectional dichroic polarizing layer or linearly polarized light incident via transmission through said second bidirectional dichroic polarizing layer is converted to linearly polarized light or circularly polarized light before it exits on the opposite side, an electrical field being applied to the liquid-crystal layer from said electrode, so that the direction of the director of the liquid crystal is changed, thereby changing the polarization axis of the linearly polarized light or circularly polarized light.

8. A combination reflective/transmissive liquid-crystal display device according to claim 1, wherein:

said polarization separating layer is a linear polarization separating layer that, of the incident light, transmits only one linearly polarized light component, and reflects linearly polarized light of the other direction;

said first bidirectional dichroic polarizing layer is a light-absorbing type bidirectional dichroic linearly polarizing layer that, of the incident light, transmits only one linearly polarized light component, and absorbs linearly polarized light of the other direction;

said second bidirectional dichroic polarizing layer is a light-absorbing type bidirectional dichroic circular polarizing layer that, of the incident light, transmits either right or left rotated circularly polarized light, and absorbs circularly polarized light of the other direction;

said liquid-crystal layer has a retardation value that substantially shifts transmitted light $\pi/2$ and is provided with electrodes for applying an electrical field thereto, the action of which is that linearly polarized light incident via transmission through said first bidirectional dichroic polarizing layer or circularly polarized light incident via transmission through said second bidirectional dichroic polarizing layer is converted to circularly polarized light or linearly polarized light before it exits on the opposite side, an electrical field being applied to the liquid-crystal layer from said electrodes, so that the direction of the director of the liquid crystal is changed, thereby changing the polarization axis of the circularly polarized light or linearly polarized light.

9. A combination reflective/transmissive liquid-crystal display device according to claim 1, wherein:

said polarization separating layer is a linear polarization separating layer that, of the incident light, transmits one linearly polarized light component, and reflects linearly polarized light of the other direction;

said first and second bidirectional dichroic polarizing layers are light-absorbing type bidirectional dichroic linearly polarizing layers that, of the incident light, transmit one linearly polarized light component and absorb linearly polarized light of the other direction;

said liquid-crystal cell having a retardation value that substantially shifts transmitted light $\pi$, and is provided with electrodes for applying an electrical field thereto, the action of which is to change the rotation of light by application of the electrical field, so that the polarization plane of linearly polarized light incident via transmission through said first or second bidirectional dichroic polarizing layer is shifted as it exits from the liquid-crystal layer.

10. A combination reflective/transmissive liquid-crystal display device according to claim 1, wherein:

said polarization separating layer is a linear polarization separating layer that, of the incident light, transmits one linearly polarized light component, and reflects linearly polarized light of the other direction;

said first and second bidirectional dichroic polarizing layers are light-absorbing type bidirectional dichroic linearly polarizing layers that, of the incident light, transmit one linearly polarized light component and absorb linearly polarized light of the other direction;

said liquid-crystal cell having a retardation value that substantially shifts transmitted light $\pi$, and is provided with electrodes for applying an electrical field thereto, the action of which is to change the rotation of light by application of the electrical field, so that the polarization plane of linearly polarized light incident via transmission through said first or second bidirectional dichroic polarizing layer is shifted as it exits from the liquid-crystal layer.

11. A combination reflective/transmissive liquid-crystal display device according to claim 1, wherein said liquid-crystal layer is sandwiched between two substrates, said substrates being formed on one of said electrodes, so that the electrical field direction when a voltage is applied to said electrode has a part that is substantially parallel with the surface of said substrates, the direction of liquid crystal molecules within the liquid-crystal layer rotating while remaining substantially parallel to said substrate surfaces.

12. A combination reflective/transmissive liquid-crystal display device according to claim 1, wherein said polarization separating layer is a circular polarization separating layer that, of the incident light, transmits either right or left rotated circularly polarized light, and reflects circularly polarized light of the other direction, and said circular polarization separating layer is made of a rotation selection film made of a cholesteric liquid crystal.

13. A combination reflective/transmissive liquid-crystal display device according to claim 1, wherein said polarization separating layer is a circular polarization separating layer that, of the incident light, transmits either right or left rotated circularly polarized light, and reflects circularly polarized light of the other direction, and said circular polarization separating layer comprises a lamination of a phase shifting layer having a retardation value that causes a substantial shift of $\pi/2$ to the phase of transmitted light, and at least three films exhibiting birefringence, wherein the difference in the refractive index between the layers adjacent to each other along its thickness direction for one of two light beams having vibration directions perpendicular to each other in a plane being different from the difference in the refractive index between the layers adjacent to each other along its thickness direction for the other light beams.

14. A combination reflective/transmissive liquid-crystal display device according to claim 1, wherein said polarization separating layer is a linear polarization separating layer that, of the incident light, transmits only one linearly polarized light component, and reflects linearly polarized light of the other direction, and the linear polarization separating layer has a planar laminated structure having three or more layers each of which has double refraction; and the difference in the refractive index between the layers adjacent to each other along its thickness direction for one of two light beams having vibration directions perpendicular to each other in a plane is different from the difference in the refractive index between the layers adjacent to each other along its thickness direction for the other of the two light beams.

15. A combination reflective/transmissive liquid-crystal display device according to claim 1, wherein said polarization separating layer is a linear polarization separating layer that, of the incident light, transmits only one linearly polarized light component, and reflects linearly polarized light of the other direction, and said linear polarization separating layer comprises a phase shifting layer having a retardation value that causes a substantial shift of $\pi/2$ to the phase of transmitted light, and a rotation-selecting layer made of a cholesteric liquid crystal, wherein circularly polarized light transmitted by said cholesteric liquid crystal is converted to linearly polarized light.

16. A combination reflective/transmissive liquid-crystal display device according to claim 1, wherein said half-wavelength layer is formed by a liquid-crystal cell including a liquid-crystal layer, liquid crystal in liquid crystal cell being one type selected from a group consisting of nematic liquid crystal, ferroelectric liquid crystal, and anti-ferroelectric liquid crystal, and wherein the refractive index and thickness of the liquid crystal is established so as to shift polarized light incident thereto by $\pi$.

17. A combination reflective/transmissive liquid-crystal display device according to claim 1, further comprising a switch as means for switching said half-wavelength layer on and off.

18. A combination reflective/transmissive liquid-crystal display device according to claim 1, further comprising a switch as means for switching said half-wavelength layer on and off, and an external light sensor that detects an amount of external light and sets said switch to on or off when said light amount exceeds a prescribed value, and sets said switch to off or on when said light amount is below said prescribed value.

19. A combination reflective/transmissive liquid-crystal display device according to claim 1, wherein said half-wavelength layer and a first bidirectional dichroic polarizing layer between the liquid-crystal layer in said liquid crystal layer of said half-wavelength layer are laminated, together with said liquid-crystal layer between a pair of substrates making up said liquid-crystal cell.

* * * * *